United States Patent [19]

Nakamoto et al.

[11] Patent Number: 5,973,746
[45] Date of Patent: Oct. 26, 1999

[54] IMAGE DATA CONVERSION PROCESSING DEVICE AND INFORMATION PROCESSING DEVICE HAVING THE SAME

[75] Inventors: Makoto Nakamoto; Satoshi Nakamura; Akinori Takayama; Kazunori Takahashi; Akio Takigami; Yasuo Sato; Chiaki Ito; Yoichi Aoki, all of Kawasaki, Japan

[73] Assignee: Fujitsu Limited, Kawasaki, Japan

[21] Appl. No.: 08/954,474

[22] Filed: Oct. 20, 1997

Related U.S. Application Data

[63] Continuation of application No. 08/578,443, Dec. 26, 1995, abandoned, which is a continuation of application No. 08/107,001, Aug. 17, 1993, abandoned.

[30] Foreign Application Priority Data

Aug. 18, 1992 [JP] Japan .................................. 4-219309
Jul. 8, 1993 [JP] Japan .................................. 5-169159

[51] Int. Cl.$^6$ ................................................ H04N 7/01
[52] U.S. Cl. .......................... 348/458; 348/910; 348/447
[58] Field of Search .................... 348/458, 910, 348/447, 441, 459, 448, 446, 443, 449, 704

[56] References Cited

U.S. PATENT DOCUMENTS

| | | |
|---|---|---|
| 3,970,776 | 7/1976 | Kinuhata et al. . |
| 4,276,565 | 6/1981 | Dalton et al. ............................ 348/458 |
| 4,322,750 | 3/1982 | Lord et al. ............................ 348/910 X |
| 4,455,572 | 6/1984 | Malden .............................. 348/910 X |
| 4,480,267 | 10/1984 | Van Den Avoort et al. . |
| 4,660,070 | 4/1987 | Nishi et al. . |
| 4,785,351 | 11/1988 | Ishikawa ................................ 358/140 |
| 4,872,054 | 10/1989 | Gray et al. ............................... 358/140 |
| 4,905,167 | 2/1990 | Yamaoka et al. .................... 358/140 X |
| 4,924,315 | 5/1990 | Yamashita ............................... 348/441 |
| 4,956,708 | 9/1990 | Itagaki . |
| 4,962,428 | 10/1990 | Tong et al. ........................... 358/140 X |
| 5,005,011 | 4/1991 | Perlman et al. . |

(List continued on next page.)

FOREIGN PATENT DOCUMENTS

| | | |
|---|---|---|
| 0 479 508 A2 | 4/1992 | European Pat. Off. . |
| 53-31572 | 9/1978 | Japan . |
| 60-249185 | 12/1985 | Japan . |
| 63-18394 | 4/1988 | Japan . |
| 1-310390 | 12/1989 | Japan . |
| 3-184086 | 8/1991 | Japan . |
| 5-45789 | 6/1993 | Japan . |

OTHER PUBLICATIONS

IEEE Transactions on Consumer Electronics, vol. CE–25, No. 4, Aug. 1979, New York, U.S., pp. 693–699, Farrell J.J. III: "A Video Display Generator Converts Microprocessor Information into a Color TV Display".

"The transactions of the institue of electronics and communication engineers of Japan vol. J69–D No. 11", pp. 1617–1623, Nov. 1986. (with translation).

*Primary Examiner*—Victor R. Kostak
*Attorney, Agent, or Firm*—Staas & Halsey, LLP

[57] ABSTRACT

An image data conversion processing device including an issue unit, plural line storing units and a generating unit for converting to a television signal image data stored in plural kinds of developing formats in a storing unit. The image data comprises plural lines, and the television signal comprises a predetermined number of lines. The issue unit issues a transmission instruction of image data to the storing unit in accordance with a period specified by a ratio of the number of lines of the image data to be converted and the number of lines of the television signal. The plural line storing units cyclically store the image data transmitted from the storing unit line by line on the basis of the transmission instruction of the issue unit. In synchronism with the horizontal synchronizing signal of the television signal, the generating unit multiplies the image data stored in the line storing unit by an interpolative coefficient corresponding to the developing format of the image data to be converted in the plural interpolative coefficients, which are beforehand set for the plural kinds of developing formats, thereby generating the television signal.

48 Claims, 44 Drawing Sheets

U.S. PATENT DOCUMENTS

| | | | |
|---|---|---|---|
| 5,016,103 | 5/1991 | Rabii | 348/910 X |
| 5,019,904 | 5/1991 | Campbell | 348/910 |
| 5,097,257 | 3/1992 | Clough et al. | 340/814 |
| 5,111,160 | 5/1992 | Hershberger | 358/140 X |
| 5,146,329 | 9/1992 | Flamm | 348/910 X |
| 5,157,495 | 10/1992 | Small | 358/140 X |
| 5,187,575 | 2/1993 | Lim | 358/140 |
| 5,229,853 | 7/1993 | Myers | 358/140 |
| 5,231,490 | 7/1993 | Park | 358/140 |
| 5,283,651 | 2/1994 | Ishizuka | 348/204 |
| 5,349,385 | 9/1994 | Glenn | 348/458 |
| 5,351,088 | 9/1994 | Nio et al. | 348/441 |

FIG. 8(a)

| COUNT VALUE OF COUNTER 221 | | 0 | 1 |
|---|---|---|---|
| ODD FIELD | LWT | 816 | — |
| | a | 1 | 1 |
| | b | 1 | 0 |
| | c | 1 | 0 |
| | α | 08 | 00 |
| | β | 08 | 08 |
| | γ | 00 | 08 |
| EVEN FIELD | LWT | 816 | — |
| | a | 1 | 1 |
| | b | 1 | 0 |
| | c | 1 | 0 |
| | α | 08 | 00 |
| | β | 08 | 08 |
| | γ | 00 | 08 |

FIG. 8(b)

| COUNT VALUE OF COUNTER 222 | | 0 | 1 | 2 | 3 | 4 |
|---|---|---|---|---|---|---|
| ODD FIELD | LWT | 196 | 816 | — | 516 | — |
| | a | 0 | 1 | 1 | 1 | 1 |
| | b | 0 | 1 | 0 | 1 | 1 |
| | c | 0 | 1 | 0 | 1 | 0 |
| | α | 03 | 08 | 05 | 02 | 07 |
| | β | 07 | 06 | 05 | 06 | 03 |
| | γ | 06 | 02 | 06 | 08 | 06 |
| EVEN FIELD | LWT | 196 | 816 | — | 516 | — |
| | a | 0 | 1 | 1 | 0 | 1 |
| | b | 0 | 1 | 0 | 0 | 1 |
| | c | 0 | 1 | 0 | 0 | 0 |
| | α | 06 | 06 | 08 | 06 | 02 |
| | β | 07 | 03 | 06 | 05 | 06 |
| | γ | 03 | 07 | 02 | 05 | 08 |

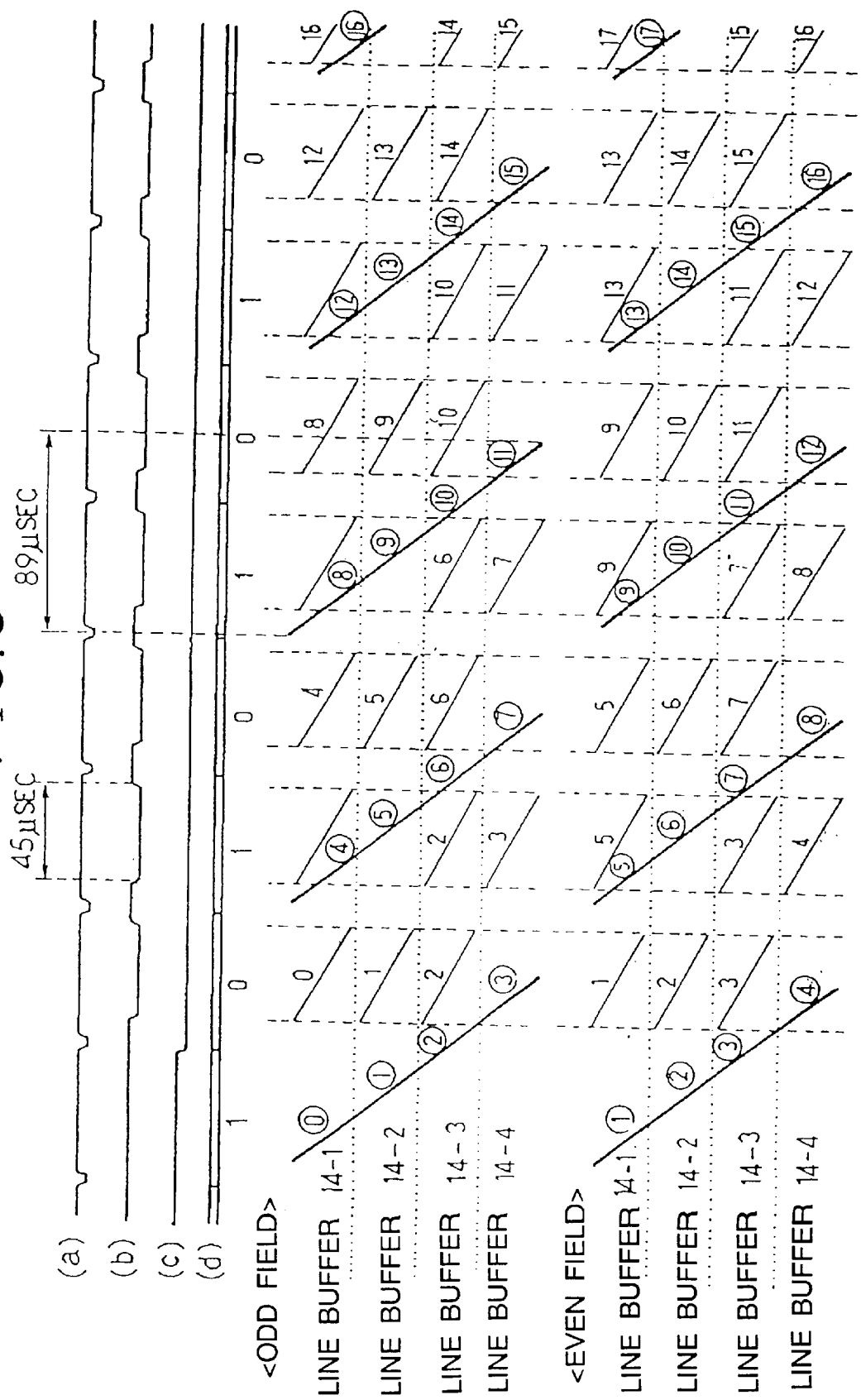

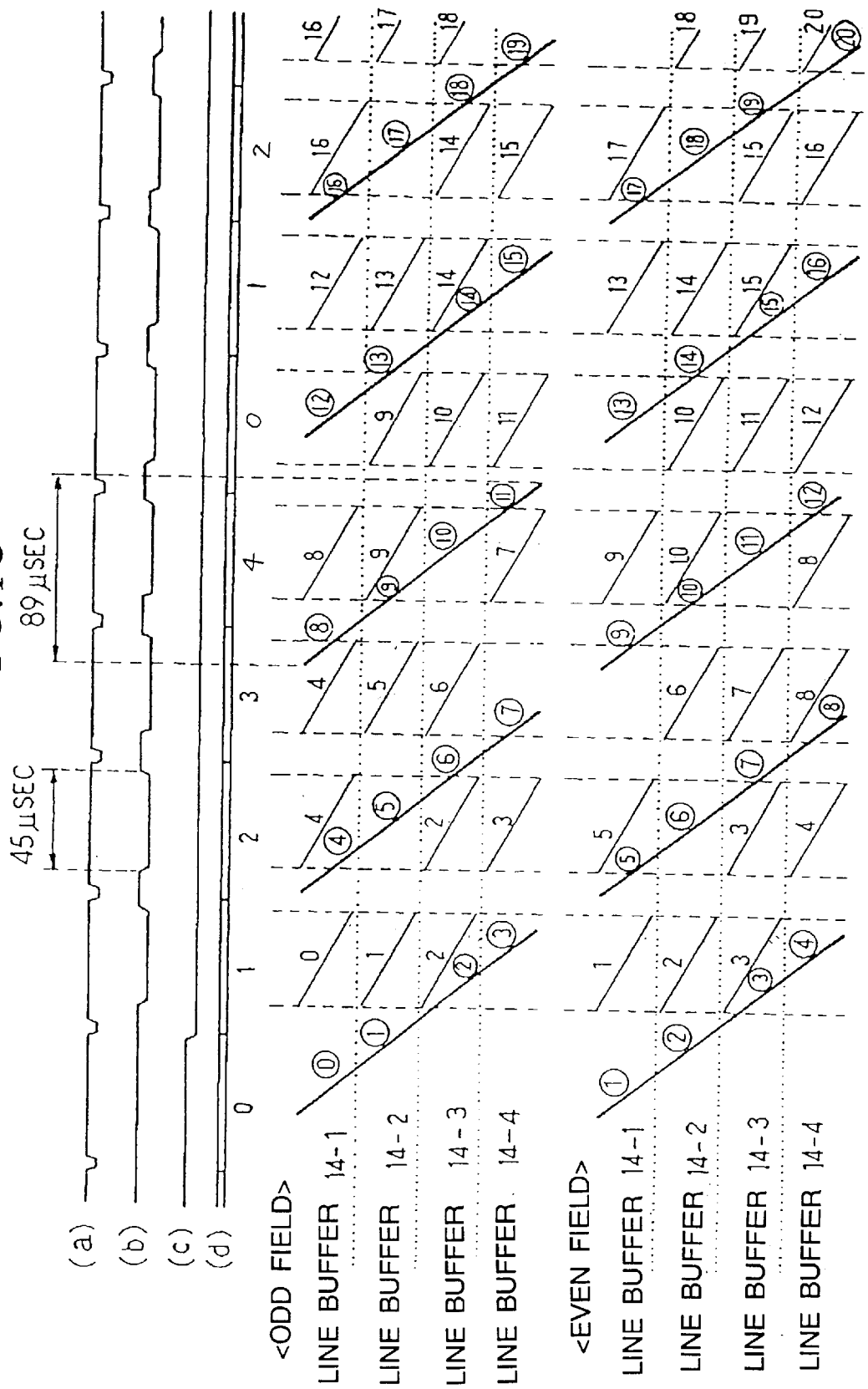

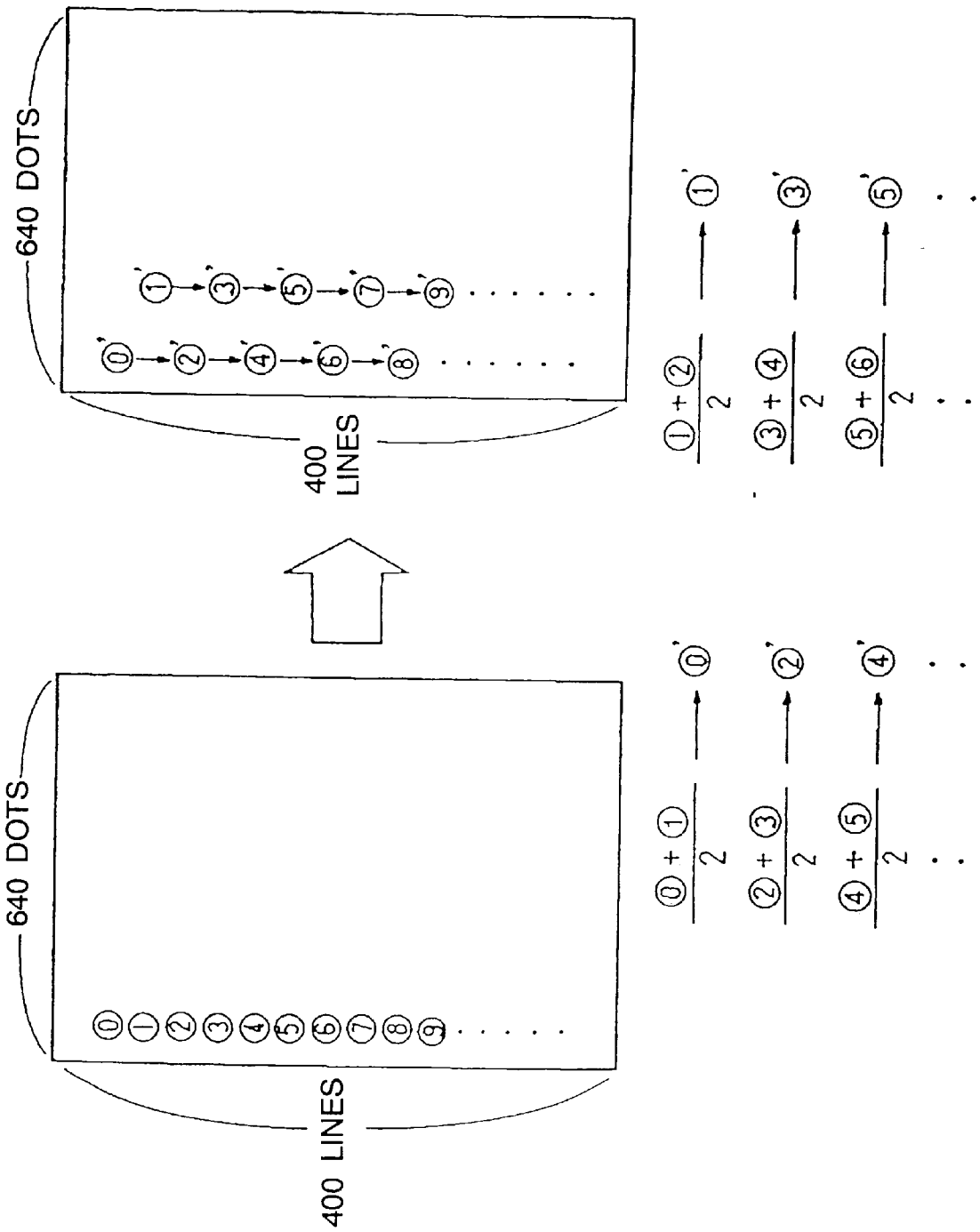

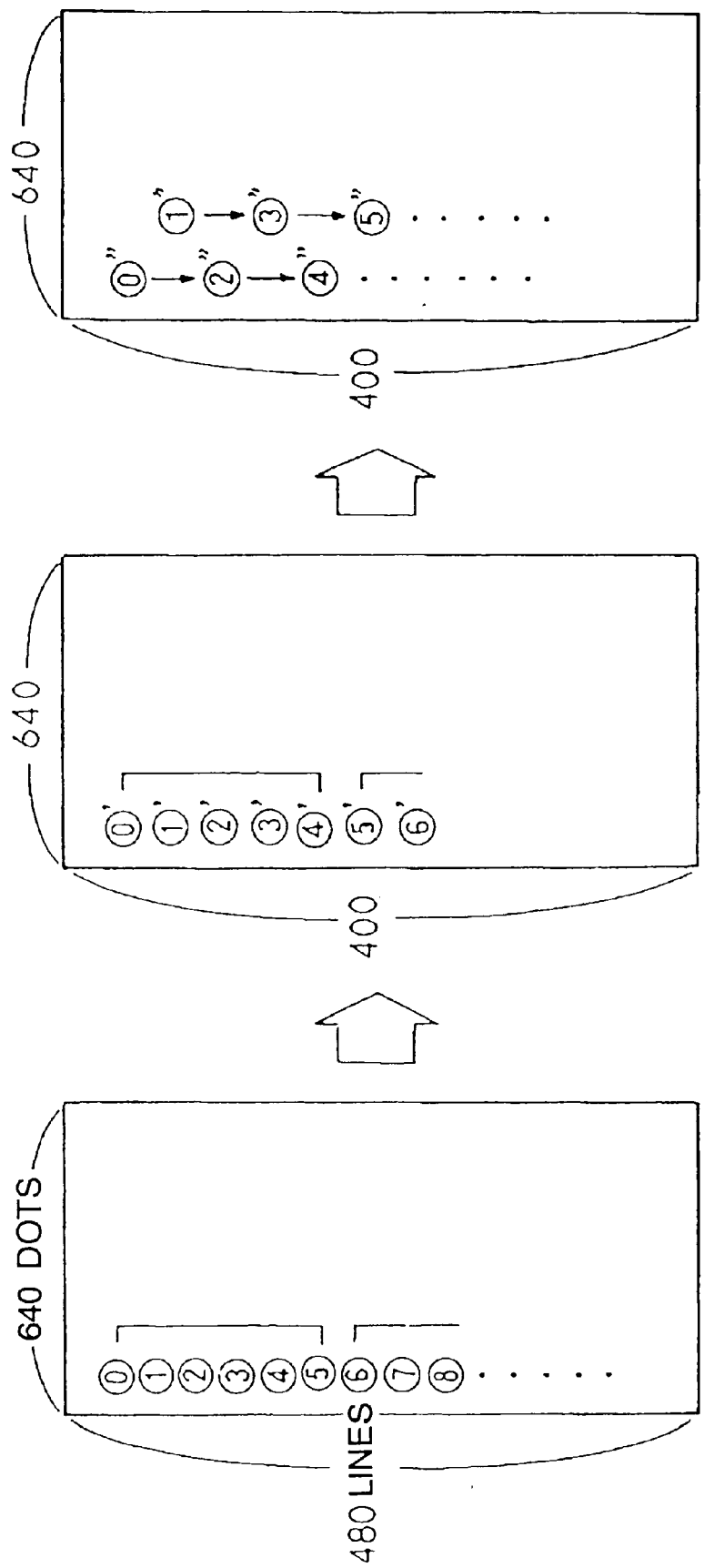

FIG.44

| COUNTER VALUE | INTERPOLATIVE COEFFICIENT TABLE VALUE |
|---|---|
| 0 | 8 (1000) |
| 1 | 6 (0110) |
| 2 | 5 (0101) |
| 3 | 3 (0011) |
| 4 | 2 (0010) |
| 5 | F (1111) |

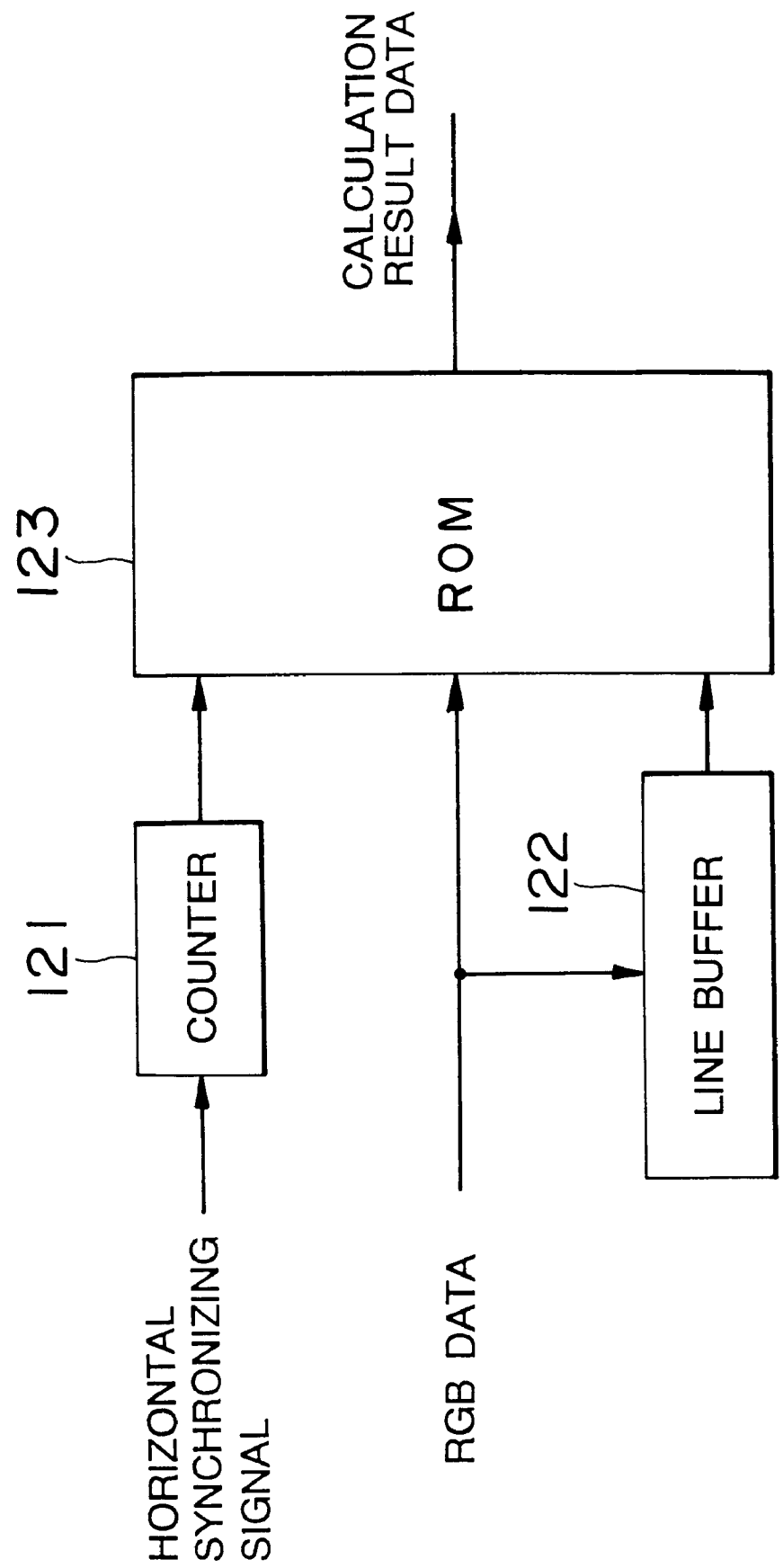

IMAGE DATA CONVERSION PROCESSING DEVICE AND INFORMATION PROCESSING DEVICE HAVING THE SAME

This application is a continuation of application Ser. No. 08/578,443, filed Dec. 26, 1995, now abandoned, which is a continuation of application Ser. No. 08/107,001, filed Aug. 17, 1993, now abandoned.

BACKGROUND OF THE INVENTION

This invention relates to an image data conversion processing device for converting into television signals image data which are developed in plural kinds of developing formats in a memory, and an information processing device having the image data conversion processing device.

The information processing device comprises a personal computer including a memory and a processing unit, for example. The information processing device is connected to a cathode ray tube (CRT), and image data output from the memory is displayed on the CRT. At this time, the image data is developed in various kinds of developing formats into a video random access memory (VRAM).

The image data comprises 320 pixel (dots) on each line, and the total number of lines is 200. Alternately, the image data comprises 640 dots×400 lines or 640 dots×480 lines. The frame (screen) of the CRT is divided into a display frame area for displaying the image data and a non-display frame area.

A program has a mode data corresponding to image mode of the image data for displaying the image data on the screen. The mode data represents the size of the non-display frame area, the number of dots of the display frame area in a horizontal direction, a flyback period and a read-out frequency for each dot.

A device for controlling the CRT to display the image data serves to set a horizontal scanning frequency 31 KHz on the basis of the mode data of the program when the image data comprises 640 dots×480 lines. This device reads out the image data at a read-out frequency 28 MHz from the VRAM in accordance with the set horizontal scanning frequency. The CRT displays the image data on the display frame area thereof on the basis of the mode data.

On the other hand, this device sets a horizontal scanning frequency of 15 KHz when the image data comprises 320 dots×200 lines. In this case, the device reads out the image data at a read-out frequency of 21 MHz from the VRAM in accordance with the horizontal scanning frequency. Further, the device sets a horizontal scanning frequency of 24 KHz when the image data comprises 640 dots×400 lines. In this case, the device reads out the image data at a read-out frequency of 25 MHz from the VRAM in accordance with this horizontal scanning frequency. Various CRTs are individually provided in accordance with image data which are developed in various kinds of developing formats.

As described above, the device for controlling the CRT to perform its display operation enables the CRT to display image data corresponding to the image mode by setting a horizontal scanning frequency.

In addition, a multi-CRT capable of displaying various image data of 320 dots×200 lines, 640 dots×400 lines and 640 dots×480 lines for example has been recently proposed. In this case, an information processing device having the program outputs a composite signal to the multi-CRT. The composite signal comprises horizontal synchronizing signal and a vertical synchronizing signal of 31/24/15. On the basis of the composite signal, the multi-CRT displays image data of RGB signals which are output from the information processing device.

On the other hand, there is a television device which is generally used for a domestic purpose in contraposition with the CRT and the multi-CRT as described above. The horizontal scanning frequency of this television device is specified to 15 KHz (accurately 15.73426 KHz), and an effective line number is specified to 400 lines. In the television device, one frame is displayed with two fields through an interlaced scanning operation in which the frame is scanned with interlacing lines.

It has been increasingly required that this type of television device is connected to the information processing device to promote the propagation of the information processing device. In this case, a scan converter for converting image data into a television signal is required. The scan converter is provided with a change-over switch for selecting any one of the plural horizontal scanning frequencies as described above, and on the basis of a set (selected) horizontal scanning frequency the scan converter converts the image data to be displayed by the information processing device. The television device displays an image on the frame thereof on the basis of the television signal.

As described above, when the television device is connected to the information processing device, the scan converter converts image data transmitted in an analog form into digital signals and then stores the digital signals into an internal VRAM. Further, the scan converter converts the image data to television signals which will be interlaced at a horizontal scanning frequency 15 KHz, and output the converted television signals to the television device.

When the line number of image data to be developed in the VRAM exceeds 400 lines of a television frame, the conventional scan converter displays only an image portion corresponding to 400 lines, which is specified by an adjusting volume. Therefore, in this case, a problem occurs in that the other image data corresponding plural lines other than the above 400 lines is not displayed on the television frame (screen). In order to solve this problem, the image data is compressed by the scan converter.

If the image data is uniformly compressed by the scan converter, an image which should not be compressed might be compressed. For example, the information processing device frequently outputs image data of 640 dots×480 lines and image data of 640 dots×420 lines at a horizontal scanning frequency 31 KHz, for example. In this case, the image data of 640 dots×420 lines can be displayed on the television screen, whereas the image data of 640 dots×480 lines can not be displayed on the television screen.

The scan converter serves to compress the image data of 640 dots×480 lines to 640 dots×420 lines at a constant compression rate, however, it also compresses, at the constant compression rate, the image data of 640 dots×420 lines which is originally unnecessary to be compressed.

Further, use of the scan converter as described above induces a problem that a user must select a horizontal scanning frequency through the change-over switch. The composite signal may be used to remove a user's manipulation of the change-over switch. The composite signal is a synchronizing signal, and comprises signals having respective frequencies. In this case, code information representing each of the frequencies is not transmitted. Thus the frequency can not be immediately identified on the basis of the composite signal. Accordingly, for example, a frequency detector for detecting each frequency is provided to the scan converter. The manipulating operation of the change-over switch can be omitted by using a detection result of the frequency detector. However, in this case the circuit construction of the scan converter is more complicated.

Further, when the scan converter is used, the image data to be displayed, which is developed in the information processing device, is converted from a digital signal to an analog signal. Then the analog signal is re-converted to the digital signal again by the scan converter. As a result, a problem occurs in that the image quality of the image data to be displayed on the television device is deteriorated.

Still further, in the conventional scan converter, the image data transmitted from the information processing device is converted to the television signal merely through the interlaced scanning operation. Therefore, a flicker occurs on the screen of the television device, and consequently, a displayed image is obscure.

SUMMARY OF THE INVENTION

An object of this invention is to provided an image data conversion processing device capable of automatically generating television signals, having excellent display performance, on the basis of various kinds of image data to be developed on a VRAM, having a single hardware construction, and an information processing device having the image data conversion processing device thus constructed.

In order to attain the above object, the image data converting device according to this invention converts image data of plural lines, which are stored in a storing unit and which can be developed in various kinds of developing formats, into television signals having a predetermined number of lines. The image data converting device includes an issue unit, plural line storing unit and a generating unit. The issue unit serves to issue an image data transmitting instruction to the storing unit in accordance with a period which is specified by a ratio of the line number of image data to be converted and a predetermined line number of the television signal.

The plural line storing units serve to cyclically store line by line, the image data transmitted from the storing unit on the basis of the transmission instruction of the issue unit.

The generating unit serves to multiply the image data stored in the line storing units by an interpolative coefficient corresponding to a developing format of an image data to be developed in plural interpolative coefficients which are set beforehand in correspondence with plural kinds of developing formats, in synchronism with the horizontal synchronizing signal of the television signal, thereby generating the television signal.

According to this invention, the image data of various kinds of developing formats can be automatically converted to the television signals.

Further, the image data conversion processing device according to this invention converts image data, which are stored in a storing unit and can be developed in plural kinds of developing formats, into a television signal having a predetermined line number. The image data comprises plural lines.

The image data conversion processing device of this invention includes a mode managing unit and a conversion processing unit. The mode managing unit serves to manage mode data corresponding to the line number of the image data.

The conversion processing unit serves to renew the conversion of the image data in accordance with the mode data supplied from the mode managing unit to convert the image data corresponding to at least plural mode data, to television signals.

Still further, the information processing device according to this invention, executes plural programs corresponding to different image modes. The image data includes a predetermined image mode. The program includes mode data having information for the image mode of the image data thereof or a specified information.

The information processing device executes the plural programs and has a processing unit for processing the mode data and the image data. The processing unit includes an image storing unit and a conversion processing unit. The image storing unit serves to store the program containing the mode data and the image data. The conversion processing unit converts the image data stored in the image storing unit according to a predetermined conversion in accordance with the mode data to thereby convert the image data to the television signal.

Still further, the image data conversion processing device according to this invention converts the image data, which can be developed in the plural kinds of developing formats, to a television signal of a predetermined line number. The image data comprises plural lines. The image data conversion processing device includes an even storing unit, an odd storing unit, a signal generating unit and a format conversion processing unit.

The even storing unit serves to store image data of even lines in the image data to be converted while the odd storing unit serves to store image data of odd lines in the image data to be converted.

The signal generating unit generates a horizontal synchronizing signal for the television signal, and also generates plural rate data which are determined by a ratio of the line number of the image data and the predetermined line number of the television signal in correspondence with the plural kinds of developing formats.

The format conversion processing unit serves to convert the image data of the even and odd lines supplied from the even storing unit and the odd storing unit into the format of the television signal using the horizontal synchronizing signal and the rate data corresponding to the developing format of the image data to be converted.

According to the information processing device of this invention, the even storing unit and the odd storing unit are provided and a calculation is carried out by reading out the image data of the even and odd lines, so that the construction of the format conversion processing unit can be simplified.

Still further, the information processing device of this invention converts the image data, which are stored in a storing unit, to a television signal having a predetermined line number. The image data comprises plural lines.

One frame of the television signal comprises plural fields. The information processing device of this invention includes a linear interpolating unit, plural field storing units, a synchronizing signal generating unit and a field control unit.

The linear interpolating unit serves to linearly interpolate image data of two lines of an image data line supplied from the storing unit and an image data line adjacent to the above image data line using a predetermined interpolative coefficient, thereby generating the television signal.

The plural field storing units are provided at the input or output side of the linear interpolating unit to store the respective lines on a field basis. The synchronizing signal generating unit serves to generate the horizonal synchronizing signal and the vertical synchronizing signal of the television signal.

The field control unit serves to perform write-in and read-out operations of the image data field by field for the plural field storing units on the basis of the synchronizing signal which is generated in the synchronizing signal generating unit.

According to the information processing device of this invention, the image data is subjected to the processing field by field to generate the television signal.

As described above, according to the image data conversion processing device and the information processing device of this invention, the television signal having excellent display performance can be automatically generated from the image data of various kinds of developing format, but still keeping a single hardware construction. Thus manipulation by the user can be removed.

BRIEF DESCRIPTION OF THE DRAWINGS

FIGS. 8A and 8B show an embodiment of a management data of a management table;

FIG. 9 is a time chart for an operational processing of the embodiment;

FIG. 10 is another time chart for the operational processing of the embodiment;

FIG. 11 is an explanatory diagram showing a television signal generating processing;

FIG. 12 is another explanatory diagram showing the television signal generating processing;

FIG. 44 is a diagram showing an example of an interpolative coefficient value; and FIG. 45 is a diagram showing the construction of a linear interpolating circuit 120.

DETAILED DESCRIPTION OF THE PREFERRED EMBODIMENTS

Preferred embodiments of the image data conversion processing device and the information processing device having the image data conversion processing device will be described with reference to the accompanying drawings.

<First Embodiment>

Figure 1:
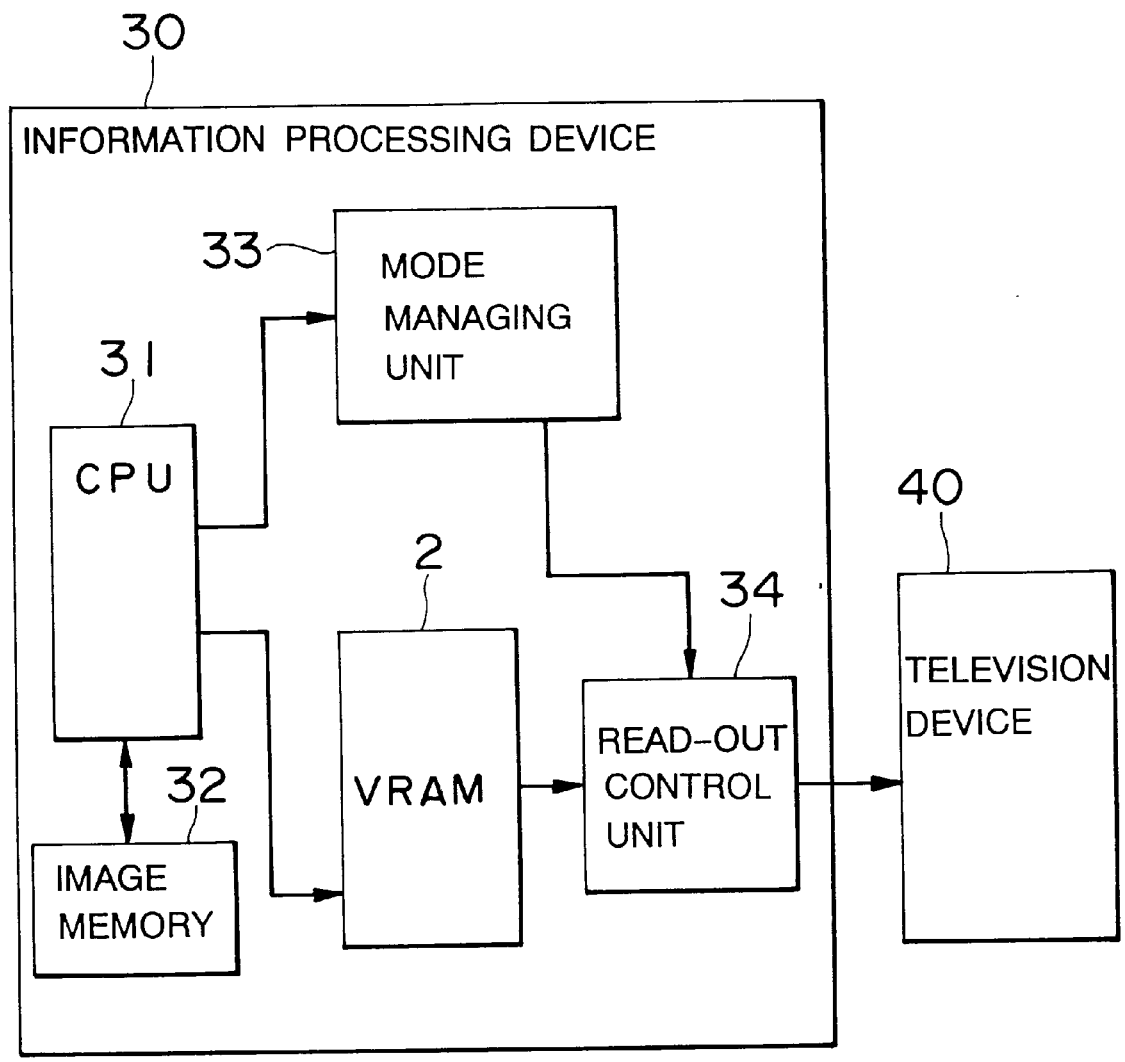
FIG. 1 is a block diagram showing an information processing device having an image data conversion processing device of a first embodiment of this invention.

FIG. 1 is a block diagram showing the construction of an information processing device having an image data conversion processing device of a first embodiment according to this invention.

In FIG. 1, the information processing device comprises a personal computer, for example. The information processing device includes a CPU 31, an image memory 32, a VRAM 2, a mode managing unit 33, and a read-out control unit 34. The information processing device 30 is connected to an external television device 40.

The image memory 32 serves to store a program and image data. The program has mode data storing information corresponding to an image mode of an image data thereof or specified information.

The CPU 31 processes on the program and the image data from the image memory 32. This image data has a predetermined image mode. The CPU 31 executes plural programs in which the image modes are different from each other, and it receives the mode data contained in the program and the image data.

The CPU 31 also outputs the image data of the image memory 32 to the VRAM 2, and outputs the mode data to the mode managing unit 33. The image data comprises plural lines, and each line comprises plural dots. In this construction, the image data whose image modes are different from each other have different line numbers of data. The mode data corresponds to the line number.

The VRAM 2 serves to store image data of various kinds of developing formats. The image data are stored into the VRAM 2, for example, in a developing format of 320 pixel (dots)×200 lines, 640 dots×400 lines or 640 dots×480 lines. The image data may be stored in another developing format.

The mode managing unit 33 manages the mode data corresponding to the line number of the image data which will be developed in the VRAM 2 and converted. The read-out control unit 34 constitutes an image data conversion processing device. The read-out control unit 34 renews a conversion mode (manner) of image data in accordance with the mode data supplied from the mode managing unit 34 to convert image data corresponding to at least plural mode data into television signals.

The image data for television signals represents a predetermined line number. The read-out control unit 34 subjects the image data to a predetermined conversion determined on the basis of a line number ratio of the above predetermined line number and the mode data. This thereby converts the image data corresponding to at least plural mode data into television signals.

In this construction, a managing table 220 as described later is provided to the read-out control unit 34. The managing table 220 includes first conversion information for converting to image data having the line number of the television signal image data in which the image line number to be converted is larger than the line number of the television signal. The managing table 220 also includes second conversion information for converting to image data having the line number of the television signal image data in which the image line number to be converted is smaller than the line number of the television signal.

The read-out control unit 34 selects any one of the first and second conversion information, and performs the conversion of the image data on the basis of the selected conversion information.

The read-out control unit 34 may alter a read-out range of data to be read out from the VRAM 2 in accordance with the mode data. Further it may carry out the conversion in accordance with the scanning frequency of the television signal.

In this construction, an image output from the read-out control unit 34 is displayed on a television device 40. The information processing device 30 may be designed in one-housing structure.

Figure 2:
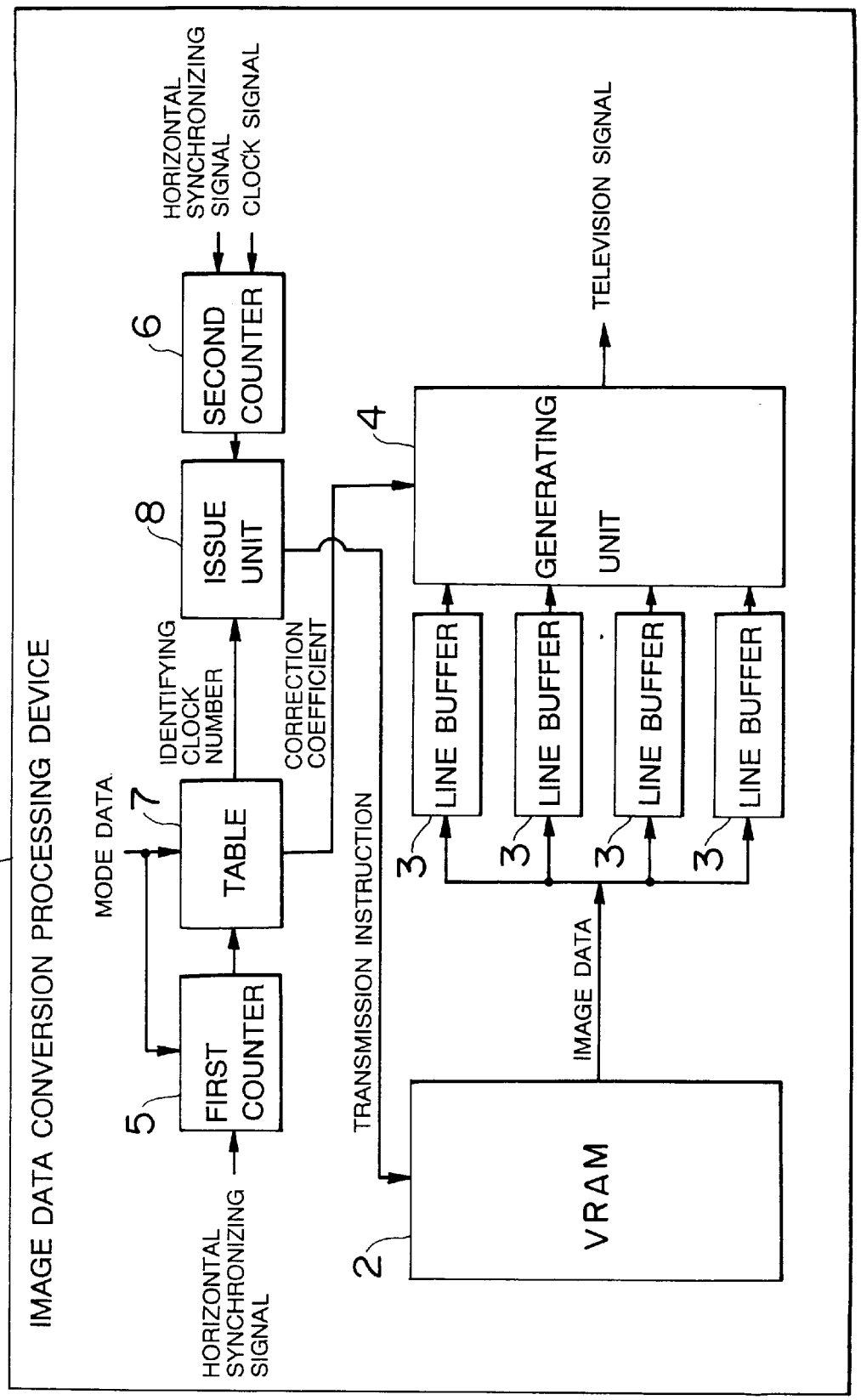
FIG. 2 is a block diagram showing the basis of construction of the image data conversion processing device as shown in FIG. 1.

A. Basic Construction of Image Data Conversion Processing Device of First Embodiment FIG. 2 is a block diagram showing the basic construction of the image data conversion processing device. The image data conversion processing device 1 includes a VRAM 2, plural line buffers 3, a generating unit 4, a first counter 5, a second counter 6, a table 7 and an issue unit 8.

The VRAM 2 serves to store image data to be converted to a television signal. The image data stored in the VRAM 2 is developed with the program. The image data comprises 640 dots×400 lines or 640 dots×480 lines, for example.

The plural line buffers 3 are connected to the VRAM 2 as shown in FIG. 2, and each of the line buffers 3 cyclically stores the image data transmitted from the VRAM 2 line by line.

The generating unit 4 is connected to the plural line buffers 3, and generates the horizontal synchronizing signal and the vertical synchronizing signal of a television signal. The generating unit 4 multiplies the image data stored in the line buffer 3 in synchronism with the horizontal synchronizing signal by an interpolative coefficient which is assigned to the image data, and generates the television signal by adding these multiplied results.

That is, the generating unit 4 carries out a linear interpolation of the image data of two image data lines of an image data line for a television signal line and an adjacent image data line thereto using a predetermined value which is set beforehand as the interpolative coefficient. This thereby calculats a signal level, and also calculates an average in signal level between the two television signal lines of the linearly interpolated television signal line and a television signal line adjacent thereto.

Further, the generating unit 4 generates a television signal through the calculation of the average value in signal level between the two image data lines of the image data line corresponding to the television signal line and the adjacent image data line thereto using the predetermined value which is set beforehand as an interpolative coefficient.

The first counter 5 cyclically counts the horizontal synchronizing signal of the television signal on the basis of the mode data supplied from the mode managing unit 33 at a period specified by the mode data.

The table 7 manages interpolative coefficients and identifying clock numbers for the horizontal synchronizing signal of the television signal in accordance with the developing formats of the image data. These managing data are defined in accordance with the developing formats of the image data stored in the VRAM 2, and has periodicity to the horizontal synchronizing signal of the television signal.

The table 7 sets the interpolative coefficients and the identifying clock numbers for the mode data supplied from the mode managing unit 33 to be output. The table 7 uses a count value of the first counter 5 as an access address to output an interpolative coefficient having periodicity corresponding to the count value in the interpolative coefficients and the identifying clock numbers which are objects to be output. The interpolative or correction coefficient output is supplied to the generating unit 4 while the identifying clock number is output to the issue unit 8.

The second counter 6 counts the clock number of the horizonal synchronizing signal of the television signal. The issue unit 8 issues an instruction for transmitting the image data to the VRAM 2 through the comparison between the identifying clock number output from the table 7 and the count value counted by the second counter 6.

Next, the operation of the image data conversion processing device thus constructed will be described.

Figure 3:
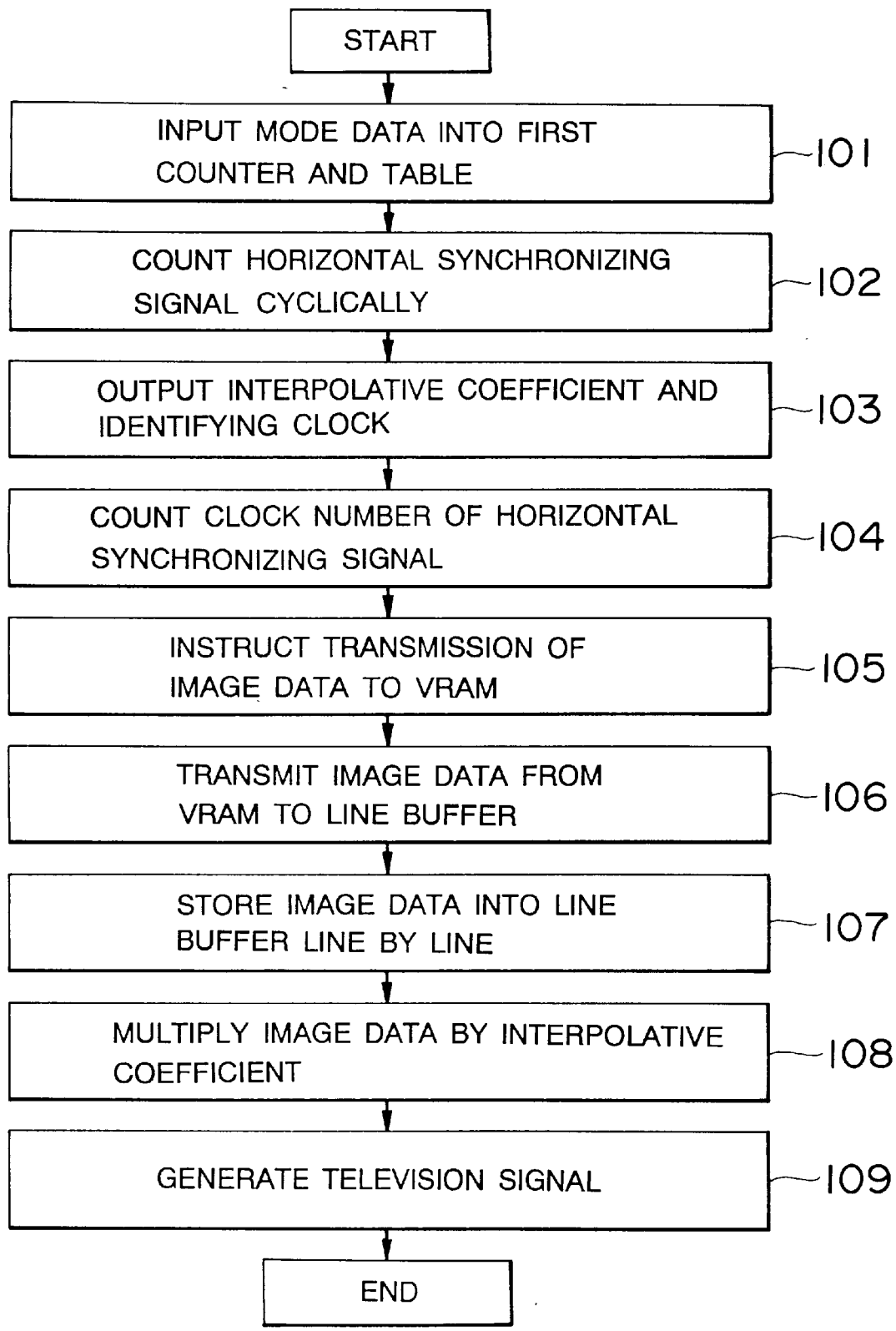
FIG. 3 is a flowchart showing an operation of the image data conversion processing device as shown in FIG. 2.

FIG. 3 is a flowchart showing the operation of the image data conversion processing device as shown in FIG. 2.

First, mode data for an image data which will be developed in the VRAM 2 is supplied to the first counter 5 and the table 7 (step 101). The first counter 5 performs its cyclic counting operation of the horizontal synchronizing signal of the television signal at the period defined by the mode data (step 102).

In response to the counting operation as described above, the table 7 outputs an interpolative coefficient and an identifying clock number having periodicity defined by the above count value in the interpolative coefficients and the identifying clock numbers which are objects to be output in accordance with the mode data (step 103). The second counter 6 counts the clock number of the horizontal synchronizing signal of the television signal (step 104).

The issue unit 8 compares the identifying clock number output from the table 7 and the count value of the second counter 6. When the identifying clock number is coincident with the count value, a transmission instruction for a series of image data a sequential to a previous images data is issued (step 105). More specifically, the issue unit 8 issues the transmission instruction of the series of image data sequential to the previous one in accordance with the periodicity defined by the ratio in line number between the line number of the image data developed in the VRAM 2 and the line number of the television signal.

Accordingly, when the line number of the image data of the VRAM 2 is larger than the line number of the television signal, the issue unit 8 issues the transmission instruction of the image data in accordance with a short period. Alternatively, when the line number of the image data is smaller than the line number of the television signal, the issue unit 8 issues the transmission instruction of the image data in accordance with a long period.

In response to the transmission instruction of the issue unit 8, the image data is transmitted from the VRAM 2 to the line buffer 3 (step 106). In this case, the image data is first sequentially transmitted with the image data of the top line at a transmission starting point every transmission unit of a predetermined number of lines. When the transmission of the image data is completed, the image data is sequentially transmitted with the image data of the next line to the top line, at a transmission starting point every transmission unit of a predetermined number of lines. When the transmission of the image data is completed, the image data is sequentially transmitted with the top line thereof at a transmission starting point, again every transmission unit. As described above, the image data is transmitted while the transmission unit using the image data of the top line as the transmission starting point and the other transmission unit using the image data of the next line to the top line as the transmission starting point are alternately selected.

The line buffer 3 cyclically latches the image data transmitted from the VRAM 2 line by line (step 107). In response to the latch operation as described above, the generating unit 4 multiplies the image data latched in the line buffer 3 and the interpolative coefficient output from the table 7 in synchronism with the horizontal synchronizing signal of the television signal (step 108). The generating unit 4 generates the television signal by adding these multiplied results (step 109).

That is, the line buffer 3 renews the latched image data at a short period when the line number of the image data developed in the VRAM 2 is large. When the line number of the image data is small, the line buffer 3 renews the latched image data at a long period. In response to the latch operation of the image data by the line buffer 3, the generating unit 4 can generate the television signal while reducing (compressing) the image data developed in the VRAM 2.

A case also exists where the number of the line buffers 3 provided is larger than the line number of the image data required for the generating processing of the television signal by the generating unit 4. In this case, the issue unit 8 issues the transmission instruction of the image data at such timing so as to keep the line buffers 3, whose number is sufficient to store the image data required for the generation of the television signal, in the write-in processing of the image data into the line buffers 3. In this case, the write-in speed of the image data into the line buffers 3 is set to be higher than the read-out speed of the image data from the line buffers 3.

A set value of the interpolative coefficient used in this case is set by the generating unit 4. This set value is calculated as follows. The image data of two image data lines adjacent to an image data line corresponding to a television signal line, are subjected to linear interpolation to calculate a signal level. The interpolative coefficient is set so that a television signal having an average value between the above signal level and a similar signal level obtained for a television signal line adjacent to the above television signal line is generated.

In accordance with the set value of the interpolative coefficient, the generating unit 4 calculates the signal level of each television signal by obtaining the signal level of a linear interpolative value of two image data sandwiching the corresponding image data line which is in reduced (compressed) relation with the television signal. Subsequently, the generating unit 4 determines the final signal level of the television signal by calculating the average value of the two adjacent television signals thus obtained.

As described above, the generating unit 4 determines the signal level of the television signal while reducing the image data of the VRAM 2. Further, the generating unit 4 averages the signal level between the adjacent television signals. Through this operation, flickerless television signals are generated from all image data of the VRAM 2. Further, the generating unit 4 generates television signals of interlaced scanning in accordance with the set value of the interpolative coefficient and the alternately-transmitted image data.

Figure 4:
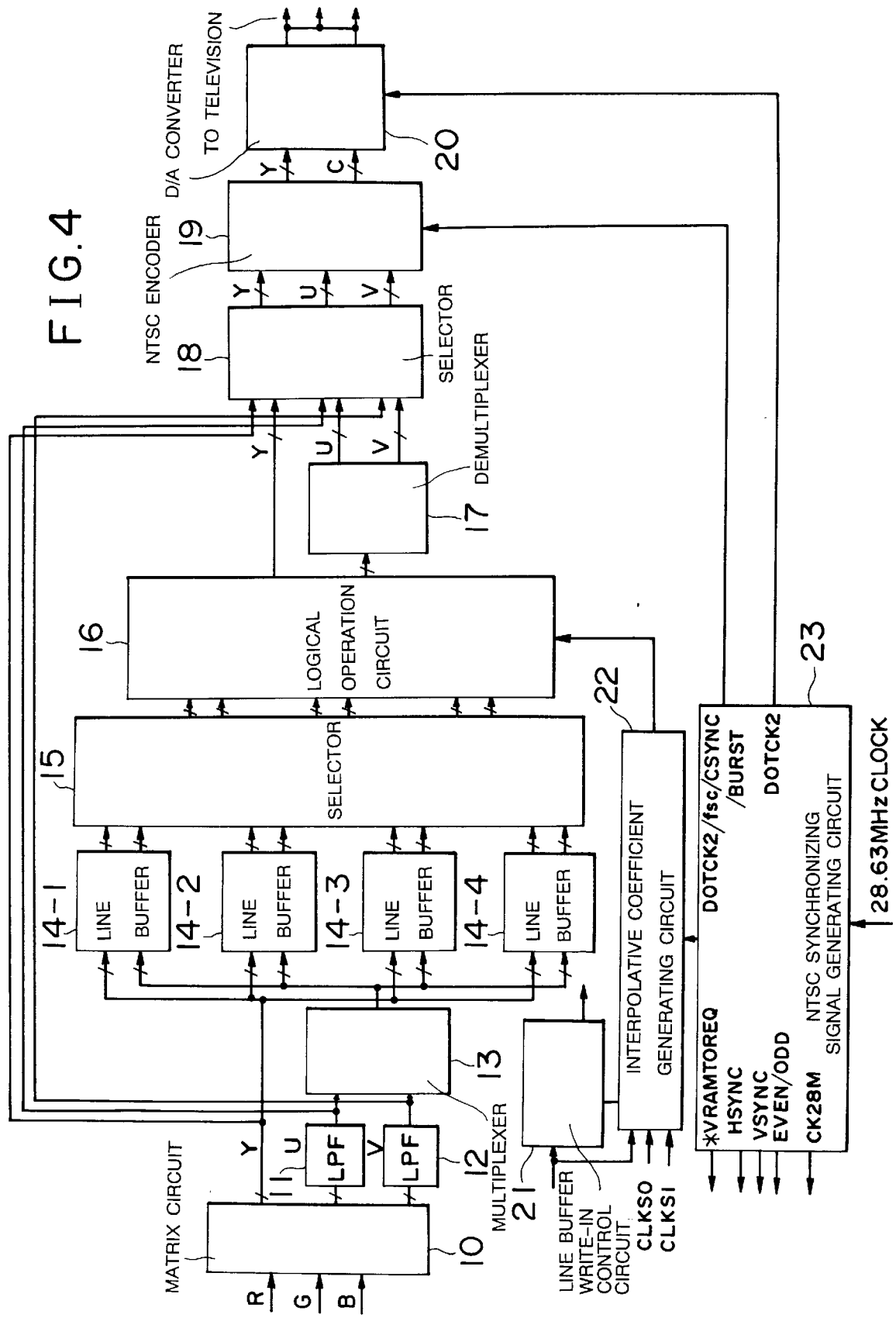
FIG. 4 is a block diagram showing the typical construction of the image data conversion processing device as shown in FIG. 1.

B. An Image Data Conversion Processing Device having Typical Construction of First Embodiment Next, the image data conversion processing device having a typical construction will be described. FIG. 4 is a block diagram showing the typical construction of the image data conversion processing device.

In FIG. 4, the image data conversion processing device reads out the image data stored in the VRAM 2 in accordance with the mode data from the mode managing unit 33 (FIG. 1). Further, it reduces the image data to display all the image data stored in the VRAM 2 on the television device 40, and determines the signal level of the television signal. Still further, it generates a flickerless television signal by averaging the signal level between adjacent television signals.

In FIG. 4, an RGB matrix circuit 10 converts the image data of RGB components read out from the VRAM 2 to the image data of YUV components. A low-pass filter (LPF) 11 removes noise components of the image data of U-components converted by the RGB matrix circuit 10. A LPF 12 removes noise components of the image data of V-components converted by the RGB matrix circuit 10.

A multiplexer 13 selects the image data of any one of the two low-pass filters 11 and 12. A line buffer 14-i (i=1 to 4) serves to cyclically and successively store the image data of the Y-component converted by the RGB matrix circuit 10 and the image data of the component selected by the multiplexer 13 line by line.

A selector 15 selects the image data stored in the line buffer 14-i. A logical operation circuit 16 generates a television signal by subjecting the image data stored in the line buffer 14-i to a reducing operation and a flicker removing operation. A demultiplexer allocates the selector 18 with the U and V-component television signals of the television signals output from the logical operation circuit 16, which are selected by the multiplexer 13.

The selector 18 selects any one of the image data converted by the RGB matrix circuit 10 and the television signal output from the logical operation circuit 16. An NTSC encoder 19 encodes the television signal output from the selector 18 into an NTSC signal. A D/A converter 20 converts a digital signal output from the NTSC encoder 19 to an analog signal and then outputs the analog signal to the television device 40.

A line buffer write-in control circuit 21 controls the write-in operation of the image data into the line buffer 14-i on the basis of the mode data from the mode managing unit 33. An interpolative coefficient generating circuit 22 generates an interpolative coefficient which is required for the logical operation circuit 16 to perform the reducing operation and the flicker removing operation as described above on the basis of the mode data and clock signals CLKS0 and CLKS1. The interpolative coefficient generating circuit 22 outputs the interpolative coefficient to the logical operation circuit 16.

An NTSC synchronizing signal generating circuit 23 generates an NTSC synchronizing signal containing a horizontal synchronizing signal and a vertical synchronizing signal on the basis of a clock of 28.63 MHz for example. An NTSC synchronizing signal generating circuit 23 outputs an NTSC synchronizing signal to the interpolative coefficient generating curcuit 22.

In this construction, each of the line buffers 14-i, the selector 15 and the logical operation circuit 16 is respectively provided in pairs (i.e., two groups of line buffers, selectors and logical operation circuits are provided) in correspondence with the ODD field and the EVEN field of the television signals. In FIG. 4, one group of the line buffers 14-i, the selector 15 and the logical operation circuit 16 are illustrated. The write-in operation of the image data into the line buffer 14-i is executed at 28.6 MHz (8 fsc). The operation of the logical operation circuit 16 is executed at 14.3 MHz (4 fsc) in synchronism with the generation of the television signals. That is, the write-in operation of the image data into the line buffer 14-i and the operation of the logical operation circuit 16 are executed in asynchronism with each other.

Figure 5:
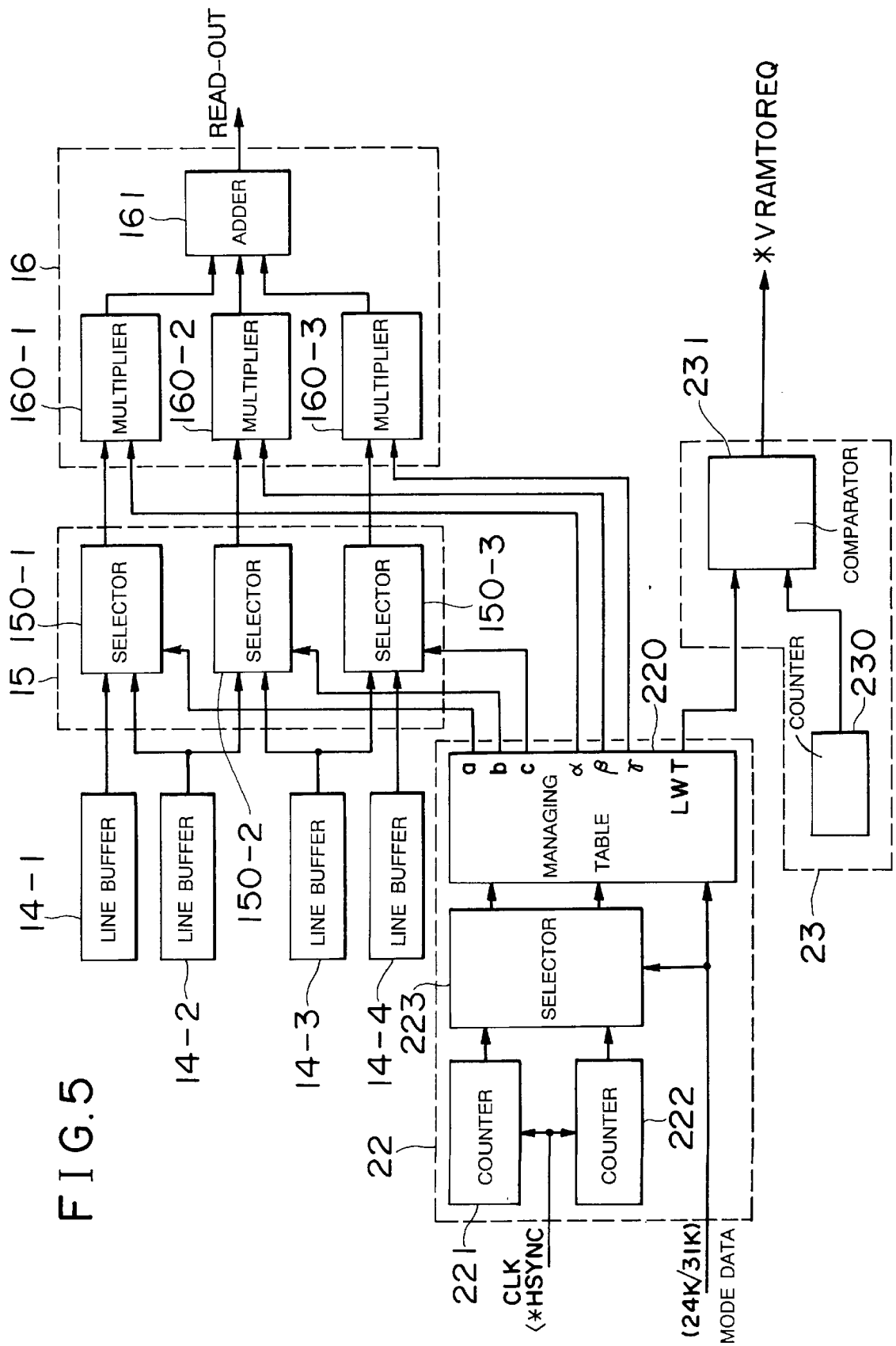
FIG. 5 is a block diagram showing a main part of the construction as shown in FIG. 4.

FIG. 5 is a block diagram showing the detailed construction of the main part of the circuit as shown in FIG. 4. In FIG. 5, the same elements as FIG. 4 are represented by the same reference numerals.

The image data which is potentially developed in the VRAM 2 is 640 dots×480 lines, or 640 dots×400 lines, 320 dots×200 lines. These image data are converted to television signals of 640 dots×400 lines, 640 dots×400 lines and 320 dots×400 lines, respectively.

The program developed in the memory 32 develops the image data in the VRAM 2 in accordance with any developing format in three kinds of developing formats through the execution of its processing. The developing format of this case is provided to a managing table 220 and a selector 223, as described later through the mode managing unit 33 (not shown) in accordance with a coded mode data.

The selector 15 comprises three selectors 150-i (i=1 to 3). The selector 150-i selects any one of the image data stored in the line buffers 14-1 and 14-2. The selector 150-1 selects the image data of the line buffer 14-1 when a selection control signal output from an a-terminal of the managing table 220 as described later represents "1", and selects the image data of the line buffer 14-2 when the selection control signal represents "0".

The selector 150-2 selects any one of the image data stored in the line buffers 14-2 and 14-3. The selector 150-2 selects the image data of the line buffer 14-2 when the selection control signal output from a b-terminal of the managing table 220 represents "1", and selects the image data of the line buffer 14-3 when the selection control signal represents "0".

The selector 150-3 selects any one of the image data stored in the line buffers 14-3 and 14-4. The selector 150-3 selects the image data of the line buffer 14-3 when the selection control signal output from a c-terminal of the managing table 220 represents "1", and selects the image data of the line buffer 14-4 when the selection control signal represents "0".

The logical operation circuit 16 comprises three multiplier 160-i (i=1 to 3) and an adder 161. The logical operation circuit 16 performs a calculation using the interpolative coefficient as described above to thereby reduce and average the image data.

The multiplier 160-1 carries out a multiplying operation between the image data output from the selector 150-1 and the interpolative coefficient output from an α-terminal of the managing table 220. The multiplier 160-2 carries out a multiplying operation between the image data output from the selector 150-2 and the interpolative coefficient output from a β-terminal of the managing table 220. The multiplier 160-3 performs a multiplying operation between the image data output from the selector 150-3 and the interpolative coefficient output from a γ-terminal of the managing table 220.

The adder 161 performs an adding operation of the multiplied results which are output from the multipliers 160-1 to 160-3. As a result the reducing and averaging operation of the image data is performed.

The interpolative coefficient generating circuit 22 comprises a managing table 220, two counters 221 and 222 and a selector 223.

The managing table 220 manages the selection control signals to be supplied to the selector 150-i and the interpolative coefficients to be supplied to the multiplier 160-i every mode data. Further, the managing table 220 manages an identifying clock number (hereinafter referred to as "LWT") corresponding to the specified clock number of the horizontal synchronizing signal of the television signal. The interpolative coefficient and the identifying clock number are specified in accordance with the developing format of the image data stored in the VRAM 2, and have periodicity to the horizontal synchronizing signal of the television signal.

The counter 221 cyclically counts the horizontal synchronizing signal of the television signal to cyclically output "0" and "1". The counter 222 cyclically counts the horizontal synchronizing signal of the television signal to cyclically output "0" to "4" in this order. The selector 223 selects a count value of the counter 221 when the mode data represents 640 dots×400 lines. The selector 223 selects a count value of the counter 222 when the mode data represents 640 dots×480 lines. The selector 223 outputs the selected count value to the managing table 220 as an access address of the managing table 220.

The NTSC synchronizing signal circuit 23 is equipped with a counter 230 and a comparator 231.

The counter 230 starts its counting operation of the horizontal synchronizing signal of the television signal with a clock signal, and outputs a clock count value. In this embodiment, the number of clocks from the start of the counting operation of the horizontal synchronizing signal till the end of the counting operation is set to "910", for example. The comparator 231 compares the count value output from the counter 230 with the identifying clock number output from the managing table 220. The comparator 231 instructs the transmission of the image data to a control mechanism (not shown) for the VRAM 2 when the count value output from the counter 230 reaches the identifying clock number.

Next, the interpolative coefficient which is managed by the managing table 220 will be described. When the reduction rate of the line number of the image data and the line number of the television signal is larger than "2/3", image data of three adjacent lines are required to generate a reduced flickerless television signal.

Figure 6:
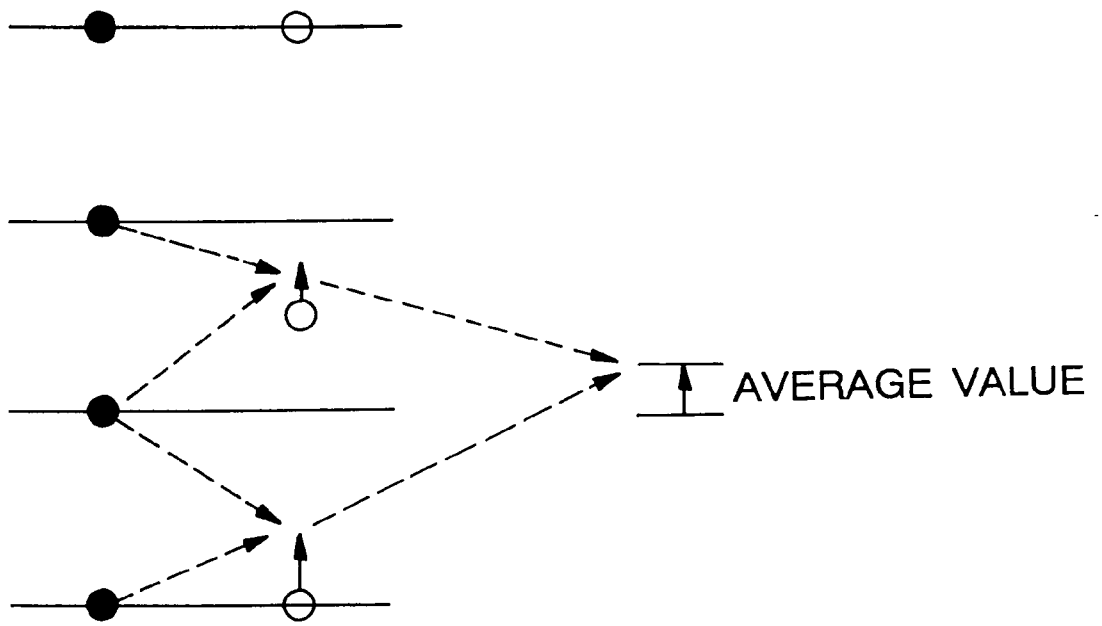
FIG. 6 is an explanatory diagram for calculation of an interpolative coefficient.

More specifically, when the reduction rate of the line number of the image data and the line number of the television signal is "2/3", image data of four lines as indicated by a black circle correspond to reduced image data of three lines as indicated by a white circle in FIG. 6. When the reduction rate of the line number is larger than "2/3", the reduced image data is shifted to a direction as indicated by an arrow.

Accordingly, when the reduction rate of the line number is larger than "2/3", each reduced image data as indicated by a white circle is calculated by linearly interpolating the signal level of the image data of the two adjacent lines. The signal level of the television signal is calculated by averaging the signal level of the reduced image data of the two adjacent lines. Therefore, image data of three adjacent lines are required to generate a reduced flickerless television signal.

Here, representing the ratio of line number between the line number of the image data and the line number of the television signal by "m:n"; the line number of the reduced image data, $L_x$; and the line number of the corresponding image data in the VRAM 2, $l_x$, the following equation is satisfied from the relationship between integer values:

$$l_x = L_x \times (m/n)$$

Further, representing a decimal value of "$L_x \times (m/n)$" by b, the following equation is also satisfied in consideration of the relationship of the decimal value:

$$l_x + b = L_x(m/n).$$

Figure 7:
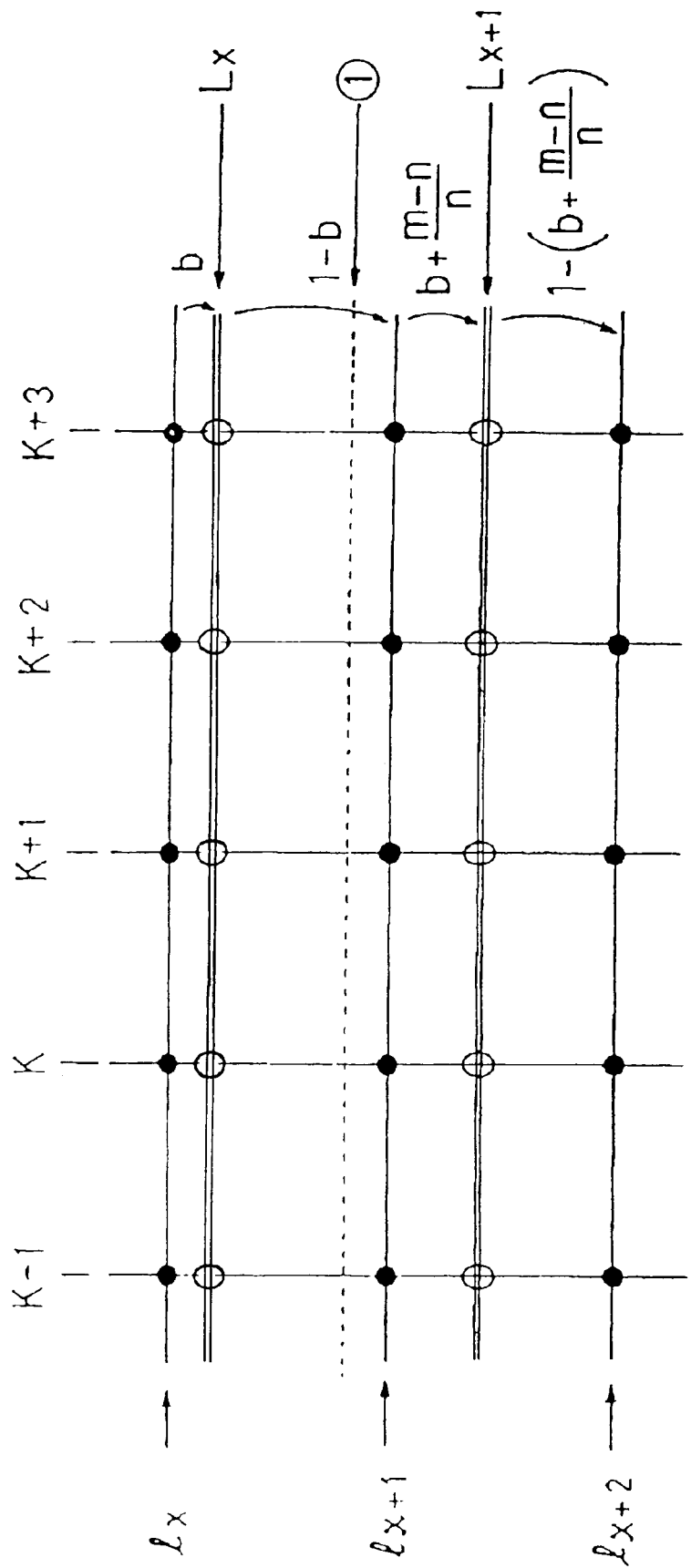
FIG. 7 is another explanatory diagram for calculation of an interpolative coefficient.

More specifically, as shown in FIG. 7, the $L_x$ line of the reduced image data corresponds to a divisional position of "b:(1−b)" between the lines $1_x$ and $l_{x+1}$ of the image data stored in the VRAM 2. However, the dot positions of these image data are coincident with each other. In addition, the following equation is satisfied:

$$(L_x + 1) \times (m/n) = L_x \times (m/n) + (m/n)$$

-continued
$$= l_x + b + (m/n)$$
$$= (l_x + 1) + b + (m/n) - 1.$$

From this equation, as shown in FIG. 7, the $L_{x+1}$ line of the reduced image data corresponds to a divisional position as represented by the following equation 1 between the lines $l_{x+2}$ and $l_{x+1}$ of the image data stored in the VRAM 2.

$$\{b+(m-n)/n\}:\{1-(b+(m-n)/n)\} \quad (1)$$

Here, the dot positions of the reduced image data and the image data stored in the VRAM 2 are coincident with each other. In FIG. 7, a black circle represents an image data before it has been reduced, and a white circle represents a reduced image data.

The signal level of the $L_x$ line of the reduced image data is calculated on the basis of the sum of a value obtained by multiplying the signal level of the $l_x$ line of the image data of the VRAM 2 and a weight value (1−b) and a value obtained by multiplying the signal level of the $l_{x+1}$ line of the image data of the VRAM 2 and a weight value b. That is, the signal level is provided as a linearly-interpolated value.

Further, the signal level of the $L_{x+1}$ line of the reduced image data is calculated on the basis of the sum of a value obtained by multiplying the signal level of the $l_{x+1}$ line of the image data of the VRAM 2 and a weight value as represented by the following equation (2) and a value obtained by multiplying the signal level of the $l_{x+2}$ line of the image data of the VRAM 2 and a weight value as represented by the following equation (3).

$$1-(b+(m-n)/n) \quad (2)$$

$$b+((m-n)/n) \quad (3)$$

The signal level is provided as a linearly-interpolated value.

Accordingly, the average value $D_{0x}$ (the signal level of (1) line in FIG. 7) between the signal level of the $L_x$ line of the reduced image data and the signal level of the $L_{x+1}$ line of the reduced image data is calculated by the following equation (a)

$$D_{0x} = Di_{Lx} \times \alpha_x + Di_{Lx+1} \times \alpha_{x+1} + Di_{Lx+2} \times \alpha_{x+2} \quad (a)$$

Here, $Di_{LX}$ represents the signal level of the $l_x$ line of the image data in the VRAM 2. $Di_{Lx+1}$ represents the signal level of the $l_{x+1}$ line of the image data in the VRAM 2. $Di_{Lx+2}$ represents the signal level of the $l_{x+2}$ line of the image data in the VRAM 2. The interpolative coefficient $\alpha_x$ is equal to $\{(1-b)+0\}/2$. The interpolative coefficient $\alpha_{x+1}$ is equal to a value as represented by the following equation (4)

$$[\{1-(b+(m-n)/n\}+b]/2=\{1-(m-n)/n\}/2 \quad (4)$$

The interpolative coefficient $\alpha_{x+2}$ is equal to a value as represented by the following equation (5)

$$[\{b+(m-n)/n\}+0]/2=\{b+(m-n)n\}/2 \quad (5)$$

Here, the calculation processing is executed at the same dot position.

The managing table 220 manages the interpolative coefficients $\alpha_x$, $\alpha_{x+1}$, $\alpha_{x+2}$ which satisfy the above equations, and also outputs the interpolative coefficients as indicated by the count values of the counters 221 and 222 to the multiplier 160-i. Further, the managing table 220 outputs the selection control signals indicated by the count values of the counters 221 and 222 to the selector 150-i. The managing table 220 manages the identifying clock number to be supplied to the comparator 231, and outputs the identifying clock numbers as indicated by the counters 221 and 222 to the comparator 231 to thereby satisfy the above equations.

FIGS. 8(a) and 8(b) show an embodiment of a managing data of the managing table 220. Here, the data as shown in FIG. 8(a) is managing data used when the image data of the VRAM 2 to be converted adopts a developing format of 640 dots×400 lines. The data as shown in FIG. 8(b) is managing data used when the image data of the VRAM 2 to be converted adopts a developing format of 640 dots×480 lines.

In FIGS. 8(a) and 8(b), a, b and c represent managing data for the selection control signals, and LWT represents managing data for the identifying clock numbers. α, β and γ represent managing data for the interpolative coefficients. The interpolative coefficient is represented with five bits of "X.XXXX" in binary system. Accordingly, for example, "08" is represented by "0.1000", and this value corresponds to "0.5" in decimal system. Further, the sign "–" of the LWT means that data which is an object to be compared in the comparator 231 is not output.

When the image data of the VRAM 2 to be converted has the developing format of 320 dots×200 lines, as described later, the selector 18 as shown in FIG. 4 directly selects the image data which is converted in the RGB matrix circuit 10. Through this operation, the managing table 220 does not manage the managing data corresponding to this developing format.

FIGS. 9 and 10 are flowcharts for the operation of the typically-constructed image conversion processing device. Next, the operation of the image data conversion processing device as shown in FIG. 4 will be described. In FIGS. 9 and 10, the two waveforms (a) show the horizontal synchronizing signal of the television signals. In FIGS. 9 and 10, the two waveforms (b) represent the display sections of the television signal. In FIGS. 9 and 10, the two waveforms (c) represent the vertical display sections of the television signal. FIG. 9, waveform (d) shows the count value of the counter 221, and In FIG. 10, waveform (d) shows the count value of the counter 222.

<Image data of 640 dots×400 lines>

First, the operation of the image data conversion processing device will be described for the case where the image data of the VRAM 2 to be converted has the developing format of 640 dots×400 lines. In this case, the selector 223 selects the count value of the counter 221 which cyclically outputs "0" and "1", and outputs the selected count value to the managing table 220.

For the odd (ODD) field of the television signal as shown in FIG. 8(a), the managing table 220 outputs [LWT=816, a=1, b=1, c=1, α=08, β=08, γ=00] in correspondence with the count value "0", and outputs [LWT=–, a=1, b=0, c=0, α=00, β=08, γ=08] in correspondence with the count value "1".

When the count value of the counter 221 indicates "0", the managing table 220 outputs "LWT=816". In response to "LWT=816", the comparator 231 issues the control mechanism (not shown) for the VRAM 2 with the transmission instruction of the image data sequential to the previous transmission.

In response to the issue of the transmission instruction of the image data, the control mechanism of the VRAM 2 transmits the image data with a slight time loss as indicated by a heavy line of the time chart of FIG. 9. At this time, in the odd field of the television signal, the image data transmitted for about 89 $\mu$SEC period every four lines with the image data of the 0-th line at a transmission starting point. In the even field of the television signal, the image data transmitted for about 89 $\mu$SEC period every four lines with the image data of the first line at the transmission starting point.

In response to the transmitting operation of the image data as described above, as shown in the time chart of FIG. 9, for the odd field of the television signal, the line buffer 14-1 stores the image data of the 0-th line in a first television signal display section more specifically, in a section where the count value of the counter 221 indicates "0". Further, the line buffer 14-2 stores the image data of the first line, and the line buffer 14-3 stores the image data of a second line. Further, the line buffer 14-1 stores the image data of a fourth line in a second television signal display section more specifically in a section where the count value of the counter 221 indicates "1". The line buffer 14-3 stores the image data of the second line, and the line buffer 14-4 stores the image data of a third line. As described above, the line buffer write-in control circuit 21 writes effective image data of three lines into the line buffers in each display section of the television signal.

For the even field of the television signals, the line buffer 14-1 stores the image data of the first line in the first television signal display section more specifically, in the section where the counter 221 indicates "0". The line buffer 14-2 stores the image data of the second line, and the line buffer 14-3 stores the image data of the third line. Further, in the second television display section, more specifically, in the section where the count value of the counter 221 indicates "1", the line buffer 14-1 stores the image data of a fifth line. The line buffer 14-3 stores the image data of the third line, and the line buffer 14-4 stores the image data of the fourth line. As described above, the line buffer write-in control circuit 21 writes effective image data of three lines into the line buffers in each display section of the television signal.

The logical operation circuit 16 receives the image data from the line buffer 14-1 and both of the selection control signal and the interpolative coefficient from the managing table 220. The logical operation circuit 16 reads out the image data stored in the line buffer 14-i for about 45 $\mu$SEC.

For the odd field of the television signal, the logical operation circuit 16 carries out a multiplied value between the image data of the 0-th line and the interpolative coefficient "08" (0.5 in decimal system) in the first television signal display section. Further, the logical operation circuit 16 adds the obtained multiplied value with the multiplied value of the image data of the first line and the interpolative coefficient "08".

Further, the logical operation circuit 16 adds the multiplied value of the image data of the second line and the interpolative coefficient "08" with the multiplied value of the image data of the third line and the interpolative coefficient "08" in the second television signal display section. In the manner described above, the logical operation circuit 16 executes the generation processing of the television signal.

Still further, for the even field of the television signal, the logical operation circuit 16 calculates a multiplied value of the image data of the first line and the interpolative coefficient "08", and adds the obtained multiplied value with the multiplied value of the image data of the second line and the interpolative coefficient "08". In the first television signal display section, the logical operation circuit 16 adds the multiplied value of the image data of the third line and the interpolative coefficient "08" with the multiplied value of the image data of the fourth line and the interpolative coefficient "08". In the manner described above, the logical operation circuit 16 executes the generation of the television signal.

As described above, the image data conversion processing device generates the television signal of 640 dots×400 and applies the interlaced scanning by calculating the average value in signal level between the image data of two adjacent lines as shown in FIG. 11 when the image data of the VRAM 2 to be converted has the developing format of 640 dots×400 lines. Through the averaging operation of the signal level of the image data, the flickerless television signal can be generated.

<Image data of 640 dots×480 lines>

The operation of the image data conversion processing device will be next described for the case where the image data of the VRAM 2 to be converted has the developing format of 640 dots×480 lines. In this case, the selector 223 selects the count value of the counter 22 which cyclically outputs "0" to "4", and outputs the selected count value to the managing table 220. In accordance with the count value, the managing table 220 cyclically outputs the managing data as shown in FIG. 8(b).

Here, the managing table 220 cyclically outputs the managing data at a period corresponding td five horizontal synchronizing signals of the television signal. This results due to the image data of 480 lines are reduced to the television signal of 400 lines in a ratio of 6:5.

The comparator 231 receives the LWT output from the managing table 220. Firstly, the comparator 231 is input with "LWT=196" which is output when the count value of the counter 222 indicates "0". In response to the input of "LWT=196", it issues the transmission instruction of the image data sequential to the previous transmission to the control mechanism of the VRAM 2 when the count value of the counter 230 reaches "196".

Secondly, the comparator 231 is input with "LWT=816" which is output when the count value of the counter 222 indicates "1". In response to the input of "LWT=816", it issues the transmission instruction of the image data sequential to the previous transmission to the control mechanism of the VRAM 2 when the count value of the counter 230 reaches "816".

Thirdly, the comparator 231 is input with "LWT=516" which it outputs when the count value of the counter 222 indicates "3". In response to the input of "LWT=516", it issues the transmission instruction of the image data sequential to the previous transmission to the control mechanism of the VRAM 2 when the count value of the counter 230 reaches "516".

The control mechanism of the VRAM 2 receives the issued instruction, and transmits the image data with slight time loss as indicated by a heavy line of the time chart of FIG. 10. For the odd field of the television signal, the image data is transmitted for about 89 $\mu$SEC every four lines with the image data of the 0-th line at the transmission starting point. Further, for the even field of the television signals, the image data is transmitted for about 89 $\mu$SEC every four lines with the image data of the first line at the transmission starting point.

The line write-in control circuit 21 writes the effective image data of three lines into the line buffers 14-i in each display section of the television signal as shown in the time chart of FIG. 10.

The following matter is apparent from comparison between the time charts of FIGS. 9 and 10. When the image data of the VRAM 2 to be converted has the developing format of 640 dots×480 lines, the comparator 231 issues the transmission instruction of the image data at a shorter period than when the image data has the developing format of 640 dots×400 lines. Upon comparison of the image data transmission in the fourth television signal display section of the odd field for example, the image data of sixth, seventh and eighth lines are stored into the line buffers 14-i as shown in the time chart of FIG. 9 for the developing format of 640 dots×400 lines, whereas the image data of seventh, eighth and ninth lines are stored into the line buffers 14-i as shown in the time chart of FIG. 10 for the developing format of 640 dots×480 lines. As described above, the image data is stored into the line buffers 14-i at higher speed in the developing format of 640 dots×480 lines.

The logical operation circuit 16 reads out the image data stored in the line buffers 14-i for about 45 $\mu$SEC on the basis of the selection control signal and the interpolative coefficient from the managing table 220, and then carries out the logical operation as represented by the equation (a) to thereby generate the television signal.

Through this operation, the image data conversion processing device of the first embodiment carries out the linear interpolation as shown in FIG. 12 to reduce the image data of six lines to the image data of five lines when the image data of the VRAM 2 to be converted has the developing format of 640 dots×480 lines. Further, the image data conversion processing device calculates the average value in signal level of the two adjacent lines of the reduced image data to thereby generate the television signal of 640 dots×400 lines which will be subjected to the interlaced scanning. Through the reducing and averaging operations of the image data, the flickerless television signal having the whole information of the image data of 640 dots×480 lines can be generated.

<Image data of 320 dots×200 lines>

Figure 13:
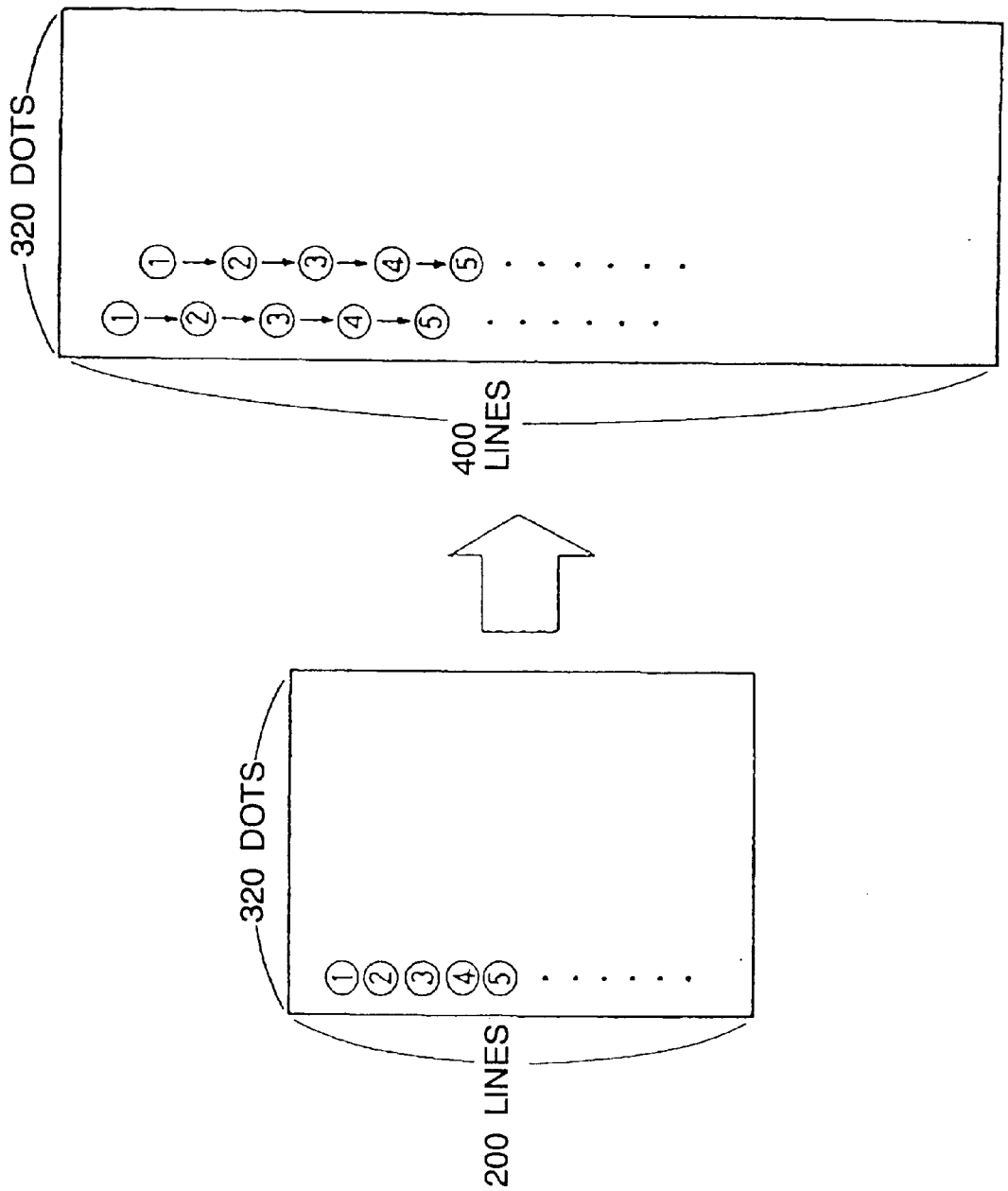
FIG. 13 is another explanatory diagram showing the television signal generating processing.

Next, the case where the image data of the VRAM 2 to be converted has the developing format of 320 dots×200 lines will be described. In this case, as shown in FIG. 13, the control mechanism of the VRAM 2 normally transmits the image data of all of 200 lines in the odd field and also transmits the image data of all of 200 lines in the even field.

In this case, the image data conversion processing device 1 of this invention is not required to be operated. When the mode data represents the developing format of 320 dots×200 lines, the selector 18 as shown in FIG. 4 directly selects the image data to be converted in the RGB matrix circuit 10 to directly output the image data transmitted from the VRAM 2 to the NTSC encoder 19.

When the image data of the VRAM 2 to be converted has the developing format of 320 dots×200 lines, the transmission control processing may be carried out by the image data conversion processing device 1 of this embodiment in place of the control mechanism of the VRAM 2.

Figure 14:
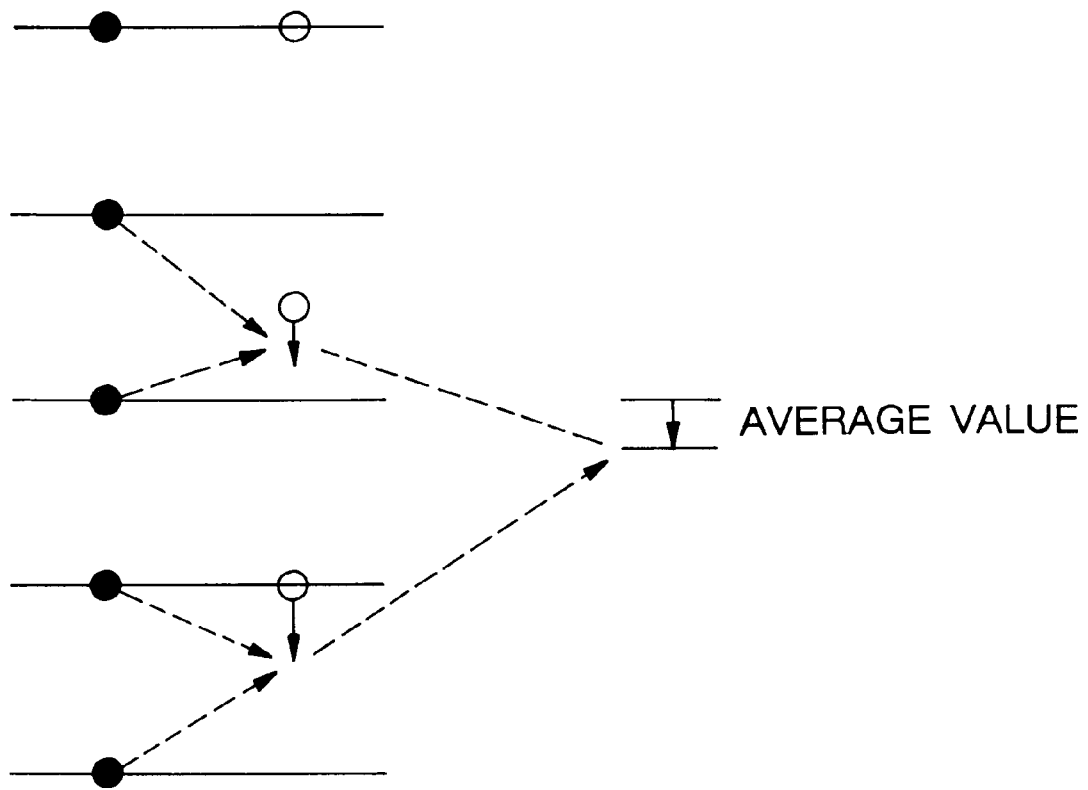
FIG. 14 is an explanatory diagram for introducing an interpolative coefficient.

According to the first embodiment as described above, it is assumed that the reduction rate of the line number of the image data and the line number of the television signal is larger than "⅔". Further, it is assumed that the line number of the image data required to generate the television signal is three lines. This invention is not limited to these values, and may be applied to a case where the reduction rate is smaller than "⅔". In this case, as shown in FIG. 14, the line number of the image data required to generate the television signal is equal to four lines, and thus, the hardware construction and the managing data of the managing table 220 are provided in correspondence with the above line number.

<Second Embodiment>

A second embodiment of the image data conversion processing device of this invention will be next described.

Figure 15:
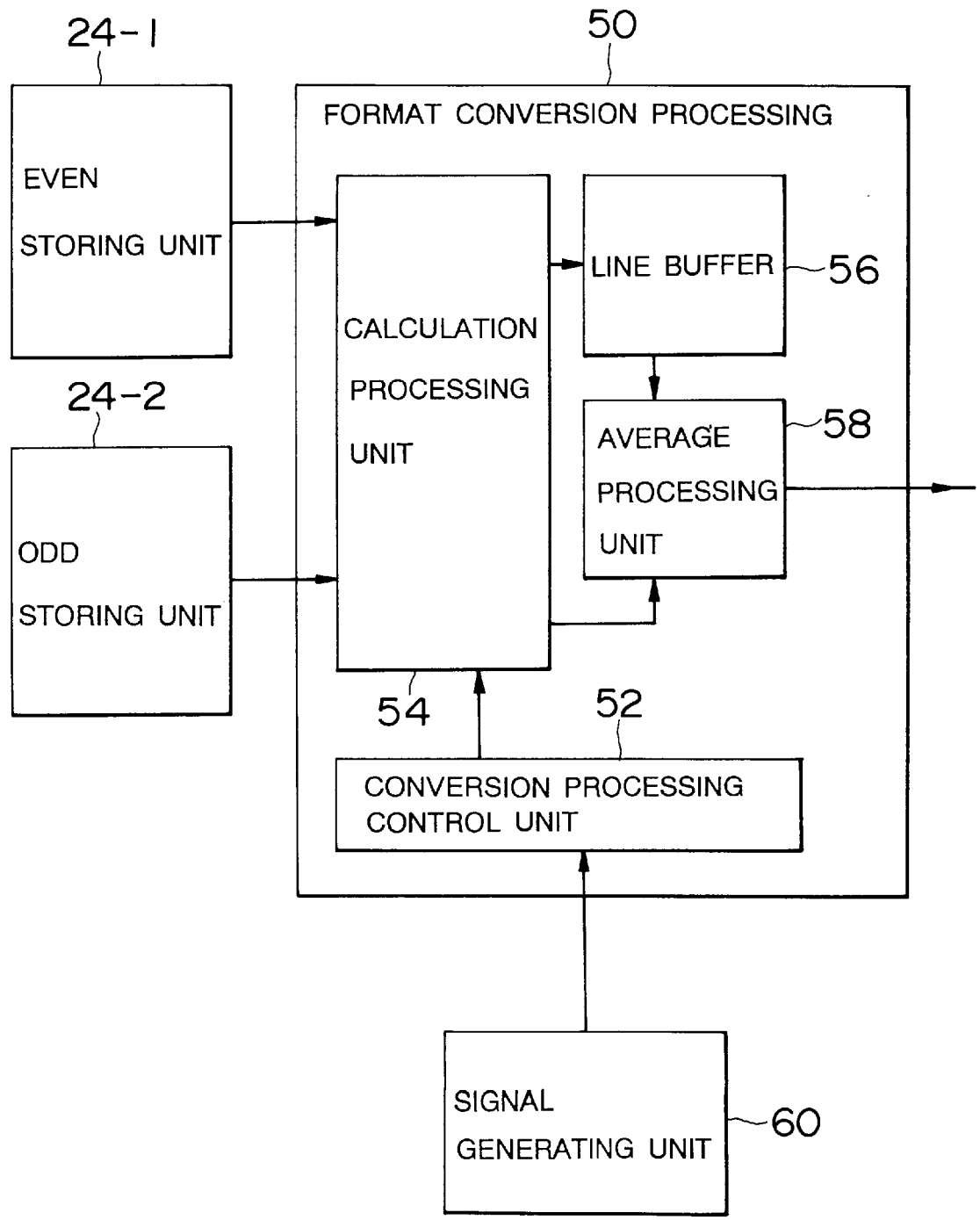
FIG. 15 is a diagram showing the basic construction of the image data conversion processing device according to a second embodiment of this invention.
Figure 16:
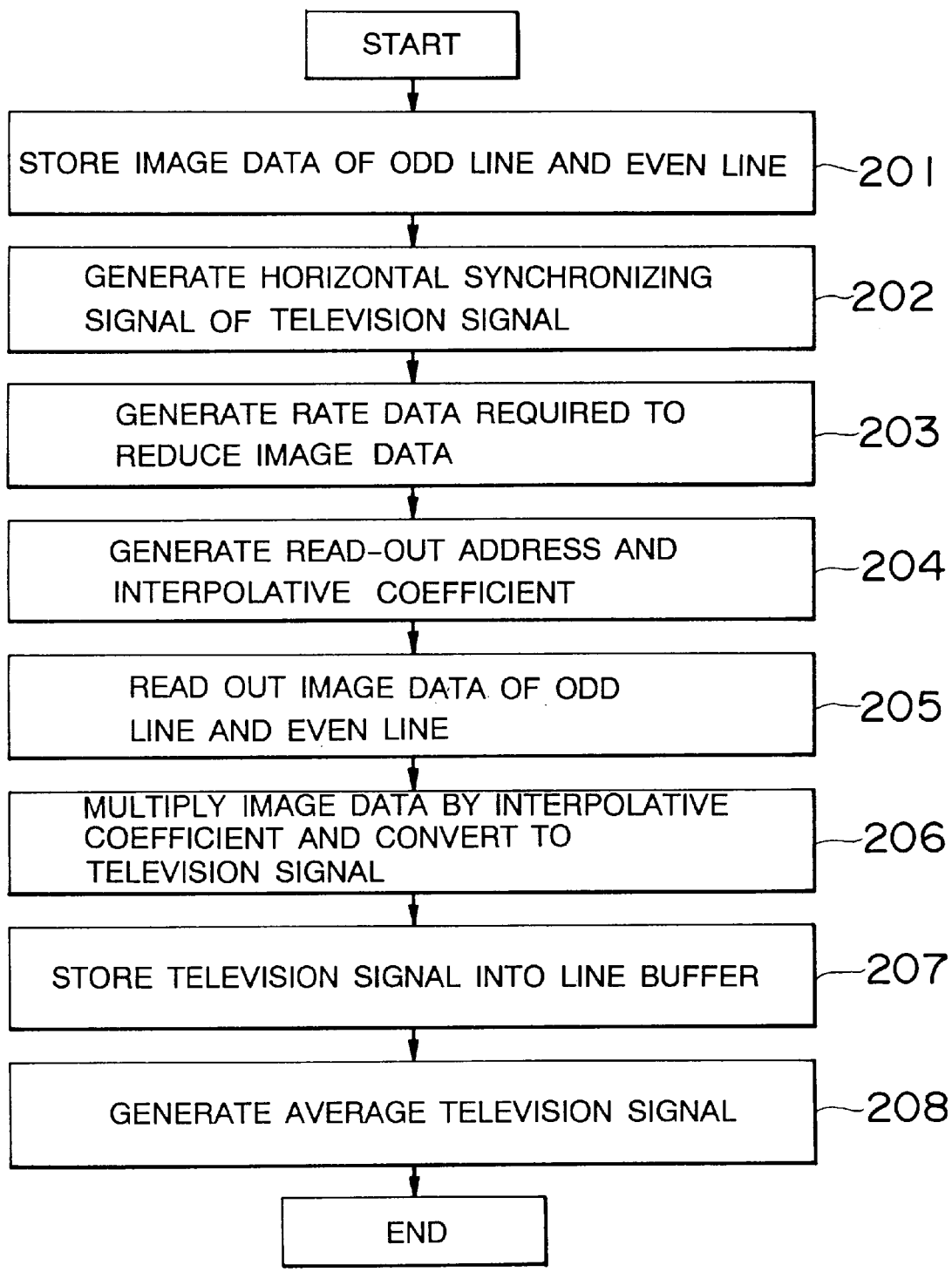
FIG. 16 is a flowchart for the operation of the image data conversion processing device as shown in FIG. 15.

FIG. 15 is a block diagram showing the image data conversion processing device of the second embodiment according to this invention. FIG. 16 is a flowchart for the operation of the image data conversion processing device as shown in FIG. 15.

The image data conversion processing device of this embodiment includes an even storing unit 24-1, an odd storing unit 24-2, a format conversion processing unit 50 and a signal generating unit 60. The device converts the image data, which can be developed in plural kinds of developing formats, into the television signal having a predetermined number of lines.

The even storing unit 24-1 stores image data of even lines in the image data to be converted. Here, the image data is image data in the information processing device 30. The image data comprises plural lines, and each line comprises plural dots. The odd storing unit 24-2 stores image data of odd lines in the image data to be converted.

The signal generating unit 60 generates plural rate data which are determined on the basis of the line number of the image data and the predetermined line number of the television signal in accordance with the plural kinds of developing formats, and also the horizontal synchronizing signal of the television signal. The signal generating unit 60 outputs the rate data and the horizontal synchronizing signal to the conversion processing control unit 52. Each of the plural rates can have a value which is larger or smaller than "1".

The even storing unit 24-1, the odd storing unit 24-2 and the signal generating unit 60 are connected to the format conversion processing unit 50.

The format conversion unit 50 converts the image data of the even and odd lines supplied from the even storing unit 24-1 and the odd storing unit 24-2 to the television signal format using the horizontal synchronizing signal and the rate data corresponding to the developing format of the image data to be converted. The format conversion unit 50 includes the conversion processing control unit 52 and a calculation processing unit 54. The format conversion unit 50 includes a line buffer 56 and an average processing unit 58.

The conversion processing control unit 52 receives the horizontal synchronizing signal and the rate data corresponding to the developing format of the image data to be converted from the signal generating unit 60. On the basis of the rate data and the horizontal synchronizing signal, the conversion processing control unit 52 generates a read-out address for reading out the image data of adjacent odd and even lines stored in the even storing unit 24-1 and the odd storing unit 24-2 and an interpolative coefficient which will be used to convert the image data to the television signal. The calculation processing unit 54 is connected to the conversion processing control unit 52, the even storing unit 24-1 and the odd storing unit 24-2.

The calculation processing unit 54 reads out the image data of two adjacent odd and even lines stored in the two storing units on the basis of the read-out address supplied from the conversion processing control unit 52. The calculation processing unit 54 multiplies the read-out image data by the interpolative coefficient to convert the image data to the television signal.

The line buffer 56 is connected to the calculation processing unit 54, and stores the television signal on a line calculated in the calculation processing unit 54.

The average processing unit 58 is connected to the calculation processing unit 54 and the line buffer 56. The average processing unit 58 calculates the average value of a television signal just before one line which is stored in the line buffer 56 and the television signal obtained in the calculation processing unit 54 to thereby generate an average television signal of one line.

Next, the operation of the second embodiment of the image data conversion processing device having the basic construction as described above will be described. FIG. 16 is a flowchart for the operation of the second embodiment.

First, the image data of even lines in the image data transmitted from a data bus (not shown) is stored in the even storing unit 24-1, and the image data of odd lines in the image data transmitted from the data bus is stored in the odd storing unit 24-2 (step 201).

Subsequently, the signal generating unit 60 generates the horizontal synchronizing signal of the television signal, and outputs it to the conversion processing control unit 52 (step 202). The conversion processing control unit 52 receives the horizontal synchronizing signal and the rate data corresponding to the developing format of the image data to be converted from the signal generating unit 60 (step 203). Subsequently, on the basis of the rate data and the horizontal synchronizing signal from the signal generating unit 60, the conversion processing control unit 52 generates a read-out address for reading out the image data of adjacent odd and even lines stored in the even storing unit 24-1 and the even storing unit 24-2, and an interpolative coefficient for conversion of the image data to the television signal (step 204).

The calculation processing unit 54 reads the image data of adjacent odd and even lines stored in the two storing units on the basis of the read-out address supplied from the calculation processing unit 54 (step 205). The calculation processing unit 54 multiplies the read-out image data by the interpolative coefficient to convert the image data to the television signal (step 206).

The line buffer 56 stores the television signal of the line obtained in the calculation processing unit 54 (step 207). The average processing unit 58 calculates the average value of a television signal just before one line which is stored in the line buffer 56 and the television signal calculated in the calculation processing unit 54 to thereby generate the average television signal of one line (step 208).

B. Image data conversion processing device having typical construction

Figure 17:
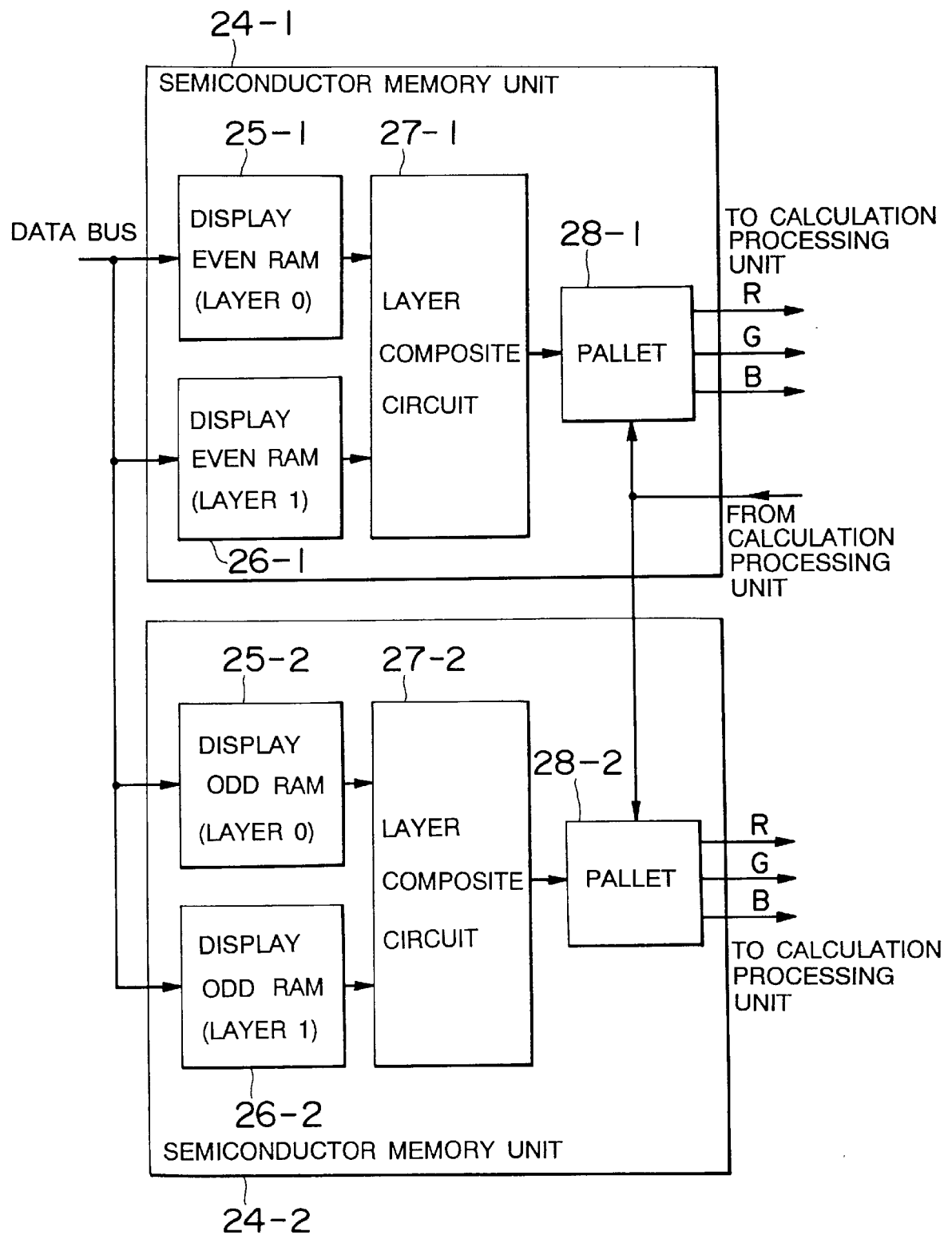
FIG. 17 is a block diagram showing a semiconductor memory unit in the typical construction of the image data conversion processing device according to the second embodiment of this invention.
Figure 18:
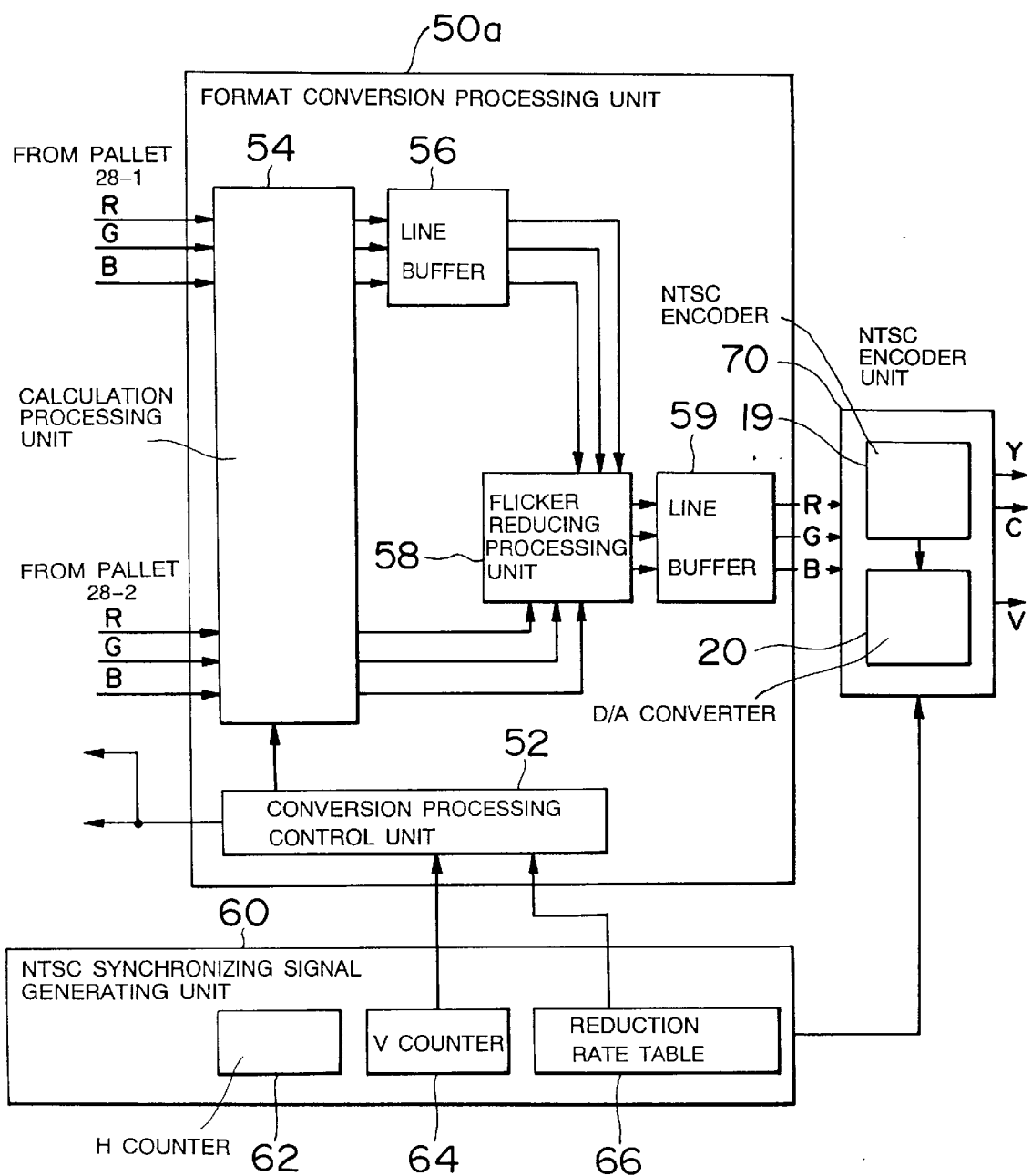
FIG. 18 is block diagram showing a peripheral circuit containing a format conversion processing unit in the typical construction of the image data conversion processing device of the second embodiment of this invention.

Next, the image data conversion processing device having typical construction according to this invention will be described. FIGS. 17 and 18 are block diagrams showing the typical construction of the image data conversion processing device according to the second embodiment of this invention. FIG. 17 is a block diagram showing semiconductor memory units, and FIG. 18 shows peripheral circuits containing a format conversion processing unit.

The image data conversion processing device serves to convert the image data adopting plural kinds of developing formats into the television signal having predetermined number of lines. The image data conversion processing device of this embodiment is provided with semiconductor memory units for EVEN and ODD fields to simplify the construction of the format conversion processing unit.

The image data conversion processing device includes semiconductor memory units 24-1 and 24-2, and a format conversion processing unit 50a. The image data conversion processing device further includes an NTSC synchronizing signal generating unit 60 and an NTSC encoder unit 70. The semiconductor memory unit 24-1 as shown in FIG. 17 stores the image data to be converted, which has 640 dots×480 lines or the like as described in the first embodiment. The semiconductor memory unit 24-1 comprises display EVEN RAMs 25-1 and 26-1, a layer composite circuit 27-1 and a pallet 28-1.

The display EVEN RAM 25-1 stores image data of EVEN field (second line, fourth line, etc.) of a layer 0 of a two-frame mode at even addresses. The two-frame mode comprises a layer 0 and a layer 1.

The display EVEN RAM 26-1 stores image data of EVEN field of the layer 1 of the two-frame mode at even addresses. The layer composite circuit 27-1 composites the image data of the layers 0 and 1 of the EVEN field. The pallet 28-1 conducts an RGB gradation processing on the image data output from the layer composite circuit 27-1. The pallet 28-1 selects, for example, RGB data of 256 colors and 16 colors from image data of 16000 colors and 4096 colors, respectively.

The semiconductor memory unit 24-1 comprises display ODD RAMs 25-2 and 26-2, a layer composite circuit 27-2, and a pallet 28-2. The display ODD RAM 25-2 stores image data of ODD field (first line, third line, etc.) of a layer 0 of the two-frame mode at odd addresses. The display ODD RAM 26-2 stores image data of ODD field of a layer 1 of the two-frame mode at even addresses. The layer composite circuit 27-2 composites the image data of the layers 0 and 1 of the ODD field. The pallet 28-2 conducts the RGB gradation processing on the image data output from the layer composite circuit 27-2. The pallet 28-2 selects, for example, RGB data of 256 colors and 16 colors from display data of 16000 colors and 4096 colors, respectively.

The NTSC synchronizing signal generating unit 60 generates an NTSC synchronizing signal containing a horizontal synchronizing signal and a vertical synchronizing signal of the television signal. The NTSC synchronizing signal generating unit 60 comprises an H counter 62, a V counter 64 and a reduction rate table 66. The H counter 62 counts the number of clocks of the horizontal synchronizing signal (H-SYNC) of the television signal, and the V counter 64 counts the number of horizontal synchronizing signals. The reduction rate table 66 stores plural reduction rate data which are determined on the basis of a ratio of the line number of the image data and the predetermined line number of the television signal in accordance with the plural kinds of developing formats. The reduction rate table 66 stores reduction rate data for RGB data with which RGB data (for example, 640 dots×400 lines) for a CRT of the information processing device is converted to RGB data (640 dots×400 lines) of the television device 40.

The format conversion processing unit 50a converts the image data of even and odd lines supplied from the semiconductor memory units 24-1 and 24-2 to the format of the television signal using the horizontal synchronizing signal and the reduction rate data corresponding to the developing format of the image data to be converted. The format conversion processing unit 50a includes a conversion processing control unit 52 and a calculation processing unit 54. The format conversion processing unit 50a includes a line buffer 56, a flicker reducing processing unit 58 and line buffer 59.

The conversion processing control unit 52 generates an interpolative coefficient and a semiconductor memory read-out address for a reducing operation of RGB data on the basis of the V count value and the reduction rate data from the NTSC synchronizing signal generating unit 60. The conversion processing control unit 52 outputs the interpolative coefficient and the semiconductor memory read-out address to the calculation processing unit 54.

Figure 19:
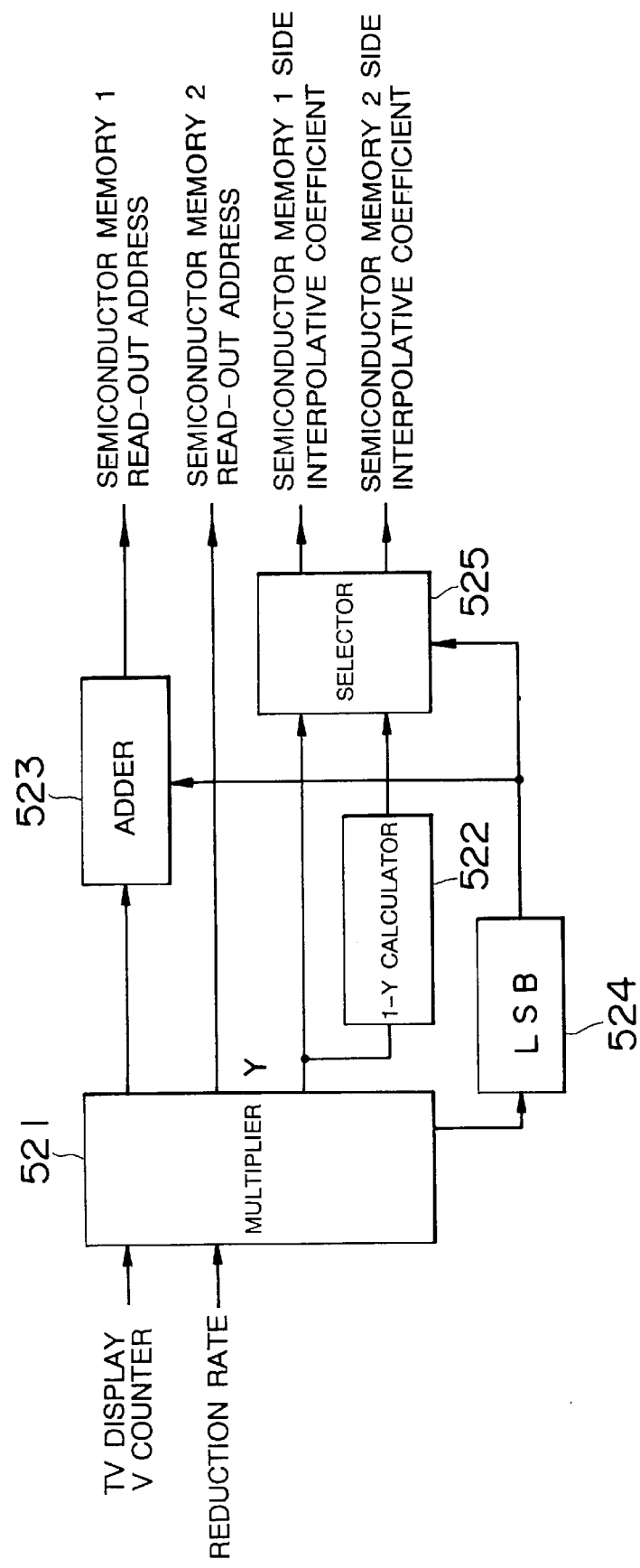
FIG. 19 is a block diagram showing the construction of a conversion processing control unit.

FIG. 19 is a block diagram showing an embodiment of the conversion processing control unit 52. The conversion processing unit 52 includes a multiplier 521, a calculator 522 and an adder 523. The conversion processing control unit 52 has a LSB 524 and a selector 525. The multiplier 521 multiplies the V count value from the V counter 64 and the reduction rate data from the reduction rate table 66 to output the read-out addresses of the semiconductor memory units 24-1 and 24-2 and the interpolative coefficients for the semiconductor memory side.

Here, the decimal part of the multiplied out valve corresponds to the interpolative coefficient. This interpolative coefficient is output from a Y-terminal of the multiplier 521. A (1-Y) calculator 522 subtracts the decimal part of the Y-terminal from "1". The selector 525 carries out its switching operation between "Y" and "1-Y" on the basis of a control signal from the LSB 524 to output the interpolative coefficients of the semiconductor memories 24-1 and 24-2.

The calculation processing unit 54 reads out the RGB data of two lines of adjacent EVEN and ODD fields from the pallets 28-1 and 28-2 on the basis of the semiconductor memory read-out address from the conversion processing control unit 52. The calculation processing unit 54 multiplies the RGB data of the two lines of the EVEN and ODD fields by the interpolative coefficient to thereby reduce the RGB data.

Figure 20:
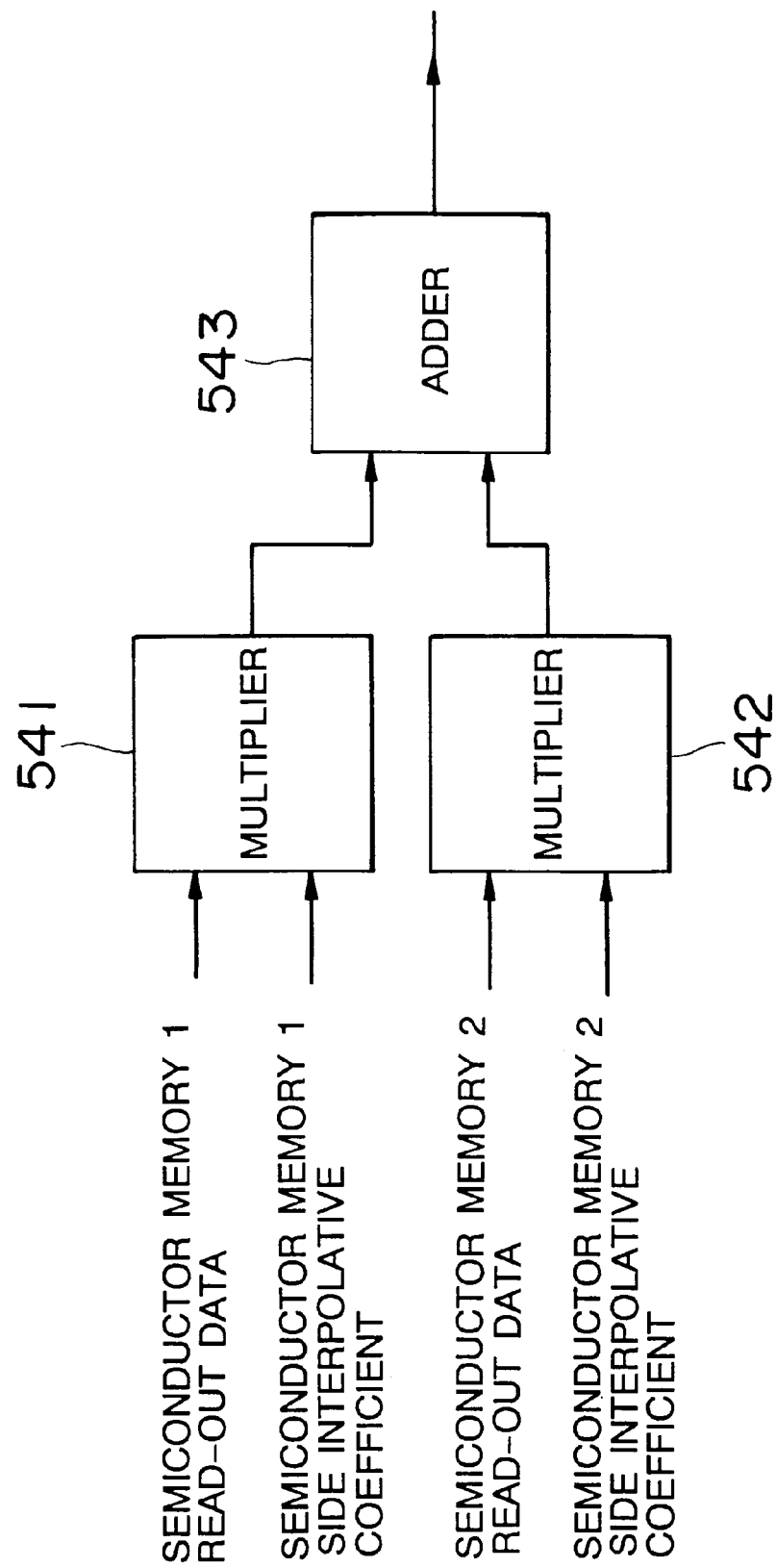
FIG. 20 is block diagram showing the construction of the calculation processing unit.

FIG. 20 is a block diagram showing the construction of the calculation processing unit 54. The calculation processing unit 54 comprises a first multiplier 541, a section multiplier 542 and an adder 543. The first multiplier 541 multiplies the RGB data read out on the basis of the read-out address of the semiconductor memory unit 24-1 by the interpolative coefficient of the semiconductor memory unit 24-1. The second multiplier 542 multiplies the RGB data read out on the basis of the read-out address of the semiconductor memory unit 24-2 by the interpolative coefficient of the semiconductor memory unit 24-2. The adder 543 adds the multiplied output of the multiplier 541 with the multiplied output of the multiplier 542.

The line buffer 56 stores the RGB data calculated in the calculation processing unit line by line. The flicker reducing processing unit 58 averages the RGB data of a line from the line buffer 56 and the RGB data of a line from the calculation processing unit 54 to thereby generate the RGB data of one line. The line buffer 59 stores the RGB data of one line obtained from the flicker reducing processing unit 58. The NTSC encoder 70 has the same construction as the NTSC encoder 19 and the D/A converter 20 of the first embodiment 1 as described above.

Figure 21:
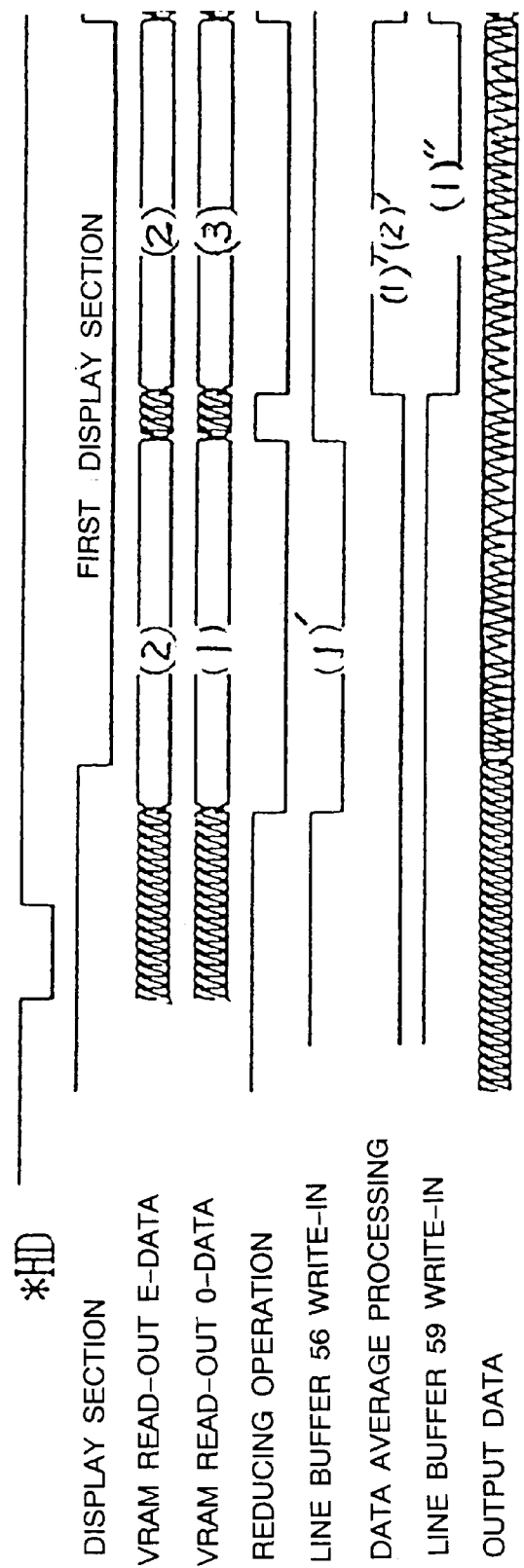
FIG. 21 is a timing chart for a display section of a first television signal of an ODD field.
Figure 22:
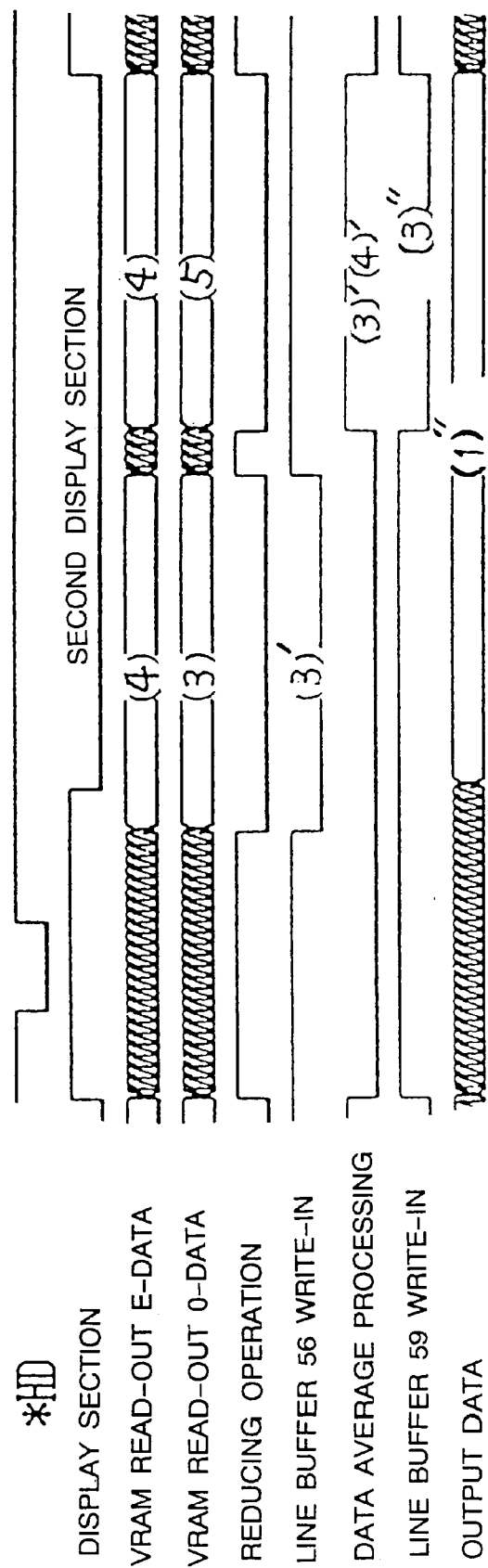
FIG. 22 is a timing chart for a display section of a second television signal of an ODD field.
Figure 23:
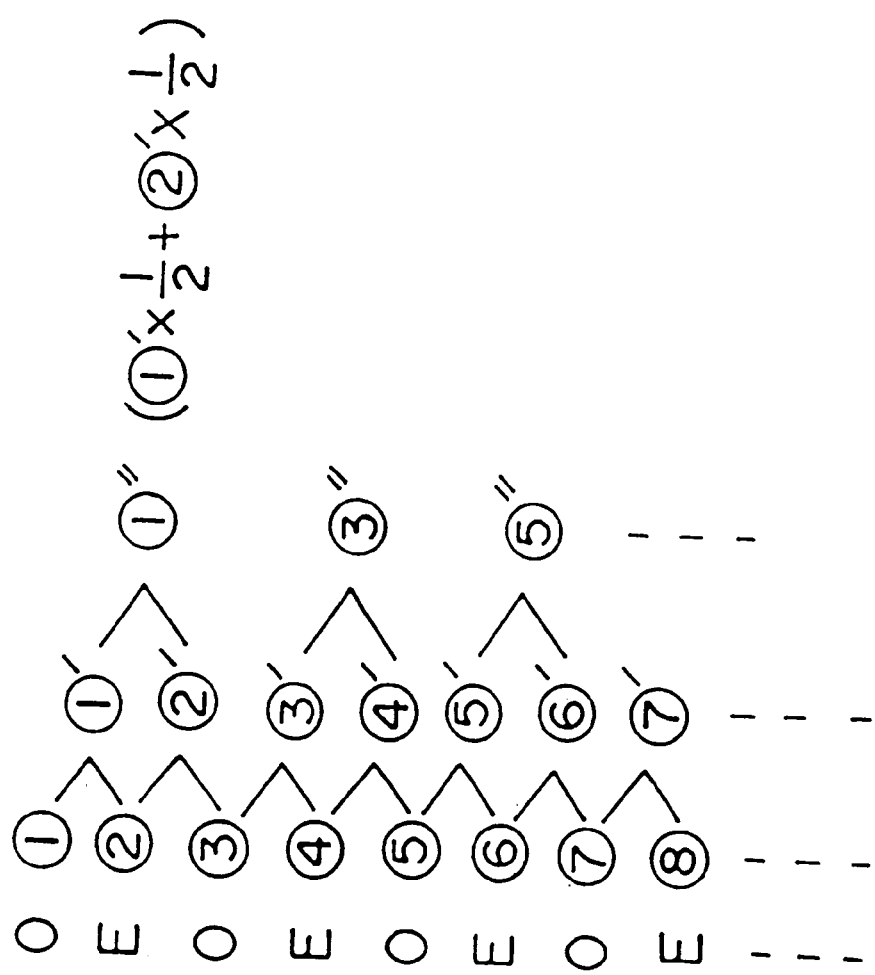
FIG. 23 is a schematic diagram for generation of a television signal of an ODD field.

FIG. 21 is a timing chart for a first display section of the television signal of the ODD field. FIG. 22 is a timing chart for the second display section of the television signal. FIG. 23 is a schematic diagram for generation of the television signal of the ODD field.

Next, the operation of the image data conversion processing device thus constructed will be described. Here, it is assumed that the RGB data for a computer CRT comprises 640 dots×480 lines, and the RGB data for the television device 40 comprises 640 dots×400 lines, for example. In this case, the reduction rate of the image data to be displayed is set to "⅚".

First, the layer composite circuit 27-1 composites the image data of the EVEN field of the layer 0 stored in the display EVEN RAM 25-1 and the image data of the EVEN field of the layer 1 stored in the display EVEN RAM 26-1. The pallet 28-1 conducts the RGB gradation processing on the composite image data to generate RGB data.

The layer composite circuit 27-2 composites the image data of the ODD field of the layer 0 stored in the display ODD RAM 25-2 and the image data of the ODD field of the layer 1 stored in the display ODD RAM 26-2. The pallet 28-2 conducts the RGB gradation processing on the composite image data to generate RGB data.

Next, the number of horizontal synchronizing signals counted by the V counter 64, that is, the V count value is output to the conversion processing control unit 52. A desired reduction rate is output from the reduction rate table 66 to the conversion processing control unit 52.

Figure 24:
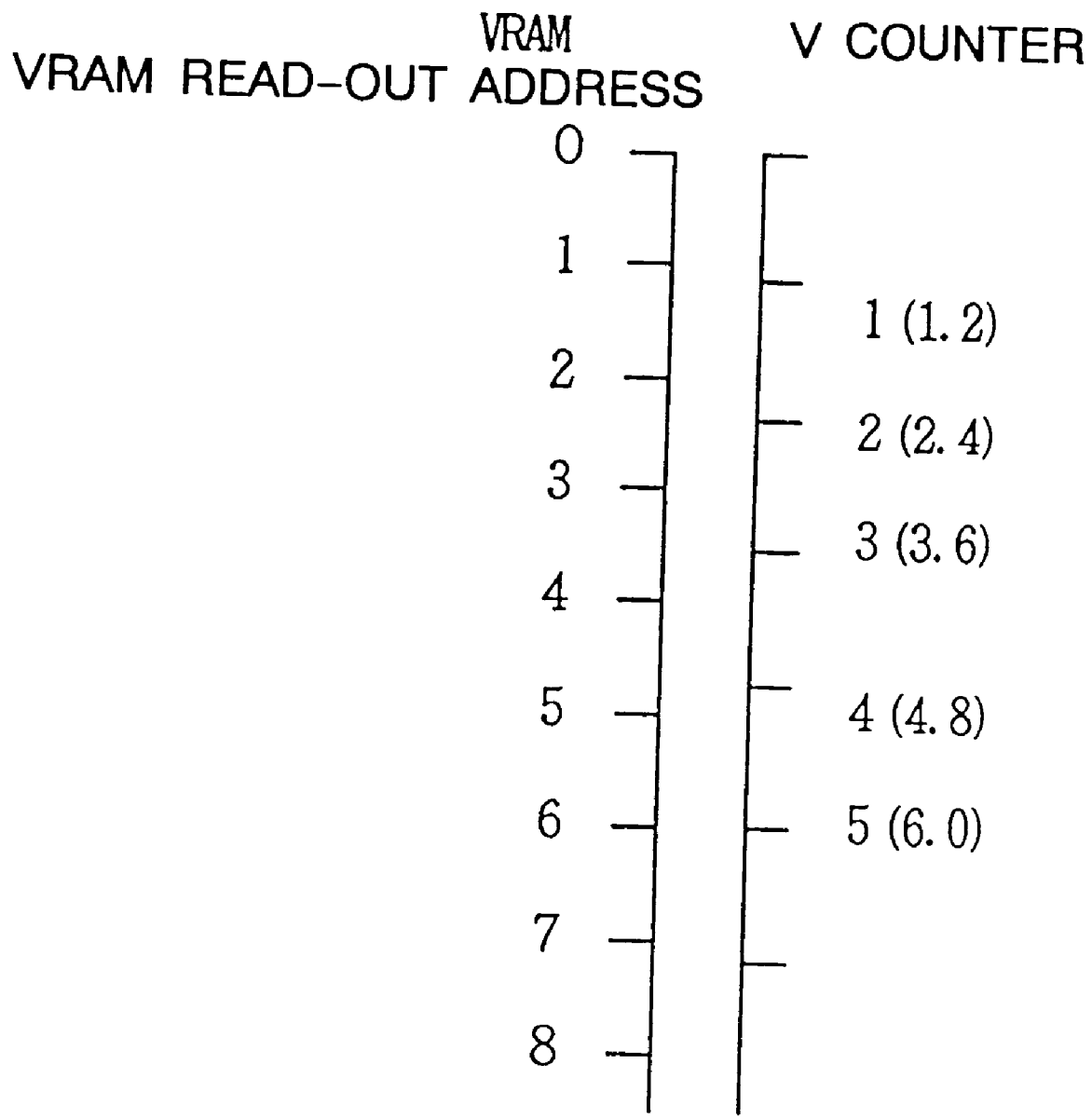
FIG. 24 is a diagram for calculation of a semiconductor memory read-out address and an interpolative coefficient.

Further, in the conversion processing control unit 52, the multiplier 521 multiplies the V count value from the V counter 64 and the reduction rate data from the reduction rate table 66 to obtain the semiconductor memory read-out address and the semiconductor memory side interpolative coefficient. FIG. 24 is a diagram for the calculation of the semiconductor memory read-out address and the interpolative coefficient.

First, at the first timing, the value of the V counter 64 is equal to "1". In this case, the multiplier 521 performs the following calculation:

One line×1/(5/6)=1.2

In FIG. 24, the numerical value representing the VRAM read-out address represents a line to be read out from the pallet. The numerical value of the V counter 64 represents the count value as described above. The numerical value in parentheses represents a display position. When the V count value is "1" for example, the display position is "1.2". For the V count value of "5", the display position is "6".

The read-out address becomes "1" and "2" on the basis of constant value of 1.2. Accordingly, as shown in FIG. 21, a (2) line corresponding to the read-out address "2" is read out from the pallet 28-1 of the EVEN field, and a (1) line corresponding to the read-out address "1" is read out from the pallet 28-2 of the ODD field.

Further, the interpolative coefficient "0.2" is output from the Y-terminal of the multiplier on the basis of the constant value of "1.2". The result of the (1-Y) calculator 522 is equal to 0.8. Through the switching operation of the selector 525, the interpolative coefficient of the semiconductor memory unit 24-1 is equal to 0.2. The interpolative coefficient of the semiconductor memory unit 24-2 is equal to 0.8.

The multiplier 541 multiplies the RGB data of the (2) line of the pallet 28-1 of the EVEN field by the interpolative coefficient "0.2" of the semiconductor memory unit. The multiplier 542 multiplies the RGB data of the (1) line of the pallet 28-2 of the ODD field by the interpolative coefficient "0.8" of the semiconductor memory unit 24-2. The adder 543 adds the multiplied output of the multiplier 541 with the multiplied output of the multiplier 542. The added output is represented as follows.

1×0.8+2×0.2=1.2

That is, the calculation processing unit 54 obtains reduced RGB data of (1)' line which corresponds to the display position "1.2". This RGB data is written in the line buffer 56 as shown in FIG. 21.

Subsequently, at the second timing, the value of the V counter 64 is equal to "2". In this case, the multiplier 521 performs the following calculation.

two lines×1/(5.6)=2.4

The read-out address is equal to "2" and "3" on the basis of a constant value of 2.4. Accordingly, as shown in FIG. 21, the RGB data of the (2) line of the EVEN field is used. Further, a (3) line corresponding to the read-out address "3" is read out from the pallet 28-2 of the ODD field.

On the basis of a decimal part of the constant value "2.4", the interpolative coefficient "0.4" is output from the Y-terminal of the multiplier. The result of the (1-Y) calculator 522 is equal to 0.6, and the interpolative coefficient of the semiconductor memory unit 24-1 is equal to 0.6 through the switching operation of the selector 525. The interpolative coefficient of the semiconductor memory unit 24-2 is equal to 0.4.

The multiplier 541 multiplies the RGB data of the (2) line of the pallet 28-1 of the EVEN field by the interpolative coefficient "0.6" of the semiconductor memory unit 24-1. The multiplier 542 multiplies the RGB data of the (3) line of the pallet 28-2 of the ODD field by the interpolative coefficient "0.4" of the semiconductor memory unit 24-2. The adder 543 adds the multiplied output of the multiplier 541 with the multiplied output of the multiplier 542. The added output is represented as follows.

2×0.6+3×0.4=2.4

That is, the calculation processing unit 54 obtains the reduced RGB data of the (2)' line corresponding to the display position 2.4.

Next, the flicker reducing processing unit 58 averages the reduced RGB data of the (1)' line from the line buffer 56 and the reduced RGB data of the (2)' line from the calculation processing unit 54 to thereby generate an average RGB data of one line. Here, the flicker reducing processing unit 58 performs a weighing operation using a weight coefficient "0.5" on the reduced RGB data of each line. The averaged RGB data of a (1)" line is represented as follows.

RGB data of (1)'line×0.5+RGB data of (2)' line×0.5

Through this averaging operation, the flicker which is inherent to the interlaced scanning is suppressed. Further, the line buffer 59 stores the average RGB data of the (1)" line which is obtained in the flicker reducing processing unit 58. In the second display section as shown in FIG. 22, the NTSC encoder 19 converts the average RGB data of the (1)" line read out from the line buffer 59 to YCV data. The D/A converter 20 converts the YCV data from the NTSC encoder 19 to the analog signal and then output the analog signal to the television device 40.

Next, the second display section will be described. First, at a first timing, the V counter has a count value "3". The multiplier 521 carries out the following calculation.

three lines×1/(5/6)=3.6

The read-out address is equal to "3" and "4" on the basis of a constant value "3.6". Accordingly, as shown in FIG. 22, the RGB data of the (3) line of the ODD field is used. Further, a (4) line corresponding to the read-out address "4" is read out from the pallet 28-2 of the EVEN field. The multiplier 541 multiplies the RGB data of the (4) line of the EVEN field by the interpolative coefficient "0.6". The multiplier 542 multiplies the RGB data of the (3) line of the ODD field by the interpolative coefficient "0.4". The added output is represented as follows.

3×0.4+4×0.6=3.6

That is, the calculation processing unit 54 obtains the reduced RGB data of the (3)' line corresponding to the display position "3.6". As shown in FIG. 22, this RGB data is written in the line buffer 56.

Next, at a second timing, the count value is equal to "4". The multiplier 521 carries out the following calculation.

four lines×1/(5/6)=4.8 the multiplier 521 uses a (4) line of the EVEN field and a (5) line of the ODD field on the basis of a constant value "4.8". The multiplier 541 multiplies the RGB data of the (4) line of the EVEN field by the interpolative coefficient "0.2". The multiplier 542 multiplies the RGB data of the (5) line of the ODD field by the interpolative coefficient "0.8". The added output is represented as follows.

$$4 \times 0.2 + 5 \times 0.8 = 4.8$$

That is, the calculation processing unit 54 obtains the reduced RGB data of a (4)' line corresponding to the display position "4.8".

Next, the RGB data of a (3)" line which is averaged in the flicker reducing processing unit 58 is represented as follows.

$$\text{RGB data of (3)' line} \times 0.5 + \text{RGB data of (4)' line} \times 0.5$$

Further, the line buffer 59 reads out the averaged RGB data of the (3)" line for a next display section period. The averaged RGB data is displayed on the television device 40 through the NTSC encoder 19 and the D/A converter 20.

Through the above operation, as shown in FIG. 23, the average RGB data of the lines (1)", (3)", (5)", . . . of the ODD field are successively displayed on the television device 40.

Figure 25:
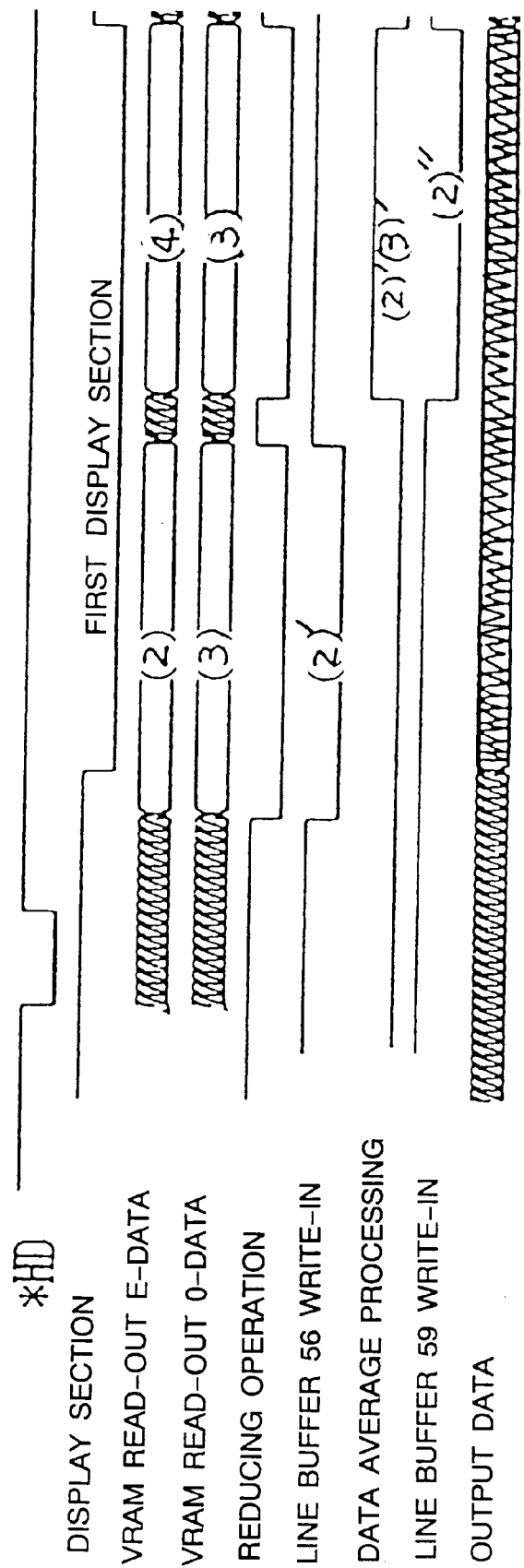
FIG. 25 is a timing chart for a display section of a first television signal of an EVEN field.
Figure 26:
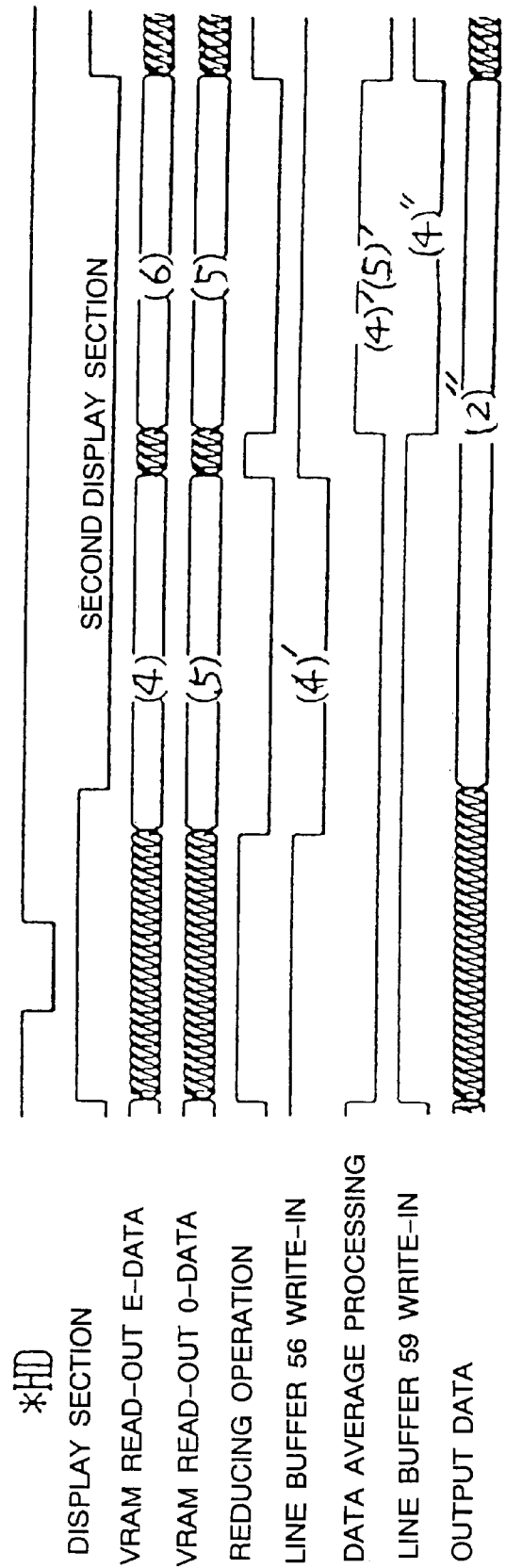
FIG. 26 is a timing chart for a display section of a second television signal of an EVEN field.
Figure 27:
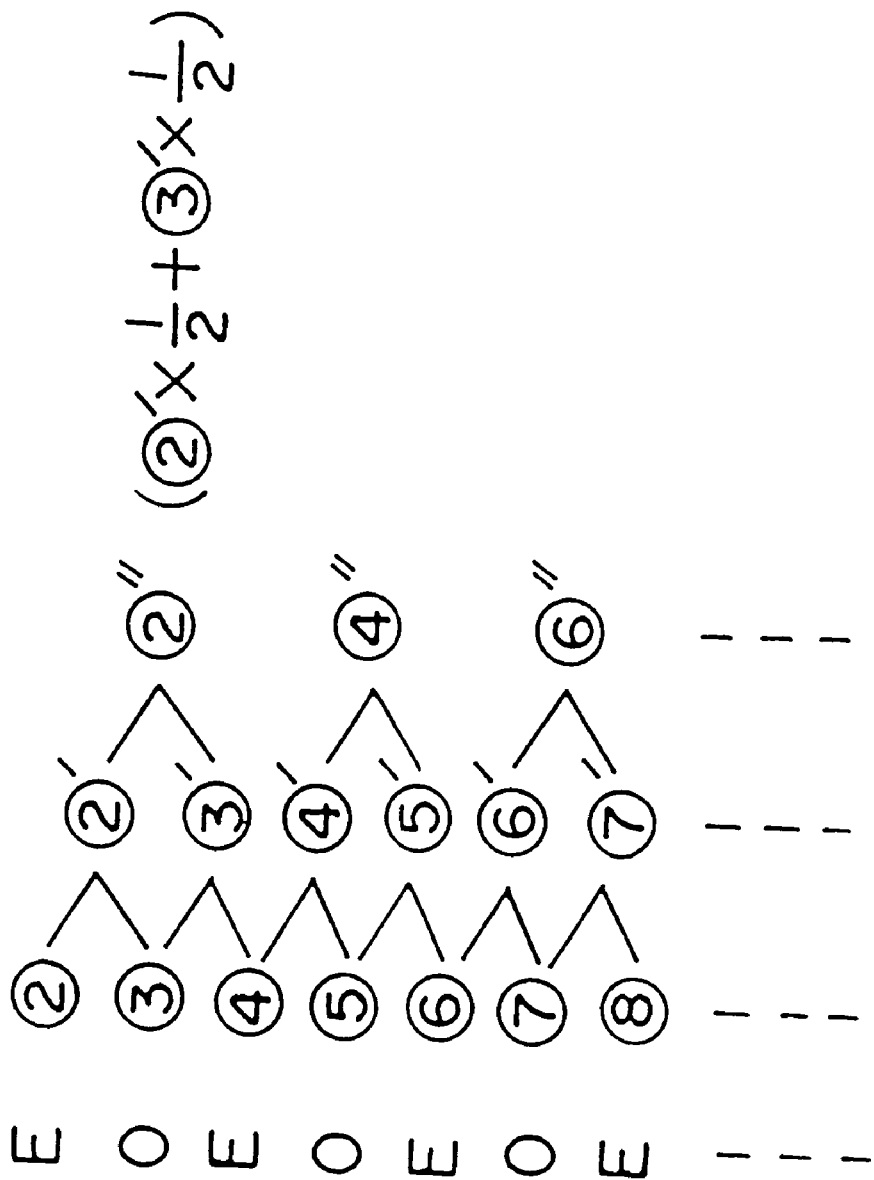
FIG. 27 is schematic diagram for generation of a television signal of an EVEN field.

FIG. 25 is a timing chart for the first display section of the television signal of the EVEN field. FIG. 26 is a timing chart for the second display section of the television signal of the EVEN field, and FIG. 27 is a schematic diagram for generation of the television signal of the EVEN field.

Next, the operation of the EVEN field will be described with reference to FIGS. 25 to 27.

First, the V count value of the V count 64 is initially equal set to "2". At a first timing of the first display section, the calculation processing unit 54 reads out the (2) line of the EVEN field and the (3) line of the ODD field.

Subsequently, the calculation processing unit 54 obtains the reduced RGB data of the (2)' line corresponding to the display position "2.4". The reduced RGB data is written in the line buffer 56.

Subsequently, at a second timing, the V count value of the V count 64 is set to "3". As shown in FIG. 26, the (4) line of the EVEN field is read out, and the (3) line of the ODD field is used. The calculation processing unit 54 obtains the reduced RGB data of the (3)' line corresponding to the display position "3.6". Further, the flicker reducing processing unit multiplies both of the reduced RGB data of the (2)' line and the reduced RGB data of the (3)' line by a weight coefficient "0.5" to obtain the averaged RGB data of the (2)" line. Likewise, in the second display section, the data of the (4)" line is obtained as shown in FIG. 26.

Through the above operation, as shown in FIG. 27, the average RGB data of the lines (2)", (4)", (6)", . . . of the EVEN field are successively displayed on the television device 40, and one frame is displayed with the ODD field as shown in FIG. 23 and the EVEN field as shown in FIG. 27.

According to the second embodiment as described above, the whole image to be displayed on the CRT is displayed on the television device by reducing the image of an information processing device such as a personal computer. Therefore, an expensive CRT is not required to be provided. Further, flicker is unremarked on the television device because it is suppressed.

In the first embodiment 1, the four line buffers 14, the selector 15 and the logical operation circuit 16 are provided for each field, and thus the construction is complicated. In the second embodiment, the semiconductor memory units 24 are provided for the EVEN field and the ODD field, so that the construction of the calculation processing unit 54 and the line buffers 56 of the format conversion processing unit 50 is simplified. Further, unlike the first embodiment, it is unnecessary to carry out the calculation processing at high speed during a timing period because the construction of the format conversion processing unit 50 is simplified.

<Construction of First Modification of Second Embodiment>

Figure 28:
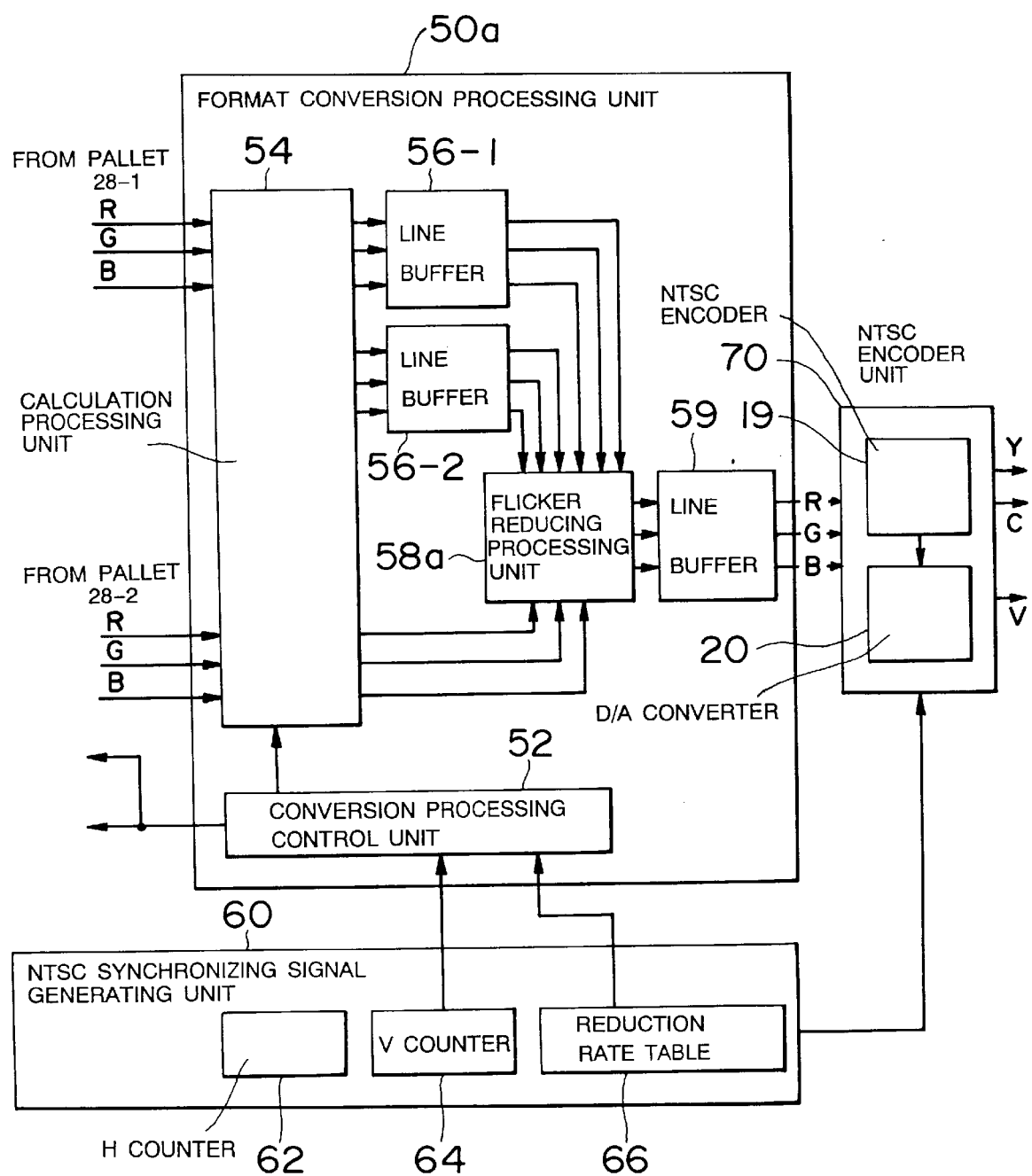
FIG. 28 is a block diagram showing the construction of a first modification of the second embodiment.

FIG. 28 is a block diagram of the first modification of the second embodiment. The first modification is different from the second embodiment in the construction of the format conversion processing unit. The format conversion processing unit 50a of this modification includes a conversion processing control unit 52 and a calculation processing unit 54. The format conversion processing unit 50a further includes line buffers 56-1 and 56-2 and a line buffer 59, and a flicker reducing processing unit 58a. The line buffer 56-1 stores the RGB data of an n-th line from the calculation processing unit 54. The line buffer 56-2 stores the RGB data of an (n+1)-th line from the calculation processing unit 54. Here, n represents a positive integer.

The flicker reducing processing unit 58a averages the RGB data of three lines of the line buffers 56-1 and 56-2 and the pallet 28-2. The other construction is identical to that of the second embodiment, and the same elements are represented by the same reference numerals.

Figure 29:
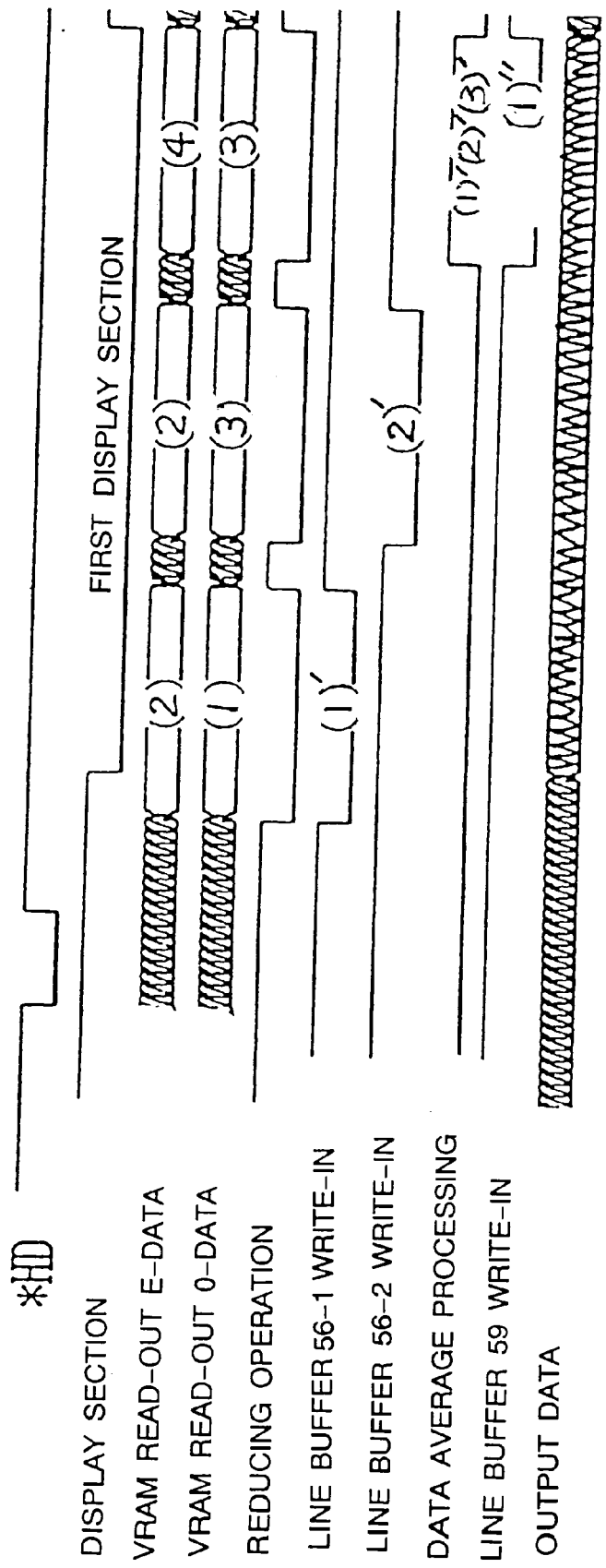
FIG. 29 is a timing chart for a display section of a first television signal of an ODD field of the first modification.
Figure 30:
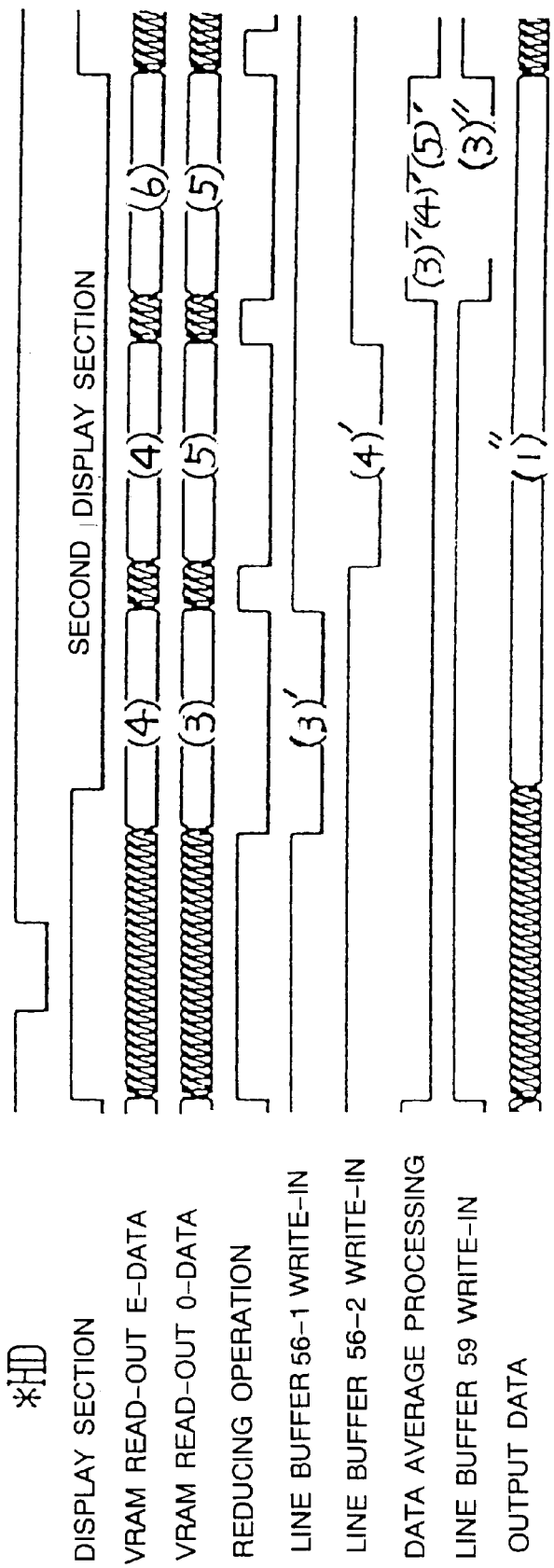
FIG. 30 is a timing chart for a display section of a second television signal of an ODD field of the first modification.
Figure 31:
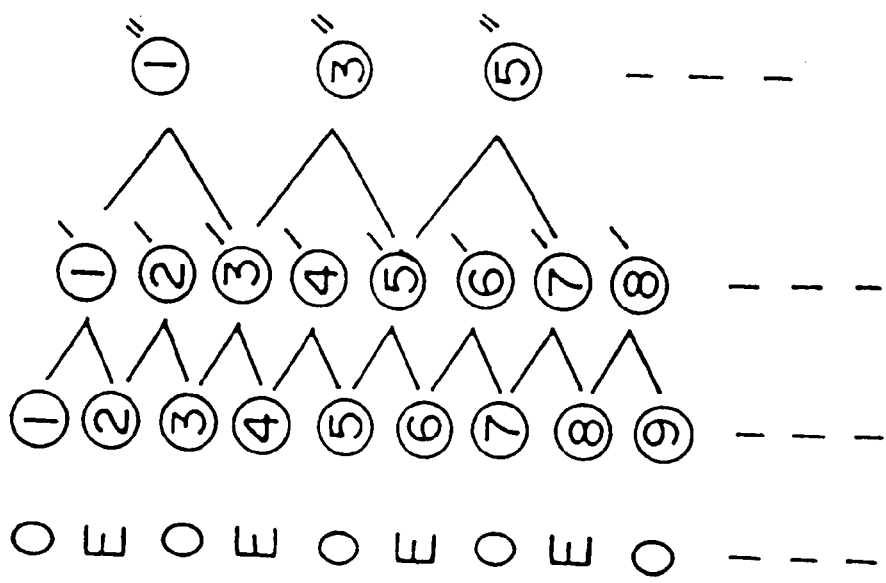
FIG. 31 is a schematic diagram for generation of a television signal of an ODD field.

FIG. 29 is a timing chart for the first display section of the television signal of the ODD field in the first modification of FIG. 29, and FIG. 30 is a timing chart for the second display section of the television signal of the ODD field in the first modification. FIG. 31 is a diagram for generation of the television signal of the ODD field. The reduction rate of the display image data is set to ⅝.

First, at a first timing, the V counter 64 sets its count value to "1". The RGB data of the (2) line of the EVEN field and the RGB data of the (1) line of the ODD field are read out.

Subsequently, the calculation processing unit 54 obtains the reduced RGB data of the (1)' line corresponding to the display position 1.2 on the basis of the RGB data of these two lines. The data is written in the line buffer 56-1.

Subsequently, at a second timing, the V counter sets its count value to "2". The (2) line of the EVEN field is used, and the (3) line of the ODD field is read out. Thereafter, the calculation processing unit 54 obtains the reduced RGB data of the (2)' corresponding to the display position 2.4 on the basis of the RGB data of these two lines. This data is written in the line buffer 56-2.

Next, in the second display section as shown in FIG. 30, at the first timing, the value of the V counter 64 is set to "3". The (4) line of the EVEN field and the (3) line of the ODD field are used. The calculation processing unit 54 obtains the reduced RGB data of the (3)' line corresponding to the display position 3.6 on the basis of the RGB data of these two lines.

Further, the flicker reducing processing unit 58a carries out the following calculation to obtain the RGB data of the (1)" line.

$$\text{RGB data of (1)' line} \times 0.25 + \text{RGB data of (2)' line} \times 0.5 + \text{RGB data of (3)' line} \times 0.25$$

Through the above averaging operation, the flicker inherent to the interlaced scanning is more suppressed in comparison with the second embodiment. Through this operation, as shown in FIG. 31, the averaged RGB data of the lines (1)", (3)", (5)", . . . of the ODD field are successively displayed on the television device 40.

Figure 32:
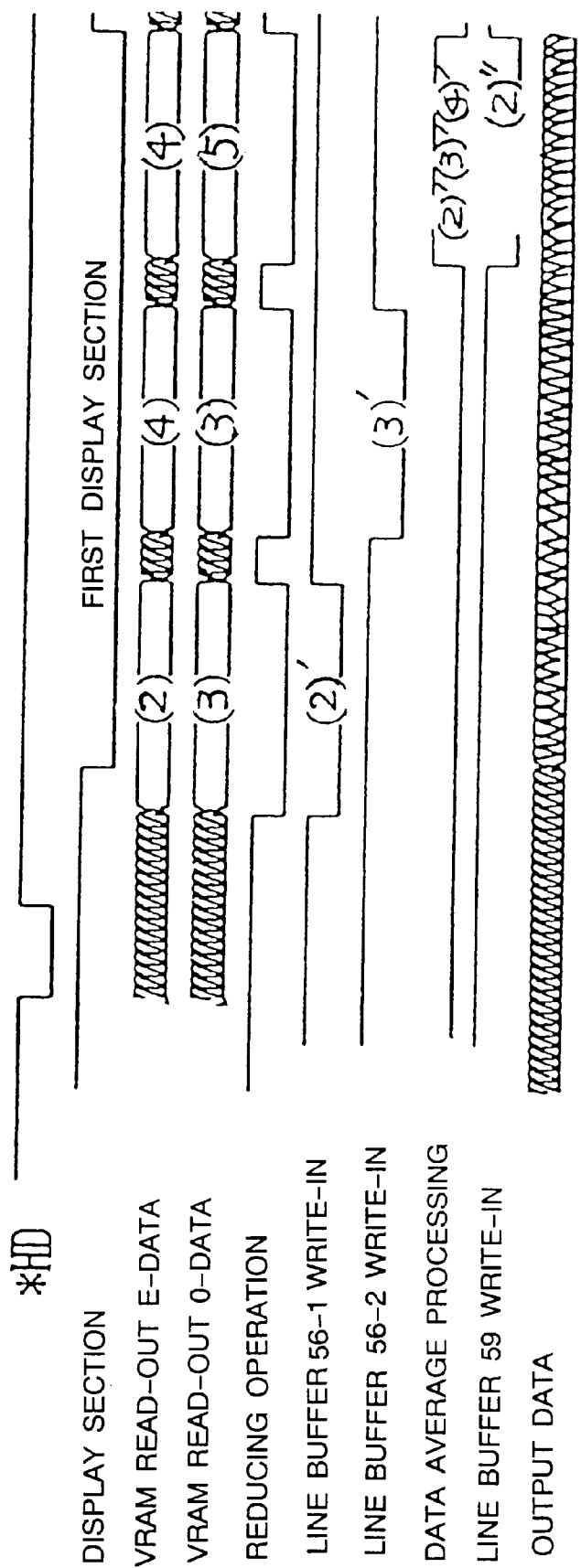
FIG. 32 is a timing chart for a display section of a first television signal of an EVEN field of the first modification.
Figure 33:
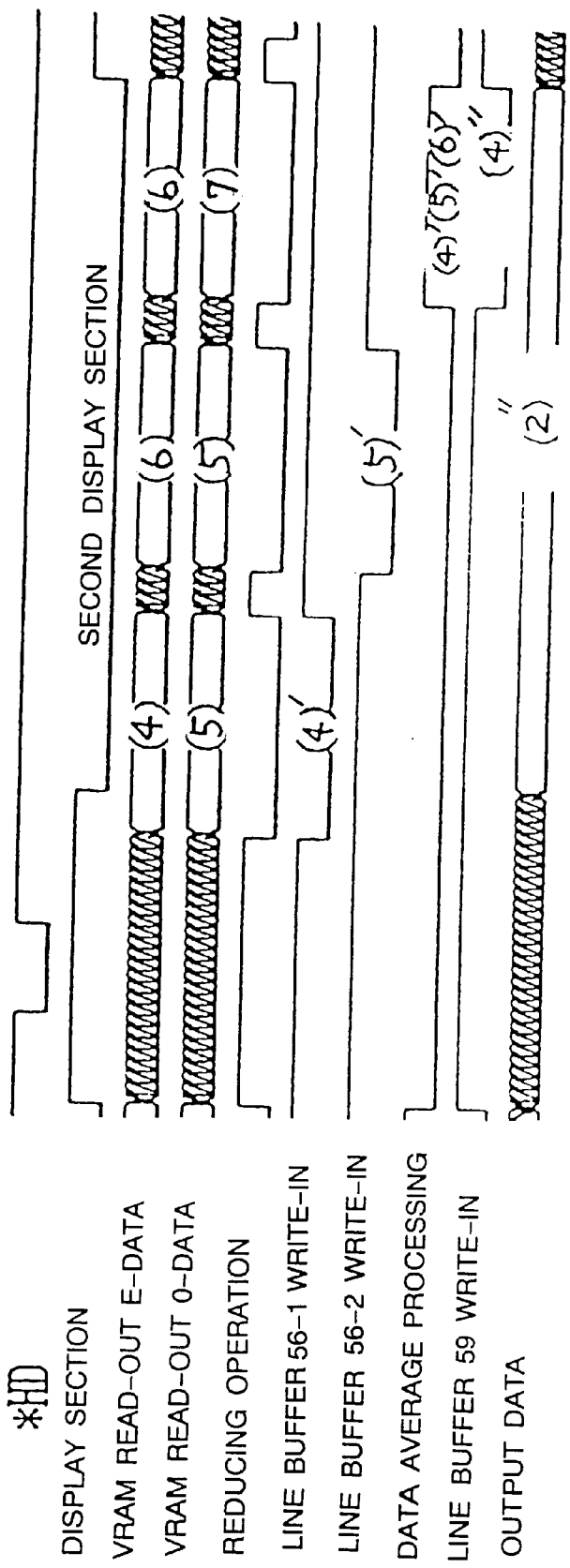
FIG. 33 is a timing chart for a display section of a second television signal of an EVEN field of the first modification.
Figure 34:
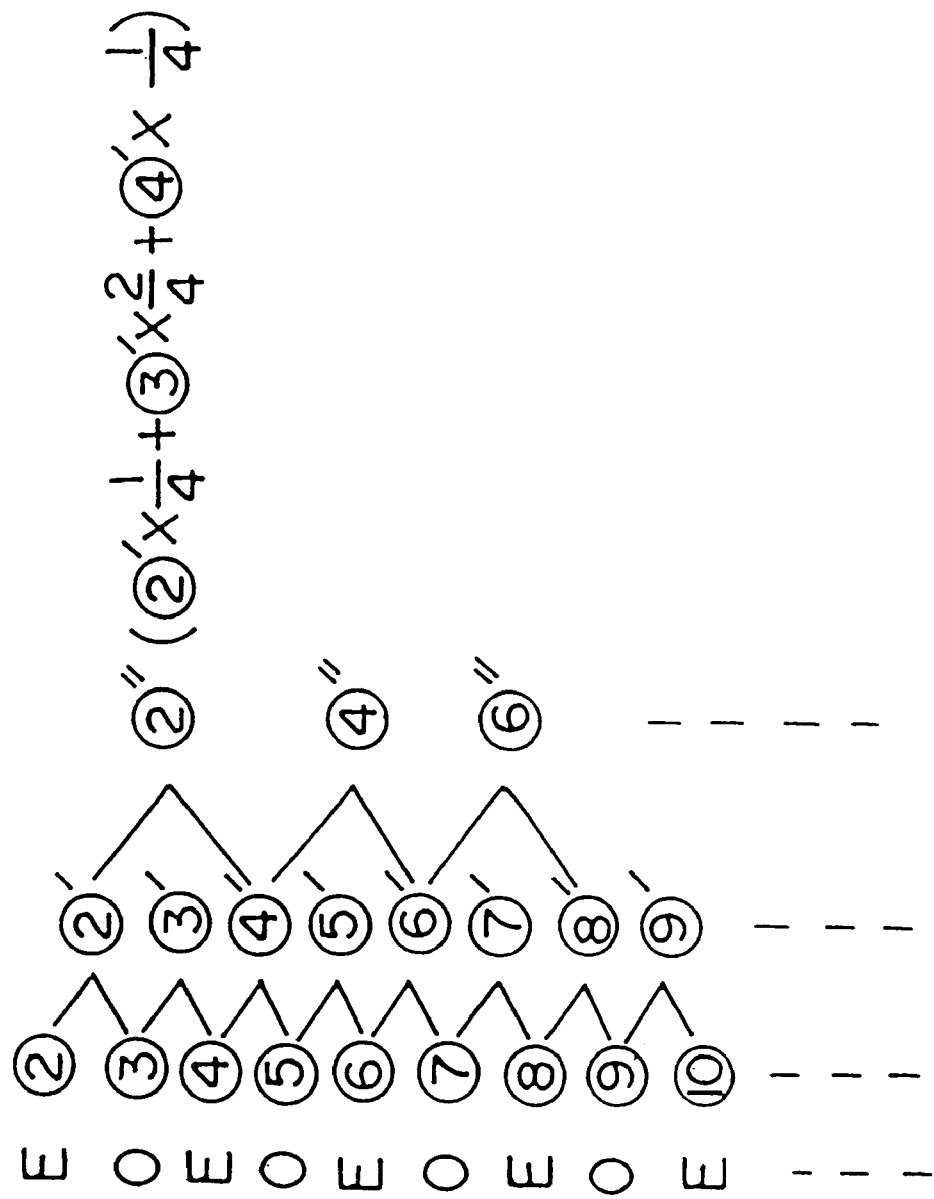
FIG. 34 is a schematic diagram for generation of a television signal of an EVEN field.

FIG. 32 is a timing chart for the first display section of the television signal of the EVEN field in the first modification.
FIG. 33 is a timing chart for the second display section of the television signal of the EVEN field in the first modification.
FIG. 34 is a diagram for generation of the television signal of the EVEN field.

In the same manner, the average RGB data of the lines (2)", (4)", (6)", . . . of the EVEN field are successively displayed on the television device 40.

<Second modification of Second embodiment>

Figure 35:
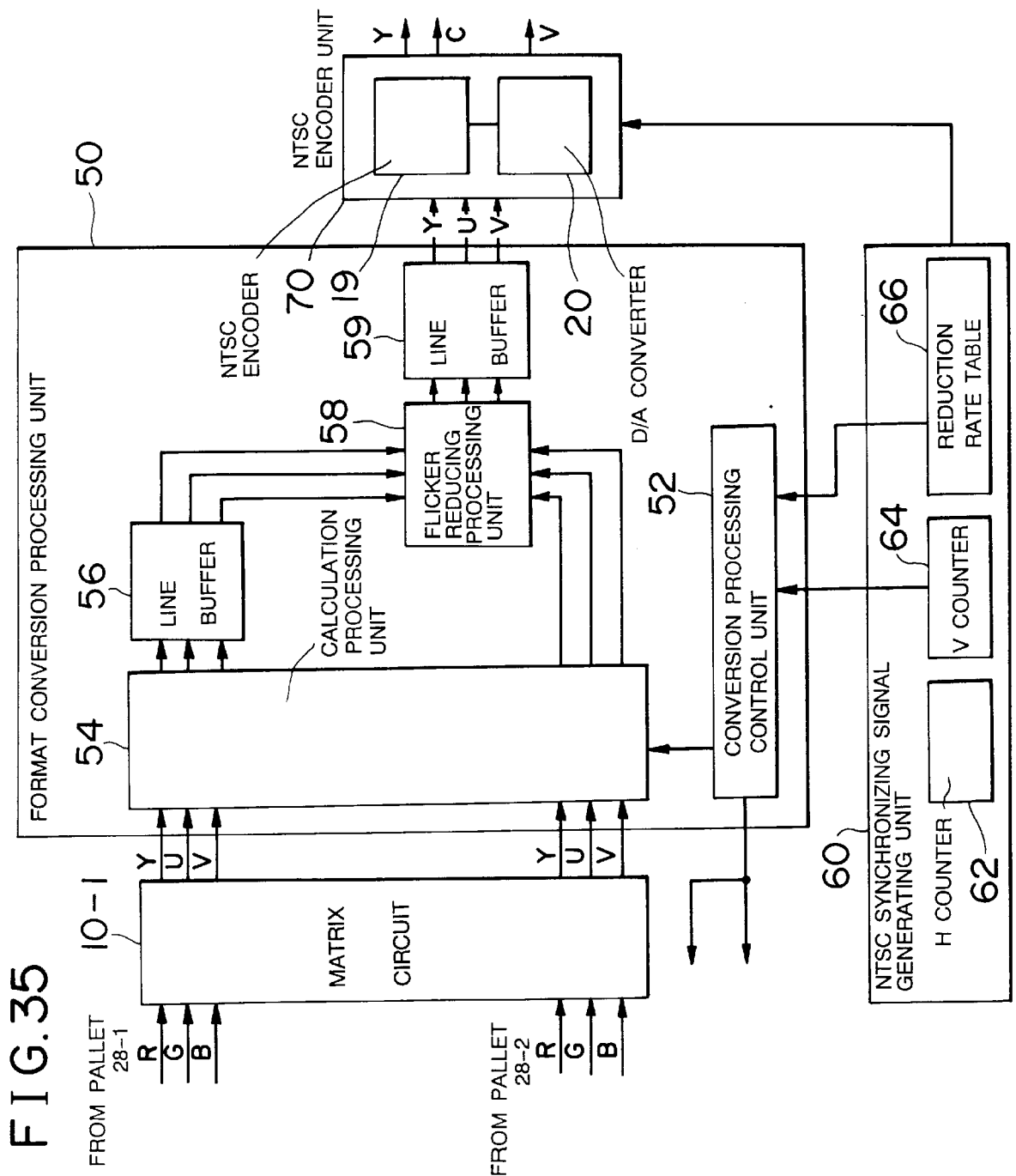
FIG. 35 is a block diagram showing the construction of a second modification of the second embodiment.

FIG. 35 is a block diagram for the construction of the second modification of the second embodiment. The second modification is characterized in that an RGB matrix circuit 10-1 is provided between the semiconductor memory units 24-1 and 24-2 and the format conversion processing unit 50. This RGB matrix circuit 10-1 converts the RGB data from the semiconductor memory units 24-1 and 24-2 to the YUV data. That is, the RGB matrix circuit 10-1 generates a brightness signal Y and a color difference signal, and thus, the memory capacitance of the line buffer 56 can be reduced.

<Modification of Conversion processing control unit>

Figure 36:
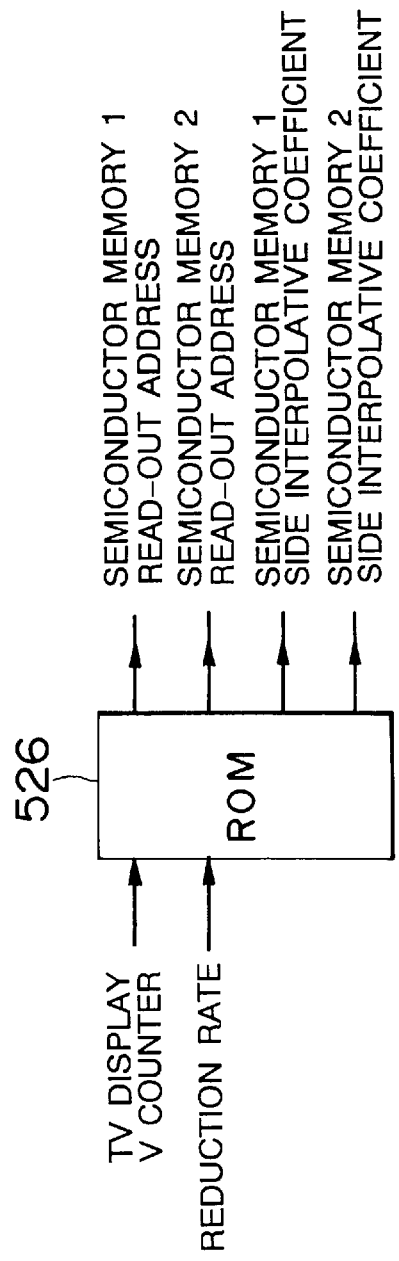
FIG. 36 is a block diagram showing the construction of a conversion processing control unit.

FIG. 36 is a block diagram showing the construction of the conversion processing control unit 52b. The conversion processing control unit 52b includes a read only memory 526 (ROM). The ROM 526 stores the read-out addresses of the semiconductor memory units 24-1 and 24-2 and the interpolative coefficients of the semiconductor memory units 24-1 and 24-2 in correspondence with the count value and the reduction rate.

In this case, when the count value of the V counter 64 and the reduction rate from the reduction rate table 66 are supplied to the ROM 526, the read-out addresses of the semiconductor memory units 24-1 and 24-2 and the interpolative coefficients of the semiconductor memory units 24-1 and 24-2 are read out from the ROM 526.

Through this operation, the conversion processing control unit 52b can increase the processing speed without carrying out the reducing operation of the RGB data. Such a conversion processing control unit 52b may be used in place of the conversion processing control unit of the second embodiment, the first modification of the second embodiment and the second modification of the second embodiment.

<Modification of the calculation processing unit>

Figure 37:
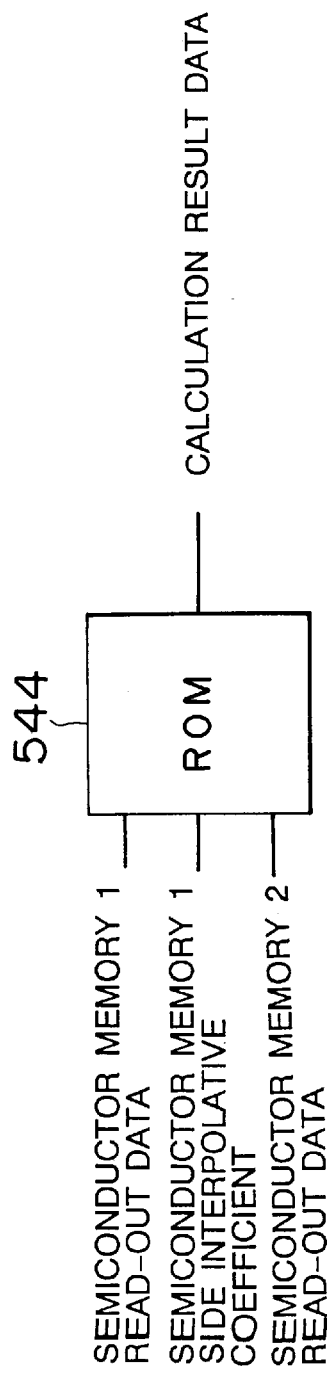
FIG. 37 is a block diagram showing the construction of a calculation processing unit.

FIG. 37 is a block diagram showing the construction of the calculation processing unit 54b. This calculation processing unit 54b includes a ROM 544. The ROM 544 stores the operation result in correspondence with the read-out data of the semiconductor memory units 24-1 and 24-2 and the interpolative coefficient of the semiconductor memory unit 24-1. In this case, the calculation processing unit 54b reads out from the ROM 544 the operation result corresponding to the semiconductor memory read-out address and the interpolative coefficient output from the ROM 526 as shown in FIG. 36. Through this operation, the calculation processing unit 54 can perform the processing at high speed.

<Third Embodiment>

Figure 38:
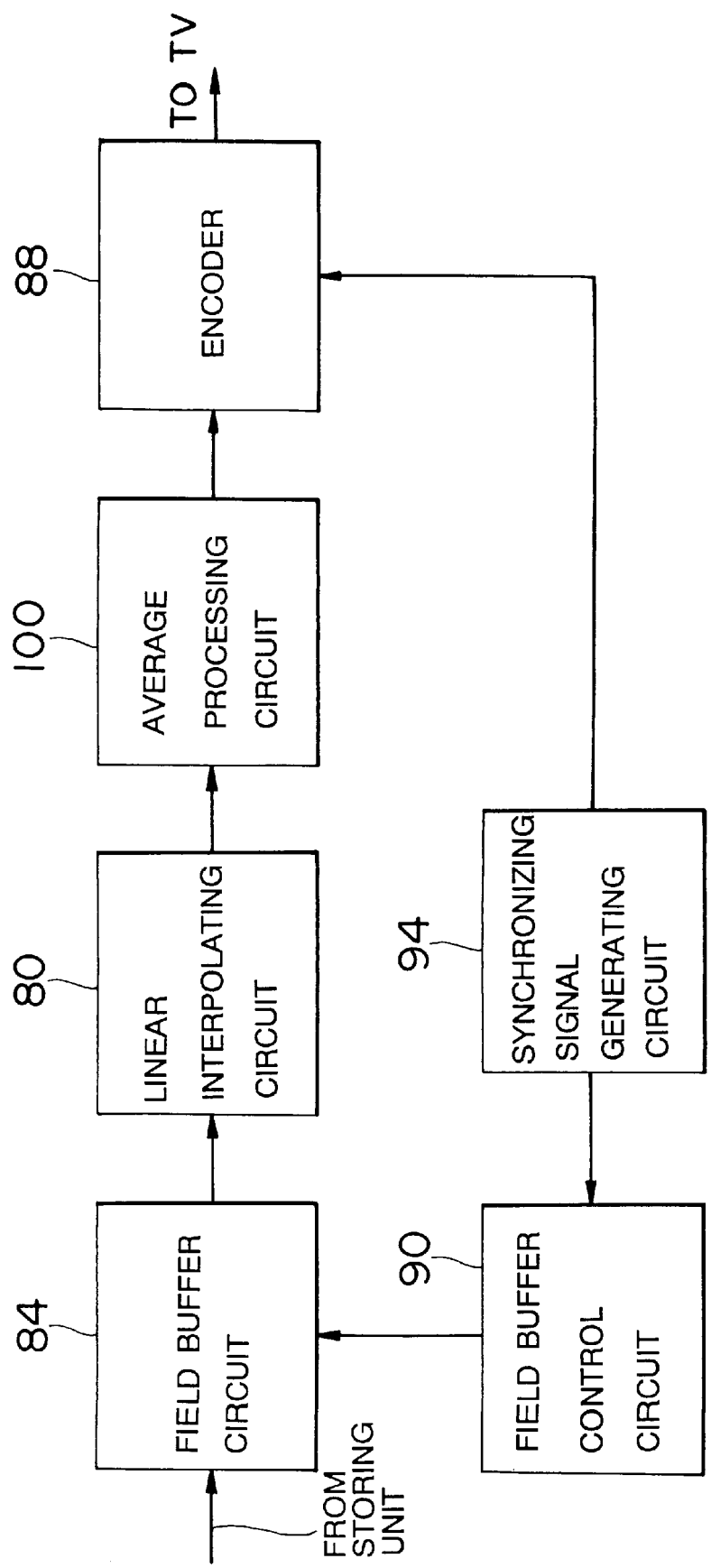
FIG. 38 is a block diagram showing the basis construction of the information processing device according to a third embodiment of this invention.

The third embodiment of the information processing device according to this invention will now be described. FIG. 38 is a block diagram showing the basic construction of the image processing device of the third embodiment.

A. Image data conversion processing device having basic construction

The information processing device includes a field buffer circuit 84, a linear interpolating circuit 80, and a synchronizing signal generating circuit 94. The information processing device further includes a field buffer control circuit 90, an average processing circuit 100, and an encoder circuit 88. The information processing device serves to convert the image data to the television signal having a predetermined number of lines. The image data comprises plural lines, and each frame of the television signal comprises plural fields.

The field buffer circuit 84 includes plural field buffers (not shown) in correspondence with the plural fields. Each of the field buffers of the field buffer circuit 84 serves to store the respective lines of the image data transmitted from a VRAM (not shown) field by field. The linear interpolative circuit 80 is connected to the field buffer circuit 84.

The linear interpolative circuit 80 conducts the linear interpolation on the image data of two adjacent lines in the image data supplied from the field buffer circuit 84 using a beforehand-set interpolative coefficient to generate a television signal.

The synchronizing signal generating circuit 94 serves to generate the synchronizing signal and the vertical synchronizing signal of the television signal. The field buffer control circuit 90 is connected to the synchronizing signal generating circuit 94 and the field buffer circuit 84. The field buffer control circuit 90 controls the write and read-out operations of the image data into and from the plural field buffers field by field on the basis of the synchronizing signal from the synchronizing signal generating circuit 94.

The averaging processing circuit 100 is connected to the linear interpolative circuit 80. The average processing circuit 100 serves to average the signal levels of plural lines of the television signal, which are output from the linear interpolative circuit 80.

The encoder circuit 88 is connected to the average processing circuit 100. The encoder circuit 88 converts the television signal to the NTSC signal and then output it to the television device (not shown).

Figure 39:
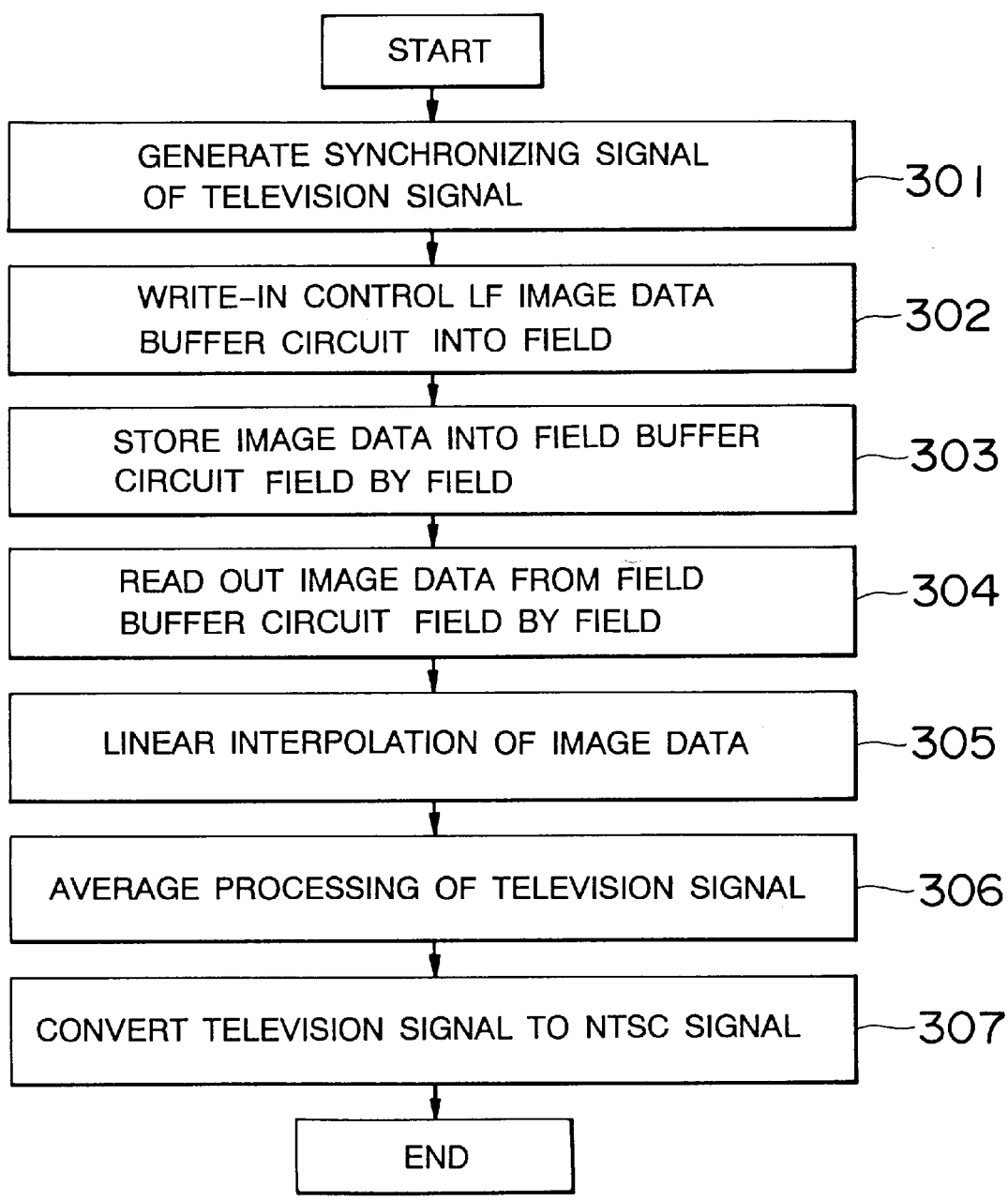
FIG. 39 is a flowchart for the operation of the information processing device as shown in FIG. 38.

Next, the operation of the third embodiment thus constructed will be described. FIG. 39 is a flowchart for the operation of the information processing device as shown in FIG. 38.

First, the horizontal synchronizing signal and the vertical synchronizing signal of the television signal are generated by the synchronizing signal generating circuit 94 (step 301). Subsequently, the feed buffer control circuit 90 controls the writing operation of the image data into the plural field buffers on the basis of the synchronizing signal from the synchronizing signal generating circuit 94 (step 302).

Through the above control, the image data transmitted from the VRAM (not shown) is stored into the plural field buffers field by field (step 303). Subsequently, the field buffer control circuit 90 controls the read-out operation so that the image data is read out from each field buffer of the field buffer circuit 84 field by field (step 304).

Subsequently, the linear interpolating circuit 80 conducts the linear interpolation on the image data of two adjacent lines which are successively output from the plural field buffers field by field, thereby reducing the image data (step 305). Through this operation, the television signal can be generated.

The average processing circuit 100 adds the television signal of the two lines output from the linear interpolating circuit 80 to obtain an average value thereof (step 306). The encoder circuit 88 converts the television signal to the NTSC signal and then outputs the NTSC signal to the television device (not shown) (step 307).

The information processing device as described above can convert the image data stored in the VRAM to the television signal which is reduced in the longitudinal direction of the image data, and also can obtain the television signal having suppressed flicker. In addition, the information processing device can read out the television signal field by field.

B. A typically-constructed image data conversion processing device

Figure 40:
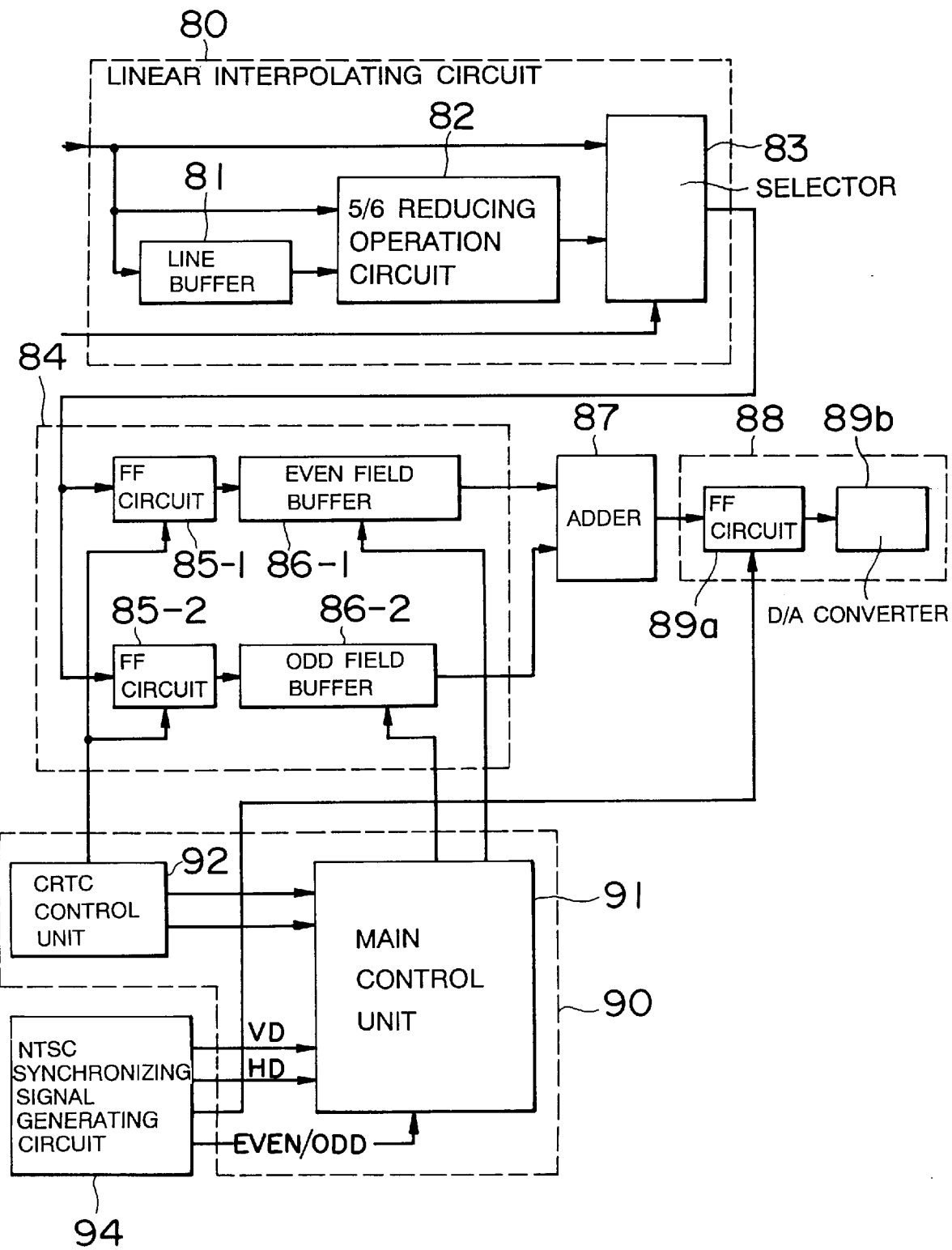
FIG. 40 is a block diagram showing the typical construction of the information processing device of the third embodiment according to this invention.
Figure 41:
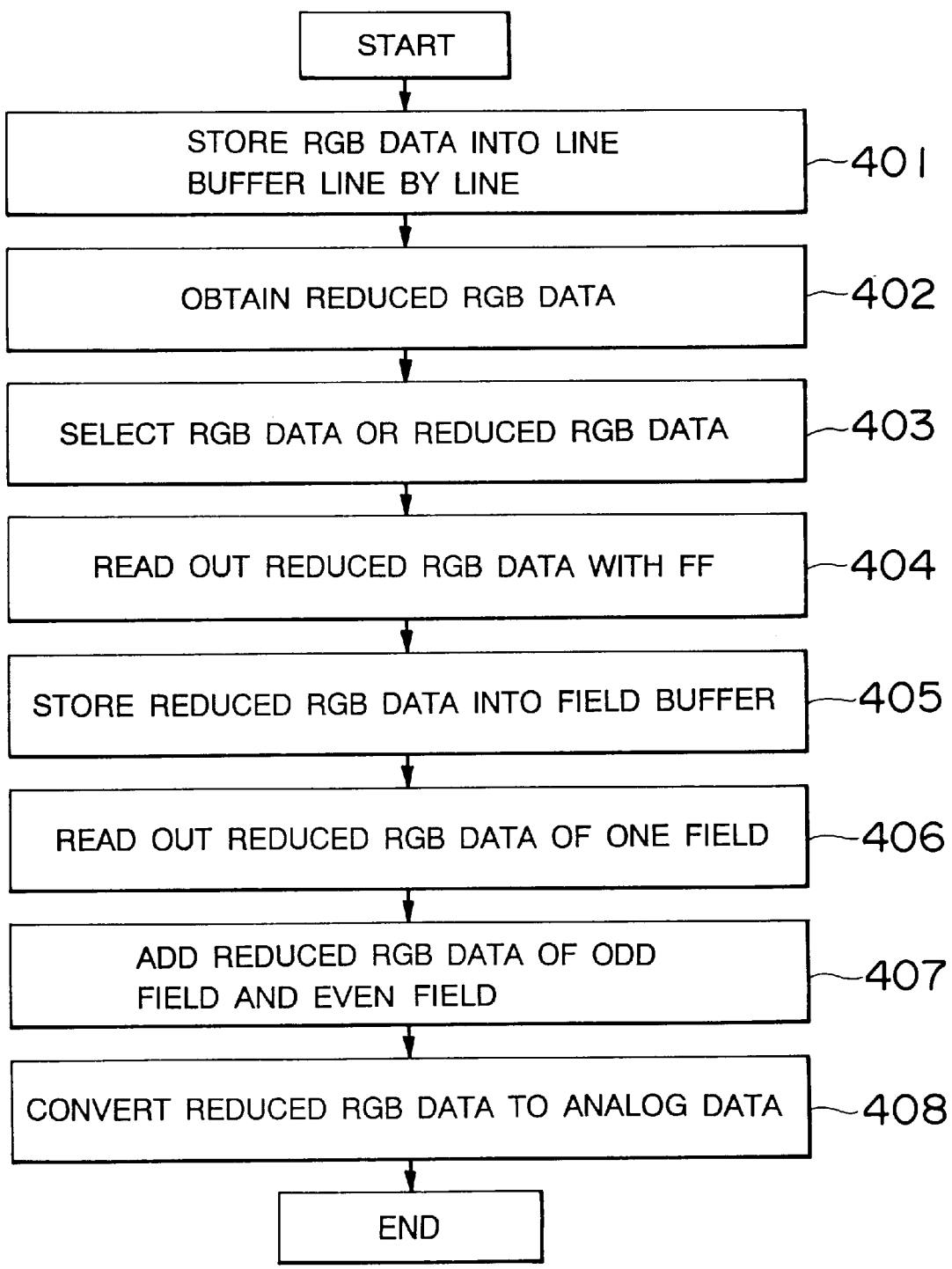
FIG. 41 is a flowchart for the operation of the information processing device as shown in FIG. 40.

FIG. 40 is a block diagram showing the typical construction of the image formation processing device of the third embodiment according to this invention. FIG. 41 is a flowchart for the operation of the information processing device as shown in FIG. 40.

Next, the third embodiment of the information processing device according to this invention will be described. The information processing device of this embodiment includes a linear interpolating circuit 80, a field buffer circuit 84, and adder 87. The information processing device further includes an encoder circuit 88, a field buffer control circuit 90, and an NTSC synchronizing signal generating circuit 94.

The linear interpolating circuit 80 linearly interpolates the RGB data of the two adjacent lines in the longitudinal direction of the image data using a predetermined interpolative coefficient to thereby reduce the RGB data. The linear interpolating circuit 80 comprises a line buffer 81, a ⅚ reduction operating circuit 82, and a selector 83. The line buffer 81 stores the RGB data of 640 dots×480 lines from the VRAM (not shown) line by line.

In order to convert the RGB data of 640 dots×480 lines to the television signal of 640 dots×400 lines, the ⅚ reduction operating circuit 82 obtains the RGB data reduced in a reduction rate of ⅚ in the longitudinal direction of the image on the basis of RGB data just before one line and the RGB data from the VRAM.

The selector 83 selects any one of the RGB data from the VRAM and the RGB data reduced in the reduction rate of ⅚ on the basis of the mode select signal. This linear interpolating circuit 80 is connected to the field buffer circuit 84.

The field buffer circuit 84 stores the RGB data output successively from the linear interpolating circuit 80 field by field. The field buffer circuit 84 comprises flip-flop circuits (FF circuits) 85-1 and 85-2, an EVEN field buffer 86-1 and an ODD field buffer 86-2.

The FF circuits 85-1 and 85-2 read out the RGB data output from the selector 83 at 25/2 MHz. The EVEN field buffer 86-1 successively stores the RGB data of the EVEN field under the control of a main control unit 91, and stores the RGB data of one field. The ODD field buffer 86-2 successively stores the RGB data of the ODD field under the control of the main control unit 91, and stores the RGB data of one field.

The NTSC synchronizing signal generating circuit 94 generates a synchronizing signal, a display clock signal, an EVEN mode signal and an ODD mode signal. The synchronizing signal comprises a horizontal synchronizing signal and a vertical synchronizing signal. The field buffer circuit 84 and the NTSC synchronizing signal generating circuit 94 are connected to the field buffer control circuit 90.

This field buffer control circuit 90 controls the write-in and read-out operations of the RGB data to the field buffer circuit 84. The field buffer control circuit 90 comprises the main control unit 91 and a CRT control unit 92.

The CRT control unit 92 serves to control a CRT of the information processing device, and supplies the FF circuits 84-1 and 84-2 with a control signal for carrying out the read-out operation at 25/2 MHz. The main control unit 91 controls the write-in and read-out operations of the RGB data of the EVEN field to the EVEN field buffer 86-1 on the basis of the synchronizing signal, the EVEN mode signal and the ODD mode signal from the NTSC synchronizing signal generating circuit 94. The main control unit 91 controls the write-in and read-out operations of the RGB data of the ODD field to the ODD field buffer 85-2.

The adder 87 adds the RGB data of the EVEN field from the EVEN field buffer 86-1 and the RGB data of the ODD field from the ODD field buffer 85-2 to output RGB data of one frame. The adder 87 is connected to the encoder circuit 88.

The encoder circuit 88 comprises an FF circuit 89a and a D/A converter 89b. The FF circuit 89a reads out the RGB data of the adder 87 at 14.3 MHz on the basis of the NTSC display clock signal from the NTSC synchronizing signal generating circuit, and outputs it to the D/A converter 89b. The D/A converter converts the RGB data to analog data suitable for the television device (not shown).

Next, the operation of the third embodiment will be described. The following description represents a case where RGB data of 640 dots×480 lines is converted to a television signal of 640 dots×400 lines will be described.

First, the RGB data of 640 dots×480 lines from the VRAM (not shown) stores the line buffer 81 line by line (step 401). On the basis of the RGB data just before one line from the line buffer 81 and the RGB data from the VRAM, RGB data which is reduced in the reduction rate of ⅚ in the longitudinal direction of the image by the ⅚ reduction operating circuit 82 can be obtained (step 402).

Any one of the RGB data from the VRAM and the ⅚-reduced RGB data is selected by the selector 83 which is supplied with mode select signal (step 403). In this case, the reduced RGB is selected.

Subsequently, the reduced RGB data output from the selector 83 is read out at a timing of 25/2 MHz by the FF circuit 85-1 and the FF circuit 85-2 supplied with the control signal from a CRTC control unit 92 (step 404). At this time, the synchronizing signal, the EVEN mode signal and the ODD mode signal which are generated in the NTSC synchronizing signal generating circuit 94 are input to the main control unit 91.

The main control unit 91 generates a write-in timing signal and a read-out timing signal on the basis of the synchronizing signal, the EVEN mode signal and the ODD mode signal. The main control unit 91 outputs the write-in timing signal and the read-out timing signal to the EVEN field buffer 86-1 and the ODD field buffer 85-2.

The reduced RGB data of each line of the EVEN field is stored into the EVEN field buffer 86-1 on the basis of the write-in timing signal. The reduced RGB data of each line of the ODD field is stored into the ODD field buffer 86-2 (step 405).

The reduced RGB data of one field is read out to the adder 87 at the read-out timing at the time when it is stored into the EVEN field buffer 86-1 and the ODD field buffer 86-2 (step 406).

Subsequently, the adder 87 adds the RGB data of the EVEN field from the EVEN field buffer 86-1 and the reduced RGB of the ODD field from the ODD field buffer 85-2 (step 407). Through this operation, the reduced RGB data of one frame is output, i.e, the television signal is generated.

The reduced RGB data from the adder 87 is read out at 14.3 MHz by the FF circuit 89a which is supplied with the display clock signal from the NTSC synchronizing signal generating circuit 94, and then converted to the analog data by the D/A converter 89b (step 408).

As described above, the information processing device converts the data stored in the VRAM to the television signal by reducing the image data in the longitudinal direction with hardware. The television signal is read out field by field.

Therefore, the image can be displayed on a low-price television device without altering existing software. In the first and second embodiments, the clock number of the horizontal synchronizing signal is counted to read out the image data to the television device 40 line by line. On the other hand, in this third embodiment, the image data is read out at the time when the line data of one field is stored into the field buffer circuit 84.

The line number of one field which can be displayed on one television screen is about 220 lines. Therefore, in the interlaced scanning operation, the line number of one frame exceeds 440, so that the image protrudes from the screen. For example, 640 dots×480 lines can be displayed without protruding from the screen using the reducing function of the third embodiment.

The field buffer circuit 84 may be provided between the adder 87 and the encoder 88. Further, in the third embodiment the synchronizing signal is the NTSC synchronizing signal; however, it may be a PAL synchronizing signal.

<First modification of Third embodiment>

Figure 42:
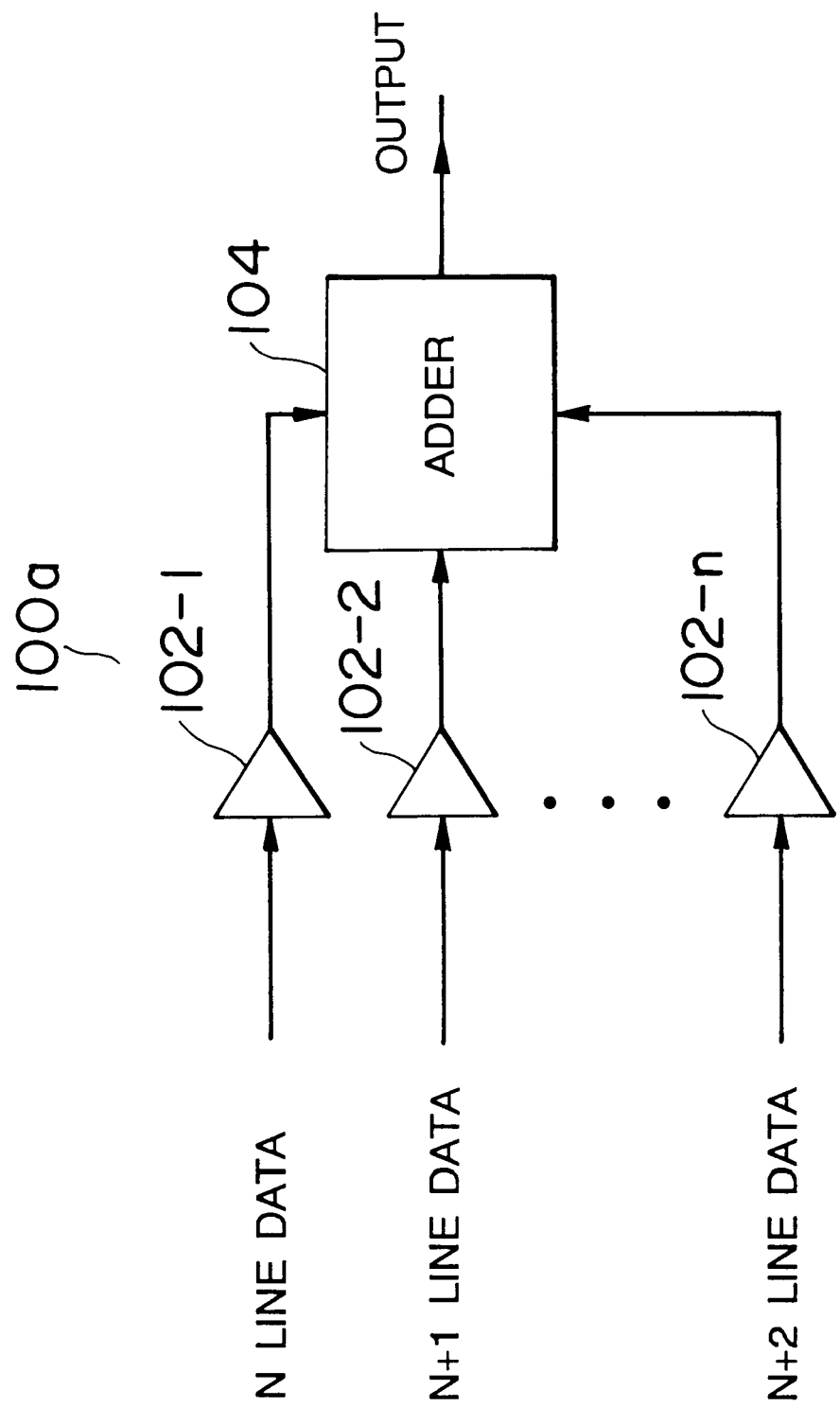
FIG. 42 is a diagram showing a transversal filter.

The first modification of the third embodiment comprises a transversal filter 100a at the input or output side of the field buffers 84-1 and 84-2. FIG. 42 shows the construction of the transversal filter. The transversal filter 100a includes plural filters 102-i (i represents 1 to n) and an adder 104.

According to the construction as described above, the filter 102-1 serves to remove a noise component contained in RGB data of an N-th line, and the filter 102-2 serves to remove a noise component contained in RGB data of an (N+1)-th line. As described above, each filter 102-i removes the noise component contained in the RGB data of each line. The adder 104 adds the output of the filters 102-i to calculate an average value of the RGB data.

Even in an interlaced scanning operation for image data having high vertical resolution such as 640×480 lines which are stored in the VRAM, the flicker can also be suppressed. Therefore, the image on the screen is clearly visible.

<Second modification of Third embodiment>

Figure 43:
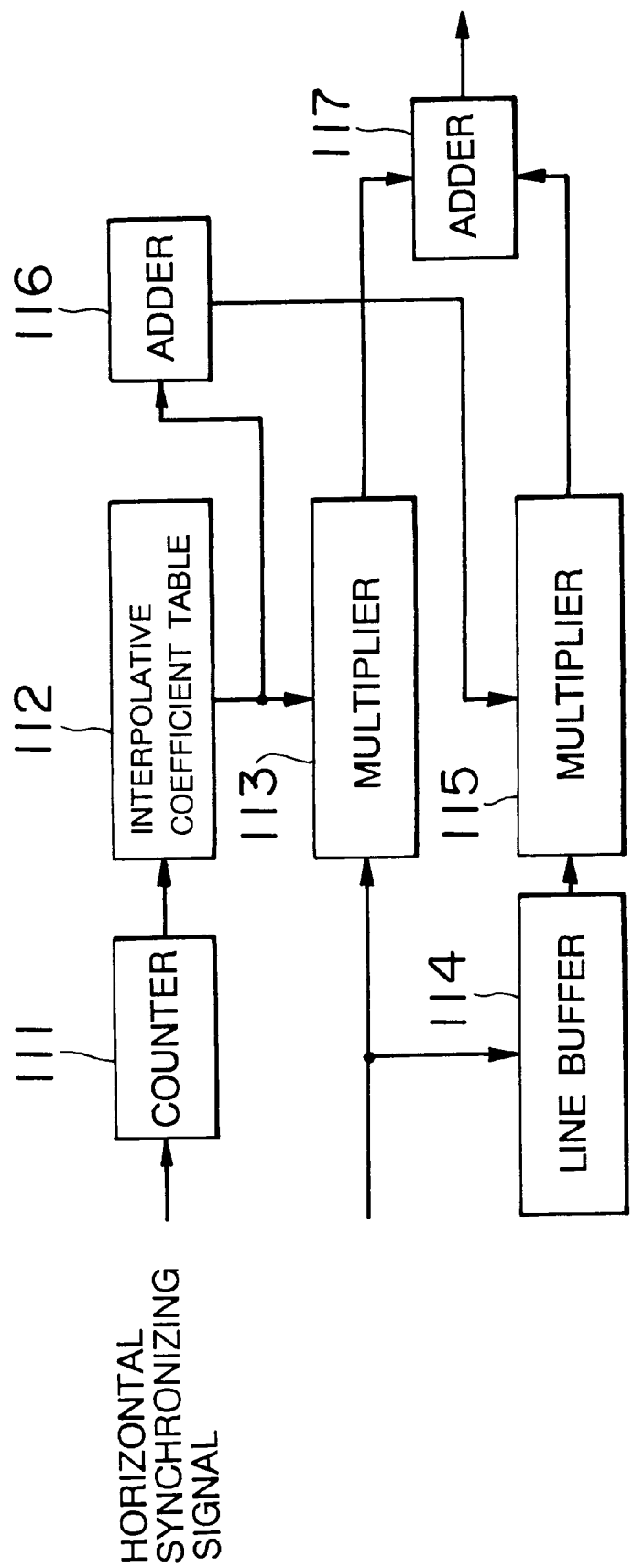
FIG. 43 is a diagram showing a linear interpolating circuit.

This second modification of the third embodiment comprises a linear interpolating circuit 110 at the output side of the field buffer circuit 84. The linear interpolating circuit 110 may be provided at the input side of the field buffer circuit 84. FIG. 43 is a block diagram showing the linear interpolating circuit 110. The linear interpolating circuit 110 includes a counter 111, an interpolating coefficient table 112, and multipliers 113 and 114. The linear interpolating circuit 110 further includes a line buffer 115 and adders 116 and 117.

The counter 111 counts the number of horizontal synchronizing signals. The interpolative coefficient table 112 stores interpolative coefficient values. FIG. 44 is a table showing an example of the interpolative coefficient values. In FIG. 44, the interpolative coefficient table 112 stores the interpolative coefficient table value in correspondence with the count value of the counter 111. For example, an interpolative coefficient table value "8" (1000 in binary system) is stored in correspondence with a count value "0".

The multiplier 113 multiplies the RGB data by the interpolative coefficient table value from the interpolative coefficient table 112. The line buffer 114 stores RGB data just before one line. The adder 116 adds the interpolative coefficient table value from the interpolative coefficient table 112 with a predetermined value. The multiplier 115 multiplies the output from the adder 116 by the RGB data just before one line from the line buffer 114. The adder 117 adds the output of the multiplier 113 with the output of the multiplier 115, and output the added result.

According to the above construction, the image can be reduced.

<Third modification of Third embodiment>

The third modification of the third embodiment comprises a linear interpolating circuit 120 at the output side of the field buffer circuit 84. FIG. 45 is a block diagram for the construction of the linear interpolating circuit 120. This linear interpolating circuit 120 includes a counter 121, a line buffer 122 and a ROM 123. The counter 121 counts the number of horizontal synchronizing signals. The line buffer 122 stores RGB data just before one line. The ROM 123 comprises a look-up table, and stores an operation result as RGB data to be reduced in correspondence with the count value from the counter 121, the RGB data and the RGB data just before one line from the line buffer 122.

According to the construction as described above, the image can be easily reduced merely by referring to the content of the ROM 123.

What is claimed is:

1. An image conversion processing device converting image data, which is stored in a first storing unit, comprising a number of plural image data lines, which can be developed in plural kinds of developing formats, to a television signal having a predetermined number of lines, comprising:

an issue unit issuing a transmission instruction of the image data to said first storing unit in accordance with a period which is specified by a ratio of a number of image data lines of the image data to be converted and a predetermined number of lines of the television signal;

plural line storing units cyclically storing the image data line by line received from said first storing unit in the continuous several line units; and a generating unit multiplying the image data stored in said plural line storing units by an interpolative coefficient for a selected one of the developing formats of the image data to be converted in plural interpolative coefficients which are previously set for the plural kinds of developing formats in synchronism with a horizontal synchronizing signal of the television signal to generate the television signal.

2. The image conversion processing device as claimed in claim 1, wherein said generating unit includes:

a calculating unit performing a linear interpolation on the image data of two of the plural image data lines of the image data line which correspond to a television signal line and using a predetermined value which is previously set, as the interpolative coefficient and outputting a signal level of the television signal line; and an averaging unit calculating an average value of the signal level of two television signal lines of a first television signal time calculated by said calculating unit, for the first television signal line and the signal level calculated by said calculating unit for a television signal line adjacent to said first television line, and generating the television signal based upon the average value.

3. The image data conversion processing device as claimed in claim 1, wherein said generating unit includes an averaging unit calculating an average value of the signal level calculated by said calculating unit for a first television signal line and a television signal line adjacent to said first television line using a predetermined value which is previously set as the interpolative coefficient, thereby generating the television signal.

4. The image data conversion processing device as claimed in claim 1, wherein the image data is transmitted from said first storing unit in response to the transmission instruction of said issue unit, said image data comprising a first transmission portion having image data of a top line thereof as a first transmission starting point and a second transmission portion having image data of a line next to the top line as a second transmission starting point which are alternately arranged.

5. The image data processing device as claimed in claim 1, wherein the number of said plural line storing units is larger than the number of image data lines required to generate the television signal, and said issue unit issues the transmission instruction of the image data according to a timing which keeps the number of said plural line storing units storing the image data, which is required for said generating unit to generate the television signal when the image data is written into said plural line storing units.

6. The image data conversion processing device as claimed in claim 1, wherein a write-in speed of the image data into said plural line storing units is higher than a read-out speed of the image data from said plural line storing units.

7. The image data conversion processing device as claimed in claim 1, further comprising:

a counter cyclically counting the horizontal synchronizing signal of the television signal at the period specified by the selected developing format of the image data to be converted; and a table unit managing a plurality of interpolative coefficients, each interpolative coefficient having periodicity defined by the selected developing format of the image data, and supplying said generating unit with a selected interpolative coefficient of the plurality of interpolative coefficients, said selected interpolative coefficient corresponding to the count value counted by said counter in the plurality of interpolative coefficients.

8. An image conversion processing device converting image data, which is stored in a first unit, comprising a number of plural image data lines, which can be developed in plural kinds of developing formats, to a television signal having a predetermined number of lines, comprising:

an issue unit issuing a transmission instruction of an instruction of the image data to said first storing unit in accordance with a period which is specified by a ratio of a number of image data lines of the image data to be converted and a predetermined number of lines of the television signal;

plural line storing units cyclically storing the image data received from said first unit, line by line on the basis of the transmission instruction of said issue unit;

a generating unit multiplying the image data stored in said plural line storing units by an interpolative coefficient for a selected one of the developing formats of the image data to be converted in plural interpolative coefficients which are previously set for the plural kinds of developing formats in synchronism with a horizontal synchronizing signal of the television signal to generate the television signal;

a first counter cyclically counting the horizontal synchronizing signal of the television signal at the period which is specified in accordance with the selected developing format of the image data to be converted;

a second counter counting a clock number of the horizontal synchronizing signal of the television signal; and a table managing a plurality of interpolative coefficients having periodicity defined by the selected developing format of the image data and a specified identifying clock number of the horizontal synchronizing signal of the television signal and supplying said generating unit with a selected interpolative coefficient of the plurality of interpolative coefficients, said selected interpolative coefficient corresponding to a value counted by said first counter in the plurality of interpolative coefficients, and outputting an identifying clock number corresponding to the value counted, wherein said issue unit compares the identifying clock number output from said table and the value counted by said second counter to issue the transmission instruction of the image data to said first unit.

9. The image data conversion processing device as claimed in claim 1, wherein said generating unit comprises:

plural selection units selecting line storing units corresponding to the image data line number required to generate the television signal in said plural line storing units;

plural multiplying units, provided in correspondence with said plural selection units, multiplying each image data supplied from said selected line storing units by the selected interpolative coefficient and producing a respective multiplied value for each image data; and an adding unit adding the respective multiplied values of each image data, obtained in said plural multiplying units.

10. The image data conversion processing device as claimed in claim 1, further including a selection unit selecting execution or non-execution of conducting the generation of said generating unit on the image data transmitted from said first storing unit in accordance with the developing format of the image data to be converted.

11. An image data conversion processing device converting image data having plural lines, each line numbered as one of an even line and an odd line, which can be developed in plural kinds of developing formats, to a television signal having a predetermined number of lines, comprising:

an even storing unit storing image data of even lines in the image data to be converted;

an odd storing unit storing image data of odd lines in the image data to be converted;

a signal generating unit generating a horizontal synchronizing signal of the television signal and plural rate data determined by a ratio of the number of lines of the image data and a predetermined number of lines of the television signal in accordance with the plural kinds of developing formats; and a format conversion processing unit converting the image data of the even and odd lines supplied from said even storing unit and said odd storing unit to a format of the television signal using the horizontal synchronizing signal of the television signal and the rate data corresponding to the developing format of the image data to be converted in the plural rate data, wherein said format conversion processing unit includes a conversion processing control unit generating a read-out address reading out image data of adjacent odd and even lines stored in said even storing unit and said odd storing unit, and an interpolative coefficient assigned to the image data on the basis of the selected rate data and the horizontal synchronizing signal of the television signal from said signal generating unit, a calculation processing unit reading out the image data of the adjacent odd and even lines stored in said even storing unit and said odd storing unit in accordance with the read-out address and multiplying the read-out image data by the interpolative coefficient, a line storing unit storing the television signal obtained in said calculation processing unit line by line, and an average processing unit averaging the television signal just before one line stored in said corresponding even storing unit and said odd storing unit, and the television signal of one line obtained in said calculation processing unit, to generate the television signal of one line.

12. The image data conversion processing device as claimed in claim 11, wherein said signal generating unit counts the number of the horizontal synchronizing signals of the television signal, and said conversion processing control unit includes a multiplying unit multiplying the rate data supplied from said signal generating unit by the number of horizontal synchronizing signals counted, to calculate the read-out addresses for said even storing unit and said odd storing unit and the interpolative coefficient.

13. The image data conversion processing device as claimed in claim 11, wherein said signal generating unit counts the number of the horizontal synchronizing signals of the television signal, and said conversion processing control unit includes a storing unit storing the read-out address and the interpolative coefficient in correspondence with the rate data and the number of the horizontal synchronizing signals counted by said signal generating unit.

14. The image data conversion processing device as claimed in claim 11, wherein said calculation processing unit comprises:

a first multiplying unit multiplying the image data of the even line read out from said even storing unit by the interpolative coefficient;

a second multiplying unit multiplying the image data of the odd line read out from said odd storing unit by the interpolative coefficient; and an adding unit adding the output of said first multiplying unit with the output of said second multiplying unit.

15. The image data conversion processing device as claimed in claim 11, wherein said calculation processing unit includes a storing unit storing the calculation processing result in correspondence with the respective image data read out from said even storing unit and said odd storing unit and the interpolative coefficient.

16. The image data conversion processing device as claimed in claim 11, further comprising:

a second line storing unit storing the television signal by line, and wherein said average processing unit calculates an average value of the television signal before two lines are stored in said second line storing unit, a television signal before one line stored in a second line storing unit and a television signal of one line calculated in said calculation processing unit, thereby generating the television signal.

17. The image data conversion processing device as claimed in claim 11, wherein said average processing unit multiplies each line of the television signal by a predetermined weight coefficient and adds the respective multiplied output of each line with each other line, thereby generating the television signal.

18. An image conversion processing device for converting image data, which is stored in a storing unit, to a television signal having a predetermined number of lines and a plurality of frames, in which the image data comprises plural lines and one frame of the television signal comprises plural fields, comprising:

a linear interpolating unit conducting a linear interpolation on image data of two lines of the image line supplied from said storing unit and an image data line adjacent thereto using a predetermined interpolative coefficient;

plural field storing units provided at an input side of said linear interpolating unit storing respective lines field by field;

a synchronizing signal generating unit generating a horizontal synchronizing signal and a vertical synchronizing signal of the television signal, without receiving a synchronizing signal from external of the image conversion processing device; and a field control unit performing write-in and read-out operations of the image data field by field to said plural field storing units on the basis of the horizontal synchronizing signal and the vertical synchronizing signal generated in said synchronizing signal generating unit.

19. The image conversion processing device as claimed in claim 18, further including an average processing unit averaging the image data of plural image data lines of the image data line supplied from said plural field storing units and the image data line adjacent thereto.

20. An image conversion processing device for converting image data stored in a storing unit to a television signal having a predetermined number of lines and a plurality of frames, in which the image data comprises plural lines and one frame of the television signal comprises plural fields, including:

plural field storing units storing each line of the image data supplied from said storing unit field by field;

an average processing unit, provided at an input or output side of said plural field storing units, averaging the image data of plural image data lines of the image data line and the image data line adjacent thereto;

a synchronizing signal generating unit generating a horizontal synchronizing signal and a vertical synchronizing signal of the television signal, without receiving a synchronizing signal from external of the image conversion processing device; and a field control unit performing write-in and read-out operations of the image data on said plural field storing units field by field on the basis of the horizontal synchronizing signal and the vertical synchronizing signal generated by said synchronizing signal generating unit.

21. The image conversion processing device as claimed in claim 18, further comprising an encoder converting the television signal to an NTSC signal.

22. The image conversion processing device as claimed in claim 20, wherein said average processing unit includes plural filter units conducting a filter processing on signal levels of plural adjacent lines of the image data, and an adding unit adding the signal levels of the plural filter-processed lines supplied from said plural filter units.

23. The image conversion processing device as claimed in claim 18, wherein said linear interpolating unit comprises:

a counter counting the number of the horizontal synchronizing signals of the television signal;

an interpolative coefficient table storing in correspondence for each number counted by said counter, a corresponding interpolative coefficient; and a multiplying unit multiplying the image data by the interpolative coefficient corresponding to the number counted by said counter retrieved from the interpolative coefficient table, thereby performing linear interpolation on the image data.

24. The image conversion processing device as claimed in claim 18, wherein said linear interpolating unit comprises a lookup table storing a calculation result in correspondence with the horizontal synchronizing signal of the television signal and the predetermined interpolative coefficient.

25. An image conversion processing device converting image data comprising a number of plural image data lines, which is stored in a first storing unit, and which can be developed in plural kinds of developing formats, to a television signal having a predetermined number of lines, comprising:

an issue unit issuing a transmission instruction of an instruction of the image data to said first storing unit in accordance with a period which is specified by a ratio of a number of image data lines of the image data to be converted and a predetermined number of lines of the television signal;

plural line storing units cyclically storing the image data received from said first storing unit, line by line on the basis of the transmission instruction of said issue unit; and a generating unit multiplying the image data stored in said plural line storing units by an interpolative coefficient for a selected one of the developing formats of the image data to be converted in plural interpolative coefficients which are previously set for the plural kinds of developing formats in synchronism with a horizontal synchronizing signal of the television signal to generate the television signal, wherein:
the number of lines of the image data is more than the number of lines of the television signal;

said issue unit issues a transmission instruction of the image data to said first storing unit in accordance with a period which is specified by the ratio of the number of lines of the image data to be converted and the predetermined number of lines of the television signal by continuous several line units in the image data of the stored plural lines;

each one of said plural line storing units is coupled to a corresponding line of said plural lines and stores the image data one by one in a line unit transferred from said storing unit one by one in several line units at every issue instruction of said issue unit; and said image data conversion processing device further comprising a selection unit selecting one of the line storing units by moving the predetermined number of lines in accordance with the number of lines of the image data to generate the television signal in said several line storing units according to the predetermined plural selection control signal having a periodicity defined by the developing format of the image data, and wherein said generating unit multiplies one of the interpolative coefficients corresponding to the developing format of the image data to be converted in the predetermined plural interpolative coefficients in accordance with the plural kinds of developing formats to the image data stored in the line storing unit selected by the selecting unit by synchronizing to the horizontal synchronizing signal of the television signal and generates a television signal by adding respective multiplying values.

26. The image data conversion processing device as claimed in claim 25, comprising:

a table managing each interpolative coefficient consisting of plural first interpolative coefficients having periodicity defined by the developing format of the image data; and a counter cyclically counting the horizontal synchronizing signal of the television signal at the period specified by the developing format of the image data to be converted, wherein said selection unit selects a selection control signal in accordance with the count value of the counter unit and selects one of the plural line storing units in accordance with the selection control signal, and said generating unit multiplies the interpolative coefficients in accordance with the count value of the counter in the plural first interpolative coefficients managed by the table to the image data of each line selected by the selection unit and generates the television signal by adding respective multiplying values.

27. The image data conversion processing device as claimed in claim 25, comprising:

a first counter cyclically counting a number of horizontal synchronizing signals of the television signals at a period which is specified in accordance with the developing format of the image data to be converted;

a second counter outputting the number of clocks counted by counting the horizontal synchronizing signal of the television signal by the clock signal;

a table managing the plural first interpolative coefficients having periodicity defined by the developing format of the image data, and a number of identifying clocks to display the timing for output instruction of the image data to the plural line storing units in order to read out the image data from the selected line storing unit;

said issue unit issues the output instruction of the image data when the number counted by the second counter corresponds to the number of identifying clock output from the table;

said selection unit selects the selection control signal in accordance with the count value by the first counter and the plural line storing units in accordance with the selection control signal; and said generating unit multiplies interpolative coefficients, said selected interpolative coefficients being selected in accordance with the number counted by the first counter from the plural first interpolative coefficients managed by the table, by the image data in each line selected by the selection unit to produce respective multiplied values, and generates the television signal by adding the respective multiplied values.

28. The image data conversion processing device as claimed in claim 25, wherein:

said selection unit sets the number in accordance with the number of lines of the image data required to generate the television signal, and said generating unit comprises a multiplying unit multiplying each image data supplied from said selected line storing unit by the interpolative coefficient and an adding unit adding the respective multiplied values obtained in said multiplying unit.

29. An image conversion processing device converting image data comprising plural lines, which are stored in a storing unit and can be developed in plural kinds of the developing formats, each image data having a selected developing format of the developing formats, to a television signal having a number of lines less than a number of lines of the image data comprising:

an issue unit issuing a transmission instruction of the image data at several series of line units in the image data of the plural lines stored to the storing unit, according to the period defined by the ratio of the number of lines of the image data and a predetermined number of lines of the television signal to be converted;

a plurality of line storing units setting every line of the plural lines and storing the image data in a line unit transferred at several line units, from the storing unit in response to every transmission instruction of the issue unit;

a selection unit selecting the line storing unit in accordance with the number of lines of the image data required to generate the television signal in the plurality of line storing units according to a predetermined plural selection control signal having a periodicity defined by the selected developing format of the image data by moving the predetermined number of lines; and a generating unit multiplying an interpolative coefficient in accordance with the selected developing format of the image data to be converted in predetermined plural interpolative coefficients according to the plural kinds of developing formats, by synchronizing to a horizontal synchronizing signal of the television signal, obtaining multiplying values and generating the television signal by adding respective multiplying values of the multiplying values.

30. The image data conversion processing device as claimed in claim 29, comprising:

a table managing each interpolative coefficient consisting of plural first interpolative coefficients having a periodicity defined by the selected developing format of the image data; and a counter counting a number of the horizontal synchronizing signals of the television signal cyclically, at the period defined by the selected developing format of the image data to be converted, wherein said selection unit selects the selection control signal according to the count value of the counter and the line storing unit according to the selection control signal; and said generating unit multiplies the interpolative coefficients according to the count value of the counter in the plural first interpolative coefficients managed by the table to the image data of each line selected by the selection unit, obtains multiplying values and generates the television signal by adding respective multiplying values of the multiplying values.

31. The image data conversion processing device as claimed in claim 29, comprising:

a first counter counting the horizontal synchronizing signal cyclically at the period defined by the selected developing format of the image data to be converted;

a second counter outputting a number of clock pulses by counting a number of horizontal synchronizing signals of the television signal by a clock signal; and a table managing a plurality of first interpolative coefficients having periodicity defined by the developing format of the image data and a number of identifying clocks of the horizontal synchronizing signal to display the timing for an output instruction of the image data to the line storing unit in order to read out the image data from the selected line storing unit, wherein said issue unit issues the output instruction of the image data when the count value by the second counter corresponds to the number of identifying clocks output from the table, said selection unit selects the selection control signal in accordance with the number counted by the first counter and the line storing unit in accordance with the selection control signal, and said generating unit multiplies the interpolative coefficients in accordance with the number counted by the first counter in the several first interpolative coefficients managed by the table to the image data in each line selected by the selection unit, obtains multiplying values and generates the television signal by adding respective multiplying values of the multiplying values.

32. An image conversion processing device comprising:

plural line storing units storing an image data, line by line, from a storing unit storing the image data which is non-interlaced, having plural lines and developable in plural kinds of developing formats; and a generating unit multiplying the image data received in said plural line storing units by an interpolative coefficient for a format of the received image data to be converted in plural interpolative coefficients which are beforehand set for the plural kinds of developing formats and are used to change a number of the lines of the image data and to reduce a flicker, thereby generating a television signal so that the lines of the image data are one of reduced and increased, and the flicker is decreased.

33. An image conversion processing device comprising:

plural line storing units cyclically storing, line by line, the image pixel data received from a storing unit storing image pixel data which is non-interlaced, comprising plural lines and developable in plural kinds of developing formats, each line of the plural lines having a signal level; and an averaging unit calculating an average value of the signal levels of at least three signal lines stored in the plural line storing units using an interpolative coefficient for one of increasing and decreasing the plural lines of the image pixel data stored in the storing unit, changing the image pixel data to a television signal and reducing a flicker of the television signal.

34. An image conversion processing device comprising:

plural line storing units storing, line by line, image pixel data received from a storing unit storing the image pixel data comprising plural lines and developable in plural kinds of developing formats, each line of the plural lines having a signal level;

an averaging unit calculating an average value of the signal levels of at least three signal lines stored in the plural line storing units using an interpolative coefficient for one of increasing a nd decreasing the plural lines of the image pixel data stored in the storing units, changing the image pixel data to a television signal and reducing a flicker of the television signal; and a managing unit managing the difference between the number of lines of the pixel image data stored in the storing unit and the number of lines of the television signal, wherein said averaging unit changes the interpolative coefficient based on said difference.

35. The image data conversion processing device as claimed in claim 34, further comprising an issue unit issuing a transmission instruction of an instruction of the image pixel data to said storing unit in accordance with a period which is specified by a ratio of a number of image data lines of the image pixel data to be converted and a predetermined number of lines of a television signal, wherein the image data is transmitted from said storing unit in response to the transmission instruction of said issue unit and comprises a first transmission unit having image data of a top line thereof as a transmission starting point and a second transmission unit having image data of a line next to the top line as a transmission starting point which are alternately arranged.

36. The image data conversion processing device as claimed in claim 33, wherein a write-in speed of the image data into said plural line storing units is higher than a read-out speed of the image data from said plural line storing units.

37. The image data conversion processing device as claimed in claim 34, wherein a write-in speed of the image data into said plural line storing units is higher than a read-out speed of the image data from said plural line storing units.

38. The image data conversion processing device as claimed in claim 34, further comprising:
a counter cyclically counting the horizontal synchronizing signal of the television signal at the period specified by the selected developing format of the image data to be converted; and
a table managing plural kinds of interpolative coefficients having periodicity defined by the selected developing format of the image data, and supplying said averaging unit with a selected one of the interpolative coefficients, said selected interpolative coefficient corresponding to the count value counted by said counter in the plural interpolative coefficients.

39. The image data conversion processing device as claimed in claim 35, further comprising:
a counter unit cyclically counting the horizontal synchronizing signal of the television signal at the period specified by the selected developing format of the image data to be converted; and
a table unit managing a plurality of interpolative coefficients having periodicity defined by the selected developing format of the image data, and supplying said averaging unit with a selected interpolative coefficient of interpolative coefficients, said selected interpolative coefficient corresponding to the count value counted by said counter unit in the plurality of interpolative coefficients.

40. An image conversion processing device comprising:
plural line storing units storing, line by line, the image pixel data received from a storing unit storing image pixel data comprising plural lines and which can be developed in plural kinds of developing formats, each line of the plural lines having a signal level;
an averaging unit calculating an average value of the signal levels of at least three signal lines stored in the plural line storing units using an interpolative coefficient for one of increasing and decreasing the plural lines of the image pixel data stored in the storing unit, changing the image pixel data to a television signal and reducing a flicker of the television signal;
an issue unit issuing a transmission instruction of an instruction of the image pixel data to said storing unit in accordance with a period which is specified by a ratio of a number of image data lines of the image pixel data to be converted and a predetermined number of lines of a television signal;
a first counter unit cyclically counting the horizontal synchronizing signal of the television signal at the period which is specified in accordance with the selected developing format of the image data to be converted;
a second counter unit counting a clock number of the horizontal synchronizing signal of the television signal; and
a table unit managing a plurality of interpolative coefficients having periodicity defined by the selected developing format of the image data and a specified identifying clock number of the horizontal synchronizing signal of the television and supplying said averaging unit with a selected interpolative coefficient of the plurality of interpolative coefficients, said selective interpolative coefficient corresponding to the value counted by said first counter unit in the plurality of interpolative coefficients and outputting an identifying clock number corresponding to the value counted, wherein
said issue unit compares the identifying clock number output from said table unit and the value counted by said second counter unit to issue the transmission instruction of the image data to said storing unit.

41. The image data conversion processing device as claimed in claim 34, further comprising:
an issue unit issuing a transmission instruction of an instruction of the image pixel data to said storing unit in accordance with a period which is specified by a ratio of a number of image data lines of the image pixel data to be converted and a predetermined number of lines of a television signal;
a first counter unit cyclically counting the horizontal synchronizing signal of the television signal at the period which is specified in accordance with the selected developing format of the image data to be converted;
a second counter unit counting a clock number of the horizontal synchronizing signal of the television signal; and
a table unit managing a plurality of interpolative coefficients having periodicity defined by the selected developing format of the image data and a specified identifying clock number of the horizontal synchronizing signal of the television and supplying said averaging unit with a selected interpolative coefficient of the interpolative coefficients corresponding to a value counted by said first counter unit in the plurality of interpolative coefficients and outputting an identifying clock number corresponding to the value counted, wherein
said issue unit compares the identifying clock number output from said table unit and the value counted by said second counter unit to issue the transmission instruction of the image data to said storing unit.

42. The image data conversion processing device as claimed in claim 33, wherein said averaging unit comprises:
plural selection units selecting line storing units corresponding to the image data line number required to generate the television signal in said plural line storing units;
plural multiplying units, provided in correspondence with said plural selection units, multiplying each image data supplied from said selected line storing unit by the selected interpolative coefficient and producing a respective multiplied value for each image data; and
an adding unit adding the respective multiplied values of each image data, obtained in said plural multiplying units.

43. The image data conversion processing device as claimed in claim 34, wherein said averaging unit comprises:

plural selection units selecting line storing units corresponding to the image data line number required to generate the television signal in said plural line storing units;

plural multiplying units, provided in correspondence with said plural selection units, multiplying each image data supplied from said selected line storing unit by the selected interpolative coefficient and producing a respective multiplied value for each image data; and an adding unit adding the respective multiplied values of each image data, obtained in said plural multiplying units.

44. The image data conversion processing device as claimed in claim 43, wherein said plural selection units output the image data read out from said plural line storing units which is required for said averaging unit to generate the television signal when the image data is written into said plural line storing units, to said plural multiplying units.

45. The image data conversion device as claimed in claim 42, wherein the number of said plural line storing units is four, and when the image data is written into one of said four line storing units, the image data which have been already stored in the other three line storing units are selected by three corresponding ones of the plural selection units to output the selected image data to three corresponding ones of the plural multiplying units.

46. An image conversion processing device comprising:

plural line storing units storing, line by line, the image pixel data received from a storing unit storing the image pixel data which is non-interlaced, comprising plural lines and developable in plural kinds of developing formats, each line of the plural lines having a signal level;

an averaging unit calculating an average value of the signal levels of at least three signal lines stored in the plural line storing units using an interpolative coefficient for one of increasing and decreasing the plural lines of the image pixel data stored in the storing unit, changing the image pixel data to a television signal and reducing a flicker of the television signal; and a selection unit selecting one of execution and non-execution of conducting the generation of said averaging unit on the image data transmitted from said storing unit in accordance with the developing format of the image data to be converted.

47. An image conversion processing device comprising:

a storing unit storing image data which is non-interlaced and having plural lines, wherein the image data is developable in plural kinds of developing formats; and a generating unit multiplying the image data stored in said storing unit by an interpolative coefficient for a format of the image data to be converted in plural interpolative coefficients which are beforehand set for the plural kinds of developing formats and are used to change a number of the lines of the image data and to reduce a flicker, thereby generating a television signal so that the lines of the image data are one of reduced and increased, and the flicker is decreased.

48. An image conversion processing device comprising:

a receiving unit receiving image data which is non-interlaced and having plural lines, wherein the image data is developable in plural kinds of developing formats; and a generating unit multiplying the image data received by said receiving unit by an interpolative coefficient for a format of the image data to be converted in plural interpolative coefficients which are beforehand set for the plural kinds of developing formats and are used to change a number of the lines of the image data and to reduce a flicker, thereby generating a television signal so that the lines of the image data are one of reduced and increased, and the flicker is decreased.

* * * * *